United States Patent
Yoon et al.

(10) Patent No.: US 11,153,810 B2
(45) Date of Patent: Oct. 19, 2021

(54) METHOD AND DEVICE FOR PERFORMING SCHEDULING BY USING ALTERNATIVE SIGNALS IN WIRELESS COMMUNICATION SYSTEM

(71) Applicant: SAMSUNG ELECTRONICS CO., LTD., Suwon-si (KR)

(72) Inventors: Sejong Yoon, Suwon-si (KR); Seongah Jeong, Suwon-si (KR); Hyunchul Kim, Suwon-si (KR); Yi Yang, Suwon-si (KR); Moonseok Kang, Suwon-si (KR); Jonghyo Lee, Suwon-si (KR); Jonghoon Jang, Suwon-si (KR); Sehwan Choi, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 9 days.

(21) Appl. No.: 16/665,654

(22) Filed: Oct. 28, 2019

(65) Prior Publication Data

US 2020/0137676 A1    Apr. 30, 2020

(30) Foreign Application Priority Data

Oct. 26, 2018 (KR) .................. 10-2018-0129337
Dec. 7, 2018 (KR) .................. 10-2018-0157481
Mar. 15, 2019 (KR) .................. 10-2019-0030020

(51) Int. Cl.
*H04W 48/16* (2009.01)
*H04W 64/00* (2009.01)
(Continued)

(52) U.S. Cl.
CPC .......... *H04W 48/16* (2013.01); *G01S 13/343* (2013.01); *G01S 13/765* (2013.01); *H04W 4/70* (2018.02);
(Continued)

(58) Field of Classification Search
CPC ....... H04W 4/023; H04W 4/80; H04W 4/029; H04W 12/00503; H04W 12/06;
(Continued)

(56) References Cited

U.S. PATENT DOCUMENTS

2006/0030305 A1    2/2006  Lee et al.
2006/0209734 A1    9/2006  Son et al.
(Continued)

FOREIGN PATENT DOCUMENTS

EP          2213016 B1    8/2018
KR   10-2017-0040239 A    4/2017

OTHER PUBLICATIONS

"LAN/MAN Standards Committee of the IEEE Computer Draft Standard for Low-Rate Wireless Networks" Amendment: Enhanced Ultra-Wide-Band (UWB) Physical Layers (PHYs) and Associated Ranging Techniques, Aug. 2018, (117 pages total).

(Continued)

*Primary Examiner* — Kwasi Karikari
(74) *Attorney, Agent, or Firm* — Sughrue Mion, PLLC

(57) ABSTRACT

Provided is a method of operating a controller, a method of operating a controlee, a controller, and a controlee. The method of operating a controller that performs a ranging with a controlee using ultra wideband (UWB) communication in a wireless communication system, the method including: transmitting, to the controlee, a first ranging control message (RCM) comprising information of a first ranging interval for a second RCM; changing a ranging interval for the second RCM from the first ranging interval to a second ranging interval; transmitting, to the controlee, an interval update message for the second RCM comprising information for the changed ranging interval based on the first ranging interval; and transmitting, to the controlee, the second RCM based on the changed ranging interval.

17 Claims, 37 Drawing Sheets

(51) Int. Cl.
  *H04W 74/08* (2009.01)
  *H04W 4/70* (2018.01)
  *H04W 48/14* (2009.01)
  *G01S 13/76* (2006.01)
  *H04W 4/80* (2018.01)
  *H04W 48/10* (2009.01)
  *G01S 13/34* (2006.01)

(52) U.S. Cl.
  CPC ............. *H04W 4/80* (2018.02); *H04W 48/10* (2013.01); *H04W 48/14* (2013.01); *H04W 64/00* (2013.01); *H04W 74/0833* (2013.01)

(58) Field of Classification Search
  CPC ......... H04W 4/40; H04W 4/027; H04W 4/48; H04W 76/10; H04W 12/08; H04W 48/04; H04W 4/02; H04W 4/026; H04W 12/001; H04W 12/003; H04W 12/04071; H04W 4/20; H04W 4/33; H04W 4/44; H04W 64/003; H04W 64/006; H04W 12/00502; H04W 12/00505; H04W 12/0401; H04W 12/1202; H04W 4/14; H04W 4/70; H04W 74/0875; H04W 84/12; H04L 12/413
  See application file for complete search history.

(56) References Cited

U.S. PATENT DOCUMENTS

| | | |
|---|---|---|
| 2010/0278151 A1 | 11/2010 | Oh et al. |
| 2016/0241373 A1 | 8/2016 | Marri Sridhar et al. |
| 2017/0223579 A1 | 8/2017 | Lee et al. |
| 2018/0099643 A1* | 4/2018 | Golsch ................ B60R 25/2018 |
| 2019/0053021 A1* | 2/2019 | Fuke ........................ E05F 15/76 |
| 2019/0135229 A1* | 5/2019 | Ledvina ................ H04W 12/06 |
| 2019/0156603 A1* | 5/2019 | Breer .................. G07C 9/00309 |

OTHER PUBLICATIONS

Communication dated Feb. 7, 2020, issued by the International Searching Authority in counterpart International Application No. PCT/KR2019/014245 (PCT/ISA/210 & 237).

* cited by examiner

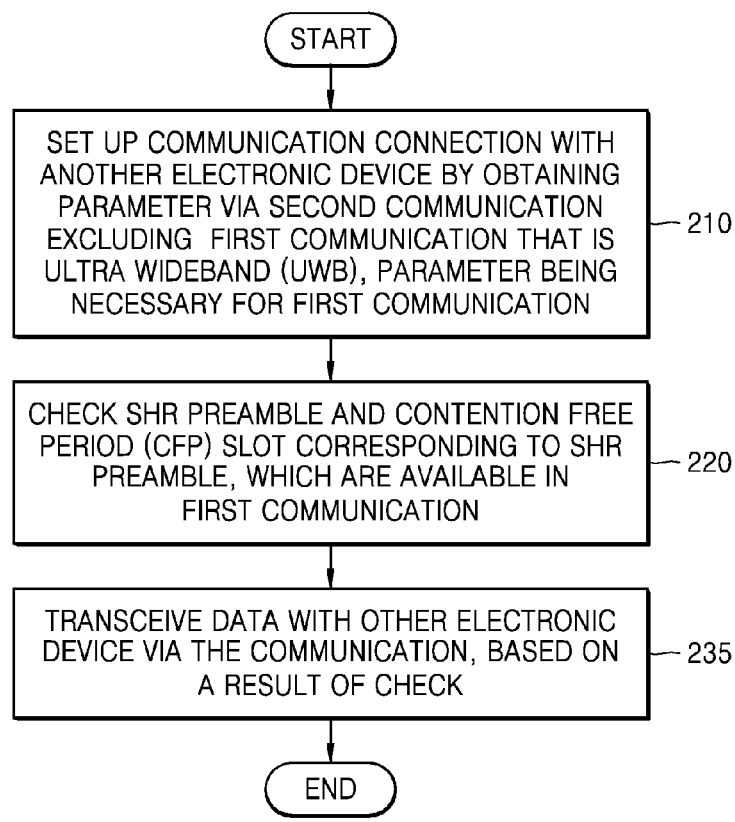

FIG. 8

| Octet 4 | 1 | 1 |
|---|---|---|
| CSU (CFP slot usage) bitmap | CFOO (CFP frequency of occupancy) field | Preamble code index 1 |
| ... | ... | ... |
| CSU (CFP slot usage) bitmap | CFOO (CFP frequency of occupancy) field | Preamble code index N |

FIG. 9

| CFOO value | Frequency of usage (Hz) |
|---|---|
| 0 | 10 |
| 1 | 5 |
| 2 | 3.333 |
| 3 | 2.5 |
| 4 | 2 |
| 7 | 1.25 |
| 9 | 1 |
| 11 | 0.833 |
| 14 | 0.667 |
| 15 | 0.625 |
| 19 | 0.6 |
| 24 | 0.4 |
| 29 | 0.333 |
| 39 | 0.25 |
| 49 | 0.2 |
| 99 | 0.1 |

PULL_DOOR_BACK_OFF (ms) = PULL_DOOR_BACK_OFF_WINDOW (Random(0 ~ 5)) * RRL (20ms):
(MIN_PULL_DOOR_BACK_OFF, MAX_PULL_DOOR_BACK_OFF)

Ex) PULL_DOOR_BACK_OFF = Random(0 ~ 5) * 20ms: (Min 0ms, Max 100ms)

FIG. 26

<ESTIMATED ENTRY TIME OF FIRST/SECOND ELECTRONIC DEVICE INTO SECURE_DISTANCE>
(LAST MEASURED DISTANCE(M) − SECURE_DISTANCE(EX. 2M)) / AWSH (1.5M/S) =
TIME WHEN SECOND ELECTRONIC DEVICE IS TO ENTER SECURE_DISTANCE WITH
RESPECT TO FIRST ELECTRONIC DEVICE AFTER LAST DISTANCE MEASUREMENT,
TIME BEING ESTIMATED BY FIRST/SECOND ELECTRONIC DEVICE

FIG. 27

[BACK-OFF TIME WHEN FIRST DISTANCE RE-MEASUREMENT]

FIRST_BACK_OFF = PULL_DOOR_BACK_OFF(100ms) + FIRST_BACK_OFF_WINDOW (Random (0~15)) * RRL (20ms)

Ex. Min 100ms, Max 400ms

[BACK-OFF TIME WHEN SECOND DISTANCE RE-MEASUREMENT]

SECOND_BACK_OFF = PULL_DOOR_BACK_OFF + SECOND_BACK_OFF_WINDOW (Random (0 ~ 10)) * RRL (20ms) \

Ex. Min 100, Max 300ms

[BACK-OFF TIME WHEN THIRD DISTANCE RE-MEASUREMENT UNTIL SUCCESSFUL DISTANCE MEASUREMENT]

LAST_BACK_OFF = PULL_DOOR_BACK_OFF + LAST_BACK_OFF_WINDOW (Random(0 ~ 5)) * RRL (20ms): (MIN_LAST_BACK_OFF, MAX_LAST_BACK_OFF)

[BACK-OFF TIME AFTER AT LEAST ONE SUCCESSFUL DISTANCE MEASUREMENT]

SUCCESS_BACK_OFF = FIRST_BACK_OFF + SUCCESS_BACK_OFF_WINDOW (Random(0 ~ 20)) * RRL (20ms): (MIN_SUCCESS_BACK_OFF, MAX_SUCCESS_BACK_OFF)

Ex Min 400ms, Max 800ms

FIG. 29

| |
|---|
| NRD_MAX_RANGE = |
| BASIC_DURATION(ms) * MAX_DISTANCE_VALUE (5) + NRD_MAX_RANGE_WINDOW (Random (0 ~ 20)) * RRL (20ms): (MIN_NRD_MAX_RANGE, MAX_NRD_MAX_RANGE) |
| Ex) |
| NRD_MAX_RANGE = 200ms * 5 + Random(0 ~ 20) * 20ms: (Min 1000ms, Max 1400ms) |
| Case 1: SECURE_DISTANCE (2m) < FORECAST_DISTANCE ≤ MAX_DISTANCE_VALUE (5m) |
| a. BASIC_DURATION (ms) = MAX_FIRST_BACK_OFF / SECURE_DISTANCE = 200ms<br>b. FORECAST_DISTANCE (m) = |
| The last measured distance (m) − The elapsed time from the time of the last measure * AWSH (1.5m/s) |
| c. NRD_OUT_RANGE(ms) = |
| BASIC_DURATION(ms) * FORECAST_DISTANCE // RRL * RRL: (MIN_NRD_OUT_RANGE, MAX_NRD_OUT_RANGE), where "//" is quotient operator |
| Ex) |
| NRD_OUT_RANGE = 200ms * Forecast Distance // 20ms * 20ms: (Min 400ms, Max 1000ms) |
| Case 2: MAX_DISTANCE_VALUE (5m) < FORECAST_DISTANCE (5m) |
| NRD_MAX_RANGE(ms) = |
| BASIC_DURATION * MAX_DISTANCE_VALUE + NRD_MAX_RANGE_WINDOW (Random(0 ~ 20)) * RRL (20ms): (MIN_NRD_MAX_RANGE, MAX_NRD_MAX_RANGE) |
| Ex) |
| NRD_MAX_RANGE = 200ms * 5 + Random(0 ~ 20) * 20ms: (Min 1000ms, Max 1400ms) |

FIG. 32

| NORMAL_BACK_OFF (ms) = MAX_FIRST_BACK_OFF(ms) + NORMAL_BACK_OFF_WINDOW (Random(0 ~ 20)) * RRL (20ms): (MIN_NORMAL_BACK_OFF, MAX_NORMAL_BACK_OFF) |
|---|
| (Random(0 ~ 20)) * RRL (20ms): (MIN_NORMAL_BACK_OFF, MAX_NORMAL_BACK_OFF) |

METHOD AND DEVICE FOR PERFORMING SCHEDULING BY USING ALTERNATIVE SIGNALS IN WIRELESS COMMUNICATION SYSTEM

CROSS-REFERENCE TO RELATED APPLICATION(S)

This application is based on and claims priority under 35 U.S.C. § 119 to Korean Patent Application Nos. 10-2018-0129337, filed on Oct. 26, 2018, 10-2018-0157481, filed on Dec. 7, 2018, and 10-2019-0030020, filed on Mar. 15, 2019, in the Korean Intellectual Property Office, the disclosures of which are incorporated by reference herein in their entireties.

BACKGROUND

1. Field

The disclosure relates to a method and device for performing scheduling by using alternative signals in a wireless communication system.

2. Description of Related Art

The Internet has evolved from a human-based connection network, where humans create and consume information, to the Internet of Things (IoT), where distributed elements such as objects exchange and process information. Internet of Everything (IoE) technology has emerged, in which the IoT technology is combined with, for example, technology for processing big data through connection with a cloud server. Various technological elements such as sensing technology, wired/wireless communication and network infrastructures, service interface technology, and security technology are required to implement the IoT, and technologies related to sensor networks, machine-to-machine (M2M) communication, and machine-type communication (MTC) for connecting objects have recently been studied. In the IoT environment, intelligent Internet technology (IT) services may be provided to collect and analyze data obtained from connected objects to create new value in human life. As existing information technology (IT) and various industries converge and combine with each other, the IoT may be applied to various fields such as smart homes, smart buildings, smart cities, smart cars or connected cars, smart grids, healthcare, smart home appliances, and advanced medical services.

Various services are able to be provided due to the development of wireless communication systems, and thus a method capable of efficiently providing these services would improve the related technologies. A method of efficiently transceiving data among a plurality of electronic devices would also improve the related technologies.

SUMMARY

Provided are a method and a device for performing scheduling by using alternative signals in a wireless communication system.

Additional aspects will be set forth in part in the description which follows and, in part, will be apparent from the description, or may be learned by practice of the presented embodiments.

In accordance with an aspect of the disclosure, a method of operating a controller that performs a ranging with a controlee using ultra wideband (UWB) communication in a wireless communication system, the method includes: transmitting, to the controlee, a first ranging control message (RCM) comprising information of a first ranging interval for a second RCM; changing a ranging interval for the second RCM from the first ranging interval to a second ranging interval; transmitting, to the controlee, an interval update message for the second RCM comprising information for the changed ranging interval based on the first ranging interval; and transmitting, to the controlee, the second RCM based on the changed ranging interval.

In accordance with another aspect of the disclosure, a method of operating a controlee that performs a ranging with a controller using ultra wideband (UWB) communication in a wireless communication system, the method includes: receiving, from the controller, a first ranging control message (RCM) comprising information of a first ranging interval for a second RCM; receiving, from the controller, based on the first ranging interval, an interval update message for the second RCM comprising information for a second ranging interval, wherein a ranging interval for the second RCM is changed from the first ranging interval to the second ranging interval; and receiving, from the controller, the second RCM based on the second ranging interval.

In accordance with another aspect of the disclosure, a controller that performs a ranging with a controlee using ultra wideband (UWB) communication in a wireless communication system, the controller includes: a transceiver; a memory; and a processor configured to: transmit, to the controlee, a first ranging control message (RCM) comprising information of a first ranging interval for a second RCM, change a ranging interval for the second RCM from the first ranging interval to a second ranging interval, transmit, to the controlee, an interval update message for the second RCM comprising information for the changed ranging interval based on the first ranging interval, and transmit, to the controlee, the second RCM based on the changed ranging interval.

In accordance with another aspect of the disclosure, a non-transitory computer-readable recording medium has recorded thereon instruction executable by at least one processor to perform the method of the controller.

In accordance with another aspect of the disclosure, a non-transitory computer-readable recording medium has recorded thereon instruction executable by at least one processor to perform the method of the controlee.

BRIEF DESCRIPTION OF THE DRAWINGS

The above and other aspects, features, and advantages of certain embodiments of the present disclosure will be more apparent from the following description taken in conjunction with the accompanying drawings, in which:

FIG. 2B illustrates an operation method of an electronic device, according to an embodiment;

FIG. 3 illustrates a configuration of discovery information, according to an embodiment;

FIG. 8 illustrates a configuration of check message information, according to an embodiment;

FIG. 9 illustrates a configuration of a contention free period (CFP) frequency of occupancy (CFOO) value, according to an embodiment;

FIG. 26 illustrates an example of a method of determining an estimated entry time into a specific range from an electronic device, according to an embodiment;

FIG. 27 illustrates an example of a back-off time related to a success or a failure in distance measurement when an electronic device enters a specific distance, according to an embodiment;

FIG. 29 illustrates a method of determining a NRD_MAX_RANGE value, according to an embodiment;

FIG. 32 illustrates a method of determining a value of NORMAL_BACK_OFF, according to an embodiment;

DETAILED DESCRIPTION

Figure 1A:
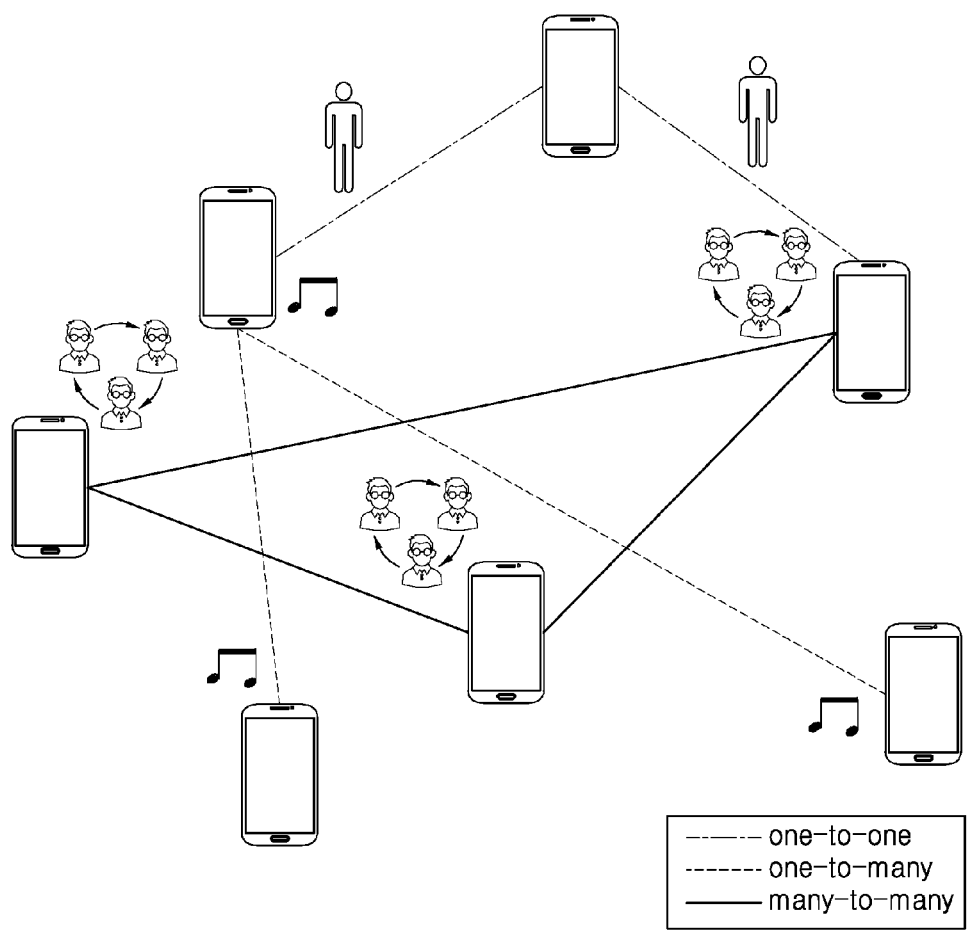
FIG. 1A is a diagram for describing a general Device-to-Device (D2D) communication procedure.

Embodiments will now be described more fully with reference to the accompanying drawings so as to enable one of ordinary skill in the art to perform the disclosure without any difficulty. The disclosure may, however, be embodied in many different forms and should not be construed as being limited to the embodiments set forth herein. In addition, like reference numerals will denote like elements throughout the specification.

All terms used in the disclosure are general terms that are selected in consideration of their functions in the disclosure and are currently widely used. However, the terms may have different meanings according to an intention of one of ordinary skill in the art, precedent cases, or the appearance of new technologies. Therefore, the terms used in the disclosure should not be interpreted based on only their names but based on the meaning of the terms together with the descriptions throughout the specification.

While terms "first" and "second" may be used to describe various components, it is understood that the components are not limited to the terms "first" and "second." The terms "first" and "second" are used only to distinguish between each of components.

Furthermore, all examples and conditional language recited herein are to be construed as being without limitation to such specifically recited examples and conditions. A singular form may include plural forms, unless there is a particular description contrary thereto. Throughout the specification, it will also be understood that when an element is referred to as being "connected to" or "coupled with" another element, it can be directly connected to or coupled with the other element, or it can be electrically connected to or coupled with the other element by having an intervening element interposed therebetween. Also, when a part "includes" or "comprises" an element, unless there is a particular description contrary thereto, the part can further include other elements, not excluding the other elements.

Throughout the specification, the use of the term "the" and similar indicating terms may correspond to singular and plural forms. Also, an order of operations performed by methods according to the disclosure may be changed unless there is a particular description about the order of operations. Therefore, the disclosure is not limited to the order of operations.

The expression "some embodiments" or "an embodiment" recited throughout the specification does not necessarily indicate the same embodiment.

An embodiment of the disclosure may be described in terms of functional block components and various processing steps. Some or all of functional blocks may be realized by any number of hardware and/or software components configured to perform the specified functions. For example, the functional blocks of the disclosure may be implemented by one or more microprocessors or may be implemented by circuit components for predetermined functions. In addition, for example, the functional blocks of the disclosure may be implemented with any programming or various scripting languages. The functional blocks may be implemented in algorithms that are executed on one or more processors. Furthermore, the disclosure may employ any number of techniques according to the related art for electronics configuration, signal processing and/or data processing, and the like. The terms "mechanism," "element," and "unit" are used broadly and are not limited to mechanical or physical embodiments.

Furthermore, the connecting lines, or connectors shown in the various figures presented are intended to represent exemplary functional relationships and/or physical or logical couplings between the various elements. It should be noted that many alternative or additional functional relationships, physical connections or logical connections may be present in a practical device.

Throughout the disclosure, expressions such as "at least one of a, b or c" indicates only a, only b, only c, both a and b, both a and c, both b and c, all of a, b, and c, or variations thereof.

In general, a wireless sensor network technology is broadly classified into a wireless local area network (WLAN) and a wireless personal area network (WPAN) according to coverage. In this regard, the WLAN refers to a technology that is based on the Institute of Electrical and Electronics Engineers (IEEE) 802.11 and is capable of accessing a backbone network within a range of 100 m. Also, the WPAN refers to a technology that is based on the IEEE 802.15 and includes Bluetooth, ZigBee, ultra-wide-band (UWB), or the like. A wireless sensor network in which the wireless sensor network technology is implemented consists of a plurality of communication electronic devices. In this regard, the communication electronic devices perform communication in an ACTIVE period by using a single channel. That is, the communication electronic devices collect a packet in real time, and transmit the collected packet in the ACTIVE period.

The UWB may refer to a short range high-speed wireless communication technology using a wide frequency band of at least several GHz, a low spectrum density, and a small pulse bandwidth (1 to 4 nsec) in a baseband state. The UWB may indicate a bandwidth itself to which UWB communication is applied. Hereinafter, a communication method by electronic devices will now be described based on the UWB, but this is only an example and the communication method may be applied to various wireless communication technologies in a practical use.

An electronic device according to embodiments may include a mobile phone, a smartphone, a mobile terminal, a laptop computer, a terminal for digital broadcasting, a personal digital assistant (PDA), a portable multimedia player (PMP), navigation, a slate personal computer (slate PC), a tablet personal computer (PC), an ultrabook, a telematics terminal, a digital television (digital TV), a desktop computer, a refrigerator, a projector, a vehicle, a smart car, a printer, or the like.

Embodiments will now be described more fully with reference to the accompanying drawings.

FIG. 1A is a diagram for describing a general Device-to-Device (D2D) communication procedure.

D2D communication refers to direct communication between geographically adjacent electronic devices, without using infrastructure such as a base station or access point. The D2D communication may use an unlicensed frequency band such as Wi-Fi Direct or Bluetooth. Also, the D2D communication may use a licensed frequency band, thereby improving frequency usage efficiency of a cellular system. The D2D communication may be limitedly used as a term that indicates communication between objects or machine to machine (M2M) communication, but in the disclosure, the D2D communication may totally include communication between not only simple devices embedded with a communication function but also communication between various types of devices such as smartphones or personal computers having a communication function.

Peer Aware Communication (PAC) is a communication scheme for a device and a service in a short range and is one of the technologies of the D2D communication. In the PAC, a D2D electronic device may be called a Peer Aware Communication Device (PD).

As illustrated in FIG. 1A, in the PAC, there may be a one-to-one communication scheme by which one PD communicates with another PD, a one-to-many communication scheme by which one PD communicates with a plurality of PDs, and a many-to-many communication scheme by which a plurality of PDs communicate with a plurality of PDs.

In a wireless communication system according to embodiments, a synchronization header (SHR) preamble may be transmitted as a head of a frame so as to obtain synchronization between a transmitter and a receiver. The SHR preamble may be a signal agreed between the transmitter and the receiver. In the wireless communication system, the SHR preamble may be determined to allow fast synchronization between the transmitter and the receiver via a start point of the frame.

Figure 1B:
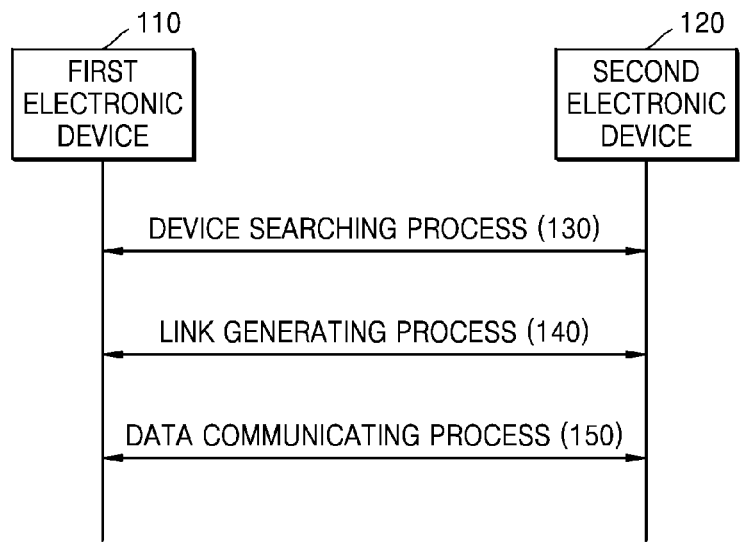
FIG. 1B illustrates communication processes, according to an embodiment.

FIG. 1B illustrates communication processes, according to an embodiment.

Referring to FIG. 1B, a first electronic device 110 and a second electronic device 120 may mutually perform communication via a device searching process 130, a link generating process 140, and a data communicating process 150.

In the device searching process 130, each of the first electronic device 110 and the second electronic device 120 may search for other electronic devices that are enabled for the D2D communication and are from among electronic devices around the first electronic device 110 and the second electronic device 120. In the device searching process 130, each of the first electronic device 110 and the second electronic device 120 may determine whether to generate a link for the D2D communication. For example, the first electronic device 110 may transmit a search signal to allow the second electronic device 120 to discover the first electronic device 110. Also, the first electronic device 110 may receive a search signal transmitted from the second electronic device 120 and thus may recognize that other electronic devices enabled for the D2D communication are present in a D2D communication range. The first electronic device 110 may include, in the search signal, discovery information as an identifier of the first electronic device 110 and may transmit the search signal.

The search signal may include various parameters such as a channel number, a mean pulse repetition frequency (PRF), a data rate, a preamble symbol length, a start-of-frame delimiter (SFD) length, a UWB version, media access control (MAC) address list/group identification (ID)/App ID (discovery information), or the like.

In detail, the channel number may indicate a number of a channel through which data is transceived. The PRF may determine possible preamble code indices. Also, the PRF may indicate a value obtained by dividing the total number of pulses within a pulse by symbol duration. The data rate may refer to a value indicating how many data bits (1 or 0) can be transmitted during a unit time. The preamble symbol length may refer to a length of a preamble symbol. The SFD length may refer to a length of a bit string configured directly after a preamble, in the vicinity of a start point of the frame. The UWB version may indicate version information of the UWB. MAC address list/group ID/App ID may be referred to as the discovery information. The discovery information will be described below with reference to FIG. 3.

In the link generating process 140, each of the first electronic device 110 and the second electronic device 120 may generate a data transmission link for an electronic device to which data is to be transmitted from among electronic devices discovered in the device searching process 130. For example, the first electronic device 110 may generate a data transmission link for the second electronic device 120 discovered by the first electronic device 110 in the device searching process 130.

In the data communicating process 150, the first electronic device 110 and the second electronic device 120 may transceive data with respective devices for which links have been generated in the link generating process 140. For example, the first electronic device 110 may transceive data with the second electronic device 120 via the data transmission link generated in the link generating process 140.

Figure 2A:
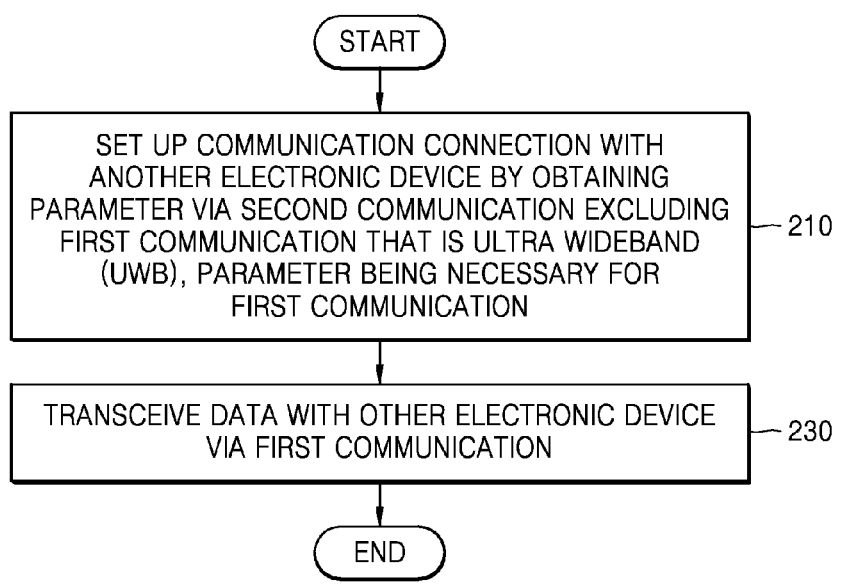
FIG. 2A illustrates an operation method of an electronic device, according to an embodiment.

FIG. 2A illustrates an operation method of an electronic device, according to an embodiment.

Referring to FIG. 2A, in operation 210, the electronic device may set up a communication connection with another electronic device by obtaining a parameter via a second communication different from a first communication that is an UWB, the parameter being used to establish the first communication.

In operation 230, the electronic device may transceive data with the other electronic device via the first communication.

The first communication according to one or more embodiments may implement at least one of IEEE 802.15.4 or IEEE 802.15.8, though other embodiments are not limited thereto.

When the electronic device exchanges a parameter with the other electronic device, the electronic device may exchange mode information. By way of example, mode=1 indicates a ranging procedure based on 802.15.8 MAC, and mode=2 indicates a ranging procedure based on 802.15.4 MAC. Alternatively, in a case where a plurality of electronic devices mutually know mode information of each other before a parameter exchange occurs, the plurality of electronic devices do not exchange the mode information in a parameter exchange process and directly use the mode information in a ranging procedure.

FIG. 2B illustrates an operation method of an electronic device, according to an embodiment.

Referring to FIG. 2B, in operation 210, the electronic device may obtain, via a second communication, a parameter for first communication so as to set up a communication connection with another electronic device.

In operation 220, the electronic device may check a SHR preamble and a Contention Free Period (CFP) slot corresponding to the SHR preamble, which are available in the first communication.

In operation 235, the electronic device may transceive data with the other electronic device via the first communication, based on a result of the check.

The parameter may include at least one of a MAC address, a group ID, and an application ID.

The operation method of the electronic device may further include checking, via the second communication, the SHR preamble and the CFP slot that are available in the first communication.

The transceiving of the data may include transceiving data with the other electronic device via the first communication, based on a result of the checking.

The checking of the SHR preamble and the CFP slot may include checking a usage state of the CFP slot, based on Sync frames respectively corresponding to some SHR preambles from among a plurality of SHR preambles.

The checking of the SHR preamble and the CFP slot may include transmitting, to the other electronic device, a check message including information about the usage state of the CFP slot.

The checking of the SHR preamble and the CFP slot may further include receiving, when (e.g., based on) the SHR preamble and the CFP slot that are available are present, information about the available SHR preamble and the available CFP slot from the other electronic device.

The checking of the SHR preamble and the CFP slot may further include receiving, when (e.g., based on) the SHR preamble and the CFP slot are not available, an unavailability notice message from the other electronic device.

The transceiving of the data with the other electronic device via the first communication may include broadcasting the information about the available CFP slot via a Sync frame.

The transceiving of the data with the other electronic device via the first communication may also include performing pairing with the other electronic device in a Contention Access Period (CAP) by using the parameter.

Furthermore, the transceiving of the data with the other electronic device via the first communication may include transceiving data by using the SHR preamble and the CFP slot that are available in the first communication.

FIG. 3 illustrates a configuration of discovery information 300, according to an embodiment.

In the device searching process 130 of FIG. 1B, the first electronic device 110 may include, in the search signal, the discovery information 300 as an identifier of the first electronic device 110 and may transmit the search signal including the discovery information 300.

The discovery information 300 may include a PD MAC address, a group ID, and an application ID. Alternatively, at least one of the PD MAC address, the group ID, or the application ID may be referred to as the discovery information 300. The PD MAC address may also be referred to as a MAC address list.

The PD MAC address may indicate a physical address implemented on hardware so as to identify a PD. The group ID may indicate information for identifying a group. The application ID may indicate information for identifying an application. The PD MAC address may consist of 48 bits, the group ID may consist of 16 bits, and the application ID may consist of 104 bits. However, the aforementioned bit number is merely an example and therefore, the PD MAC address, the group ID, and the application ID may include various numbers of bits.

Figure 4:
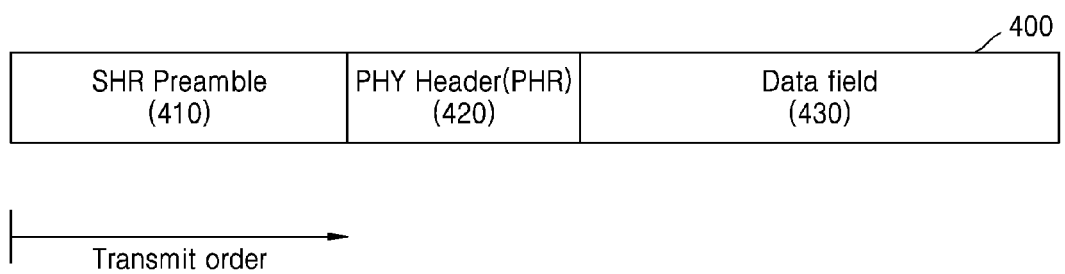
FIG. 4 illustrates a structure of a ultra-wideband (UWB) PHY frame, according to an embodiment.

FIG. 4 illustrates a structure of a UWB PHY frame 400, according to an embodiment.

The UWB PHY frame 400 may include an SHR preamble 410, a PHY header (PHR) 420, and a data field 430.

The SHR preamble 410 may be used in an automatic gain control (AGC), signal acquisition, frequency offset estimation, packet synchronization, channel estimation, ranging, or the like. In detail, the SHR preamble 410 may be added, prior to the PHR 420, for a receiver algorithm related to AGC setting, antenna diversity selection, timing acquisition, a frequency recovery, packet and frame synchronization, channel estimation, and leading-edge signal tracking for ranging. The SHR preamble 410 may be referred to as a preamble code.

The PHR 420 may include content of a physical (PHY) protocol data unit (PPDU) and information about a protocol used in transmitting the PPDU.

The data field 430 may include data that is transceived.

Figure 5:
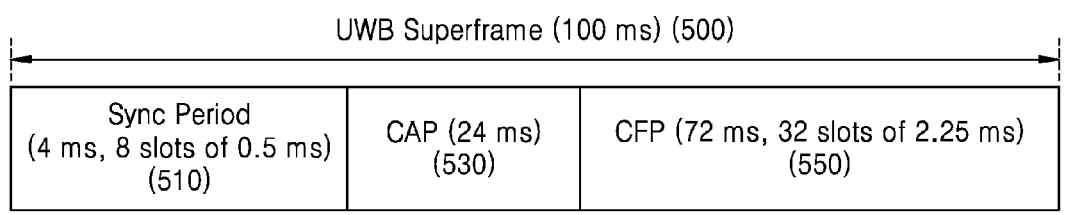
FIG. 5 illustrates a structure of an UWB superframe, according to an embodiment.

FIG. 5 illustrates a structure of an UWB superframe 500, according to an embodiment.

The UWB superframe 500 may include a synchronization period (Sync period) 510, a CAP 530, and a CFP 550.

An electronic device according to an embodiment may perform communication based on the UWB superframe 500. As illustrated in FIG. 5, a length of the UWB superframe 500 is 100 ms and may include the Sync period 510, the CAP 530, and the CFP 550. The Sync period 510 may include 8 synchronization slots having a same length. A synchronization slot from among a plurality of synchronization slots that is to be used in transmitting a Sync frame may be determined.

The Sync period 510 may include 8 synchronization slots, and in the Sync period 510, one slot has a time duration of 0.5 ms. The Sync period 510 may have a time duration of 4 ms.

In this regard, the first electronic device 110 attempting to communicate without contention may inform the second electronic device 120 of information about a slot of the CFP 550 by broadcasting the information through a Sync frame during the Sync period 510. The second electronic device 120 may recognize the information about the slot of the CFP 550, the slot being currently used, through the received Sync frame. The second electronic device 120 may determine a slot of the CFP 550 that is not the currently-used slot of the CFP 550, and may inform the first electronic device 110 of the determined slot through a Sync frame.

Alternatively, a plurality of electronic devices may configure one group, and at least one electronic device included in the configured group may representatively inform whether to use a slot of the CFP 550 through a Sync frame.

The CAP 530 may have a time duration of 24 ms. Electronic devices may perform mutual pairing through a slot of the CAP 530. As will be described below with reference to FIG. 7, the first electronic device 110 may perform pairing with the second electronic device 120 through the CAP 530.

The CFP 550 may include 32 slots, and in the CFP 550, one slot has a time duration of 2.25 ms. The CFP 550 may have a time duration of 72 ms. Electronic devices that are each allocated a slot of the CFP 550 may perform communication without collision and interference.

Figure 6:
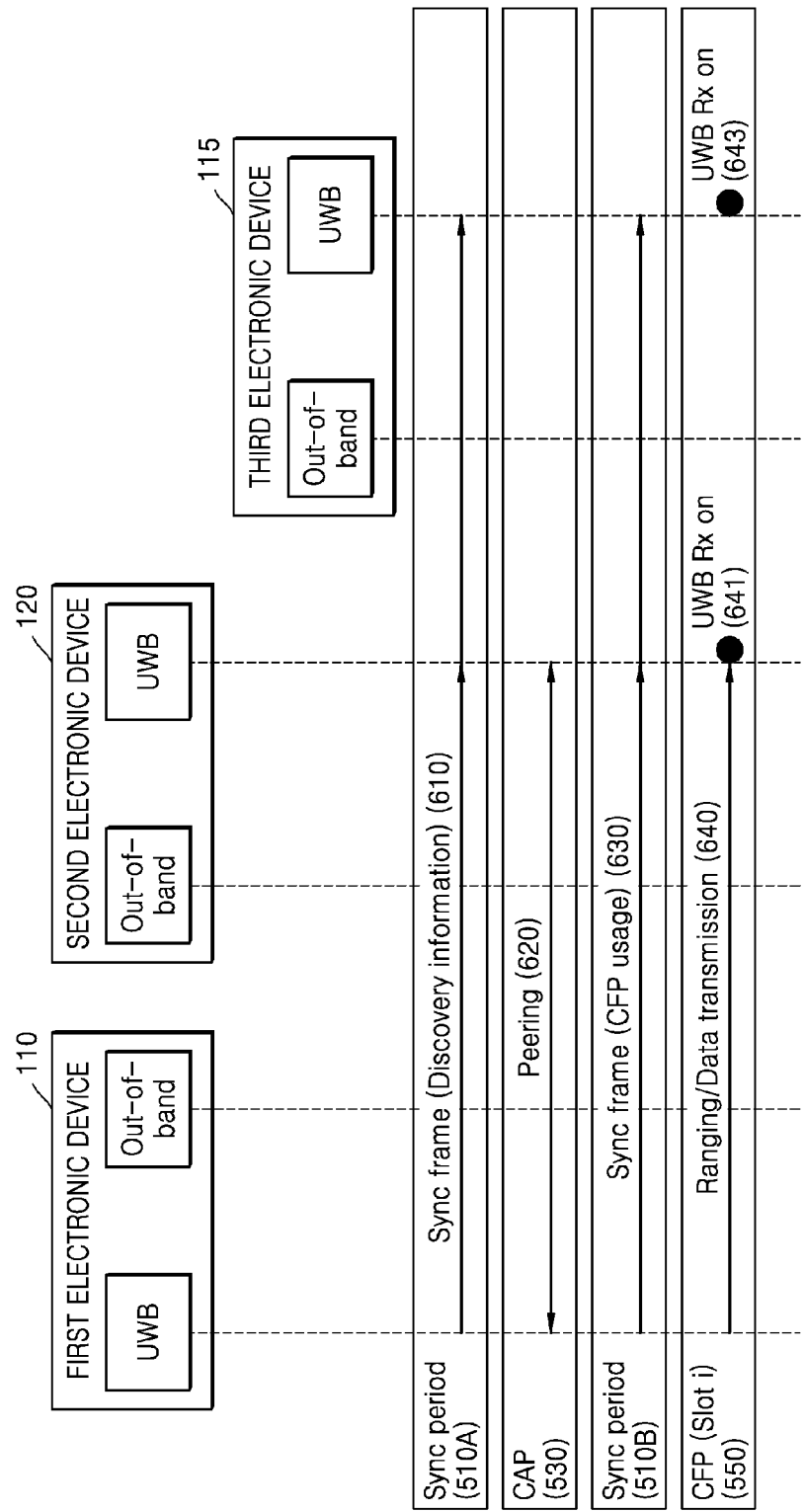
FIG. 6 illustrates a communication process using a UWB according to an embodiment.

FIG. 6 illustrates a communication process using a UWB according to an embodiment.

Referring to the wireless communication system illustrated in FIG. 6, it is assumed that the first electronic device 110, the second electronic device 120, and a third electronic device 115 are present. Furthermore, it is assumed that the third electronic device 115 is paired with the first electronic device 110. Each of the first electronic device 110, the second electronic device 120, and the third electronic device 115 may correspond to a single electronic device or may correspond to a plurality of electronic devices.

According to an embodiment described with reference to FIG. 6, the first electronic device 110, the second electronic device 120, and the third electronic device 115 may perform communication by using a UWB.

The first electronic device 110 attempts to transmit data to the second electronic device 120 via the CFP 550.

In operation 610, the first electronic device 110 may transmit a Sync frame to the second electronic device 120 and the third electronic device 115 via a Sync period 510A. The Sync frame may include the discovery information described above with reference to FIG. 3.

In operation 620, the first electronic device 110 may perform pairing with the second electronic device 120 via the CAP 530.

In operation 630, the first electronic device 110 may transmit a Sync frame to the second electronic device 120 and the third electronic device 115 via a Sync period 510B. The Sync frame may include usage information about a CFP slot. The usage information about the CFP slot will be described below with reference to FIG. 9.

In operation 640, the first electronic device 110 may perform a ranging operation and data transmission or reception with respect to the second electronic device 120 by using an available CFP slot via the CFP 550. A principle of the ranging operation, which will be described below with reference to FIGS. 11 and 12, may be applied to the ranging operation.

Referring to reference numerals 641 and 643 of FIG. 6, the second electronic device 120 and the third electronic device 115 may operate their respective receivers.

Figure 7:
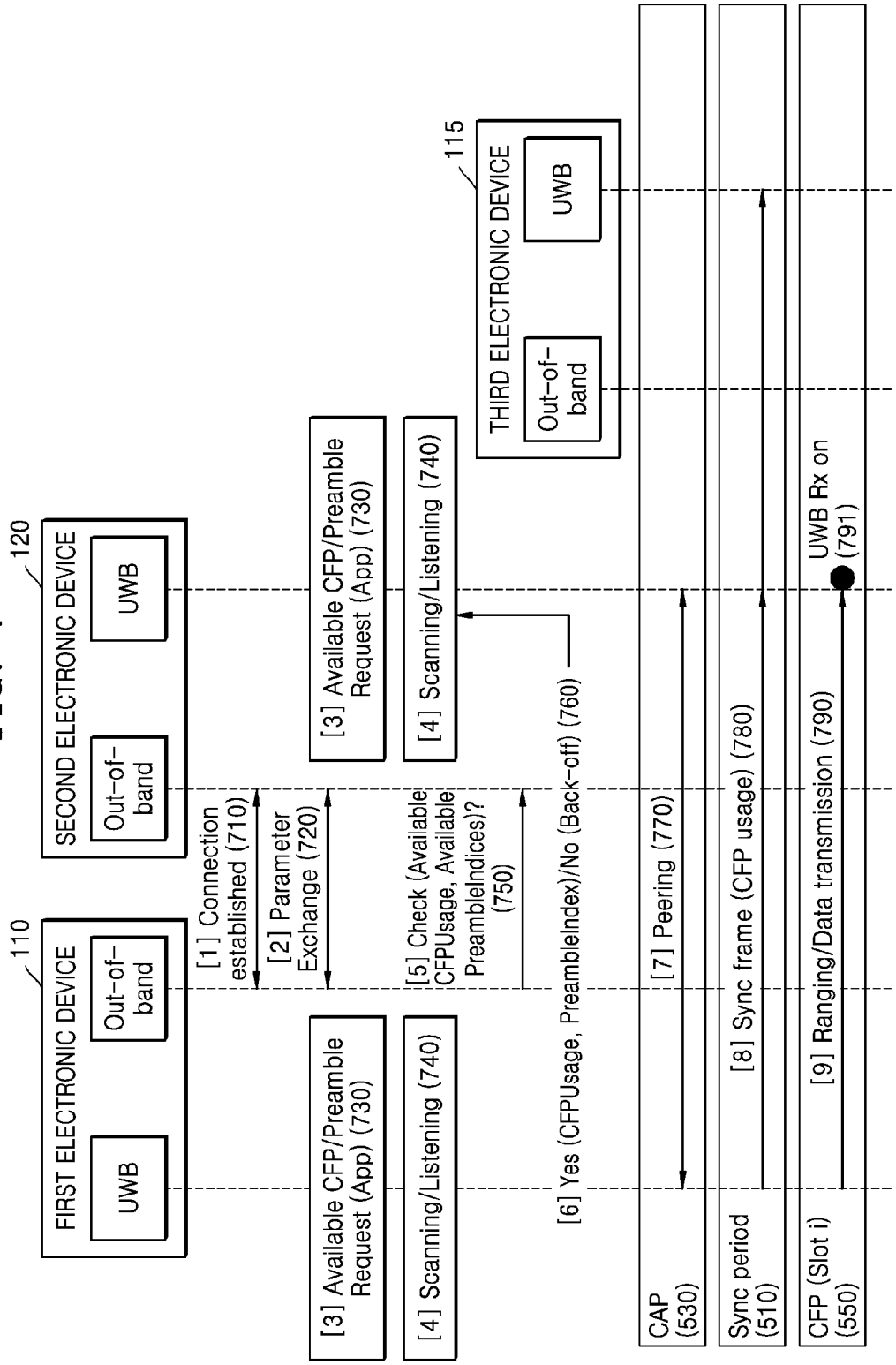
FIG. 7 illustrates a communication process excluding a UWB and a communication process using the UWB, according to one or more embodiments.

FIG. 7 illustrates a communication process excluding a UWB and a communication process using the UWB, according to an embodiment.

Hereinafter, for convenience of description, communication excluding (i.e., distinct from) the UWB is referred to as second communication, and the UWB is referred to as first communication.

In a wireless communication system described with reference to FIG. 7, it is assumed that the first electronic device 110, the second electronic device 120, and the third electronic device 115 are present. It is further assumed that the third electronic device 115 is paired with the first electronic device 110. Each of the first electronic device 110, the second electronic device 120, and the third electronic device 115 may correspond to a single electronic device or may correspond to a plurality of electronic devices.

The first electronic device 110 attempts to transmit data to the second electronic device 120 by using the first communication via the CFP 550.

In operation 710, the first electronic device 110 may set up communication connection to the second electronic device 120 by using the second communication. Communication using the second communication may include at least one of 3rd generation (3G), long term evolution (LTE), 4th generation (4G), 5th generation (5G), wireless fidelity (WiFi), light fidelity (LiFi), wireless gigabit alliance (WiGig), Bluetooth, Bluetooth low energy (BLE), ZigBee, near field communication (NFC), magnetic secure transmission, radio frequency (RF), or body area network (BAN). However, the disclosure is not limited to the aforementioned examples, and all available wireless communication technologies may be used as the communication using the second communication.

In operation 720, the first electronic device 110 may exchange a parameter for the first communication with the second electronic device 120 by using the second communication. As described above with reference to FIG. 1B, the parameter may include a channel number, a PRF (implying the possible preamble code indices), a data rate, a preamble symbol length, an SFD length, UWB version information, MAC address list/group ID/application ID (discovery information), or the like. The parameter may include the discovery information described with reference to FIG. 3.

In operation 730, respective applications of the first electronic device 110 and the second electronic device 120 may request, for the first communication, scanning with respect to a CFP slot and an SHR preamble that are available in the first communication. However, one or more other embodiments are not limited to the applications and, for example, processors respectively included in the first electronic device 110 and the second electronic device 120 may also perform a scanning request operation.

In operation 740, the first electronic device 110 and the second electronic device 120 may check, by performing a scanning/listening operation, a usage state of the CFP slot through a Sync frame corresponding to the SHR preamble. In detail, the first electronic device 110 and the second electronic device 120 may check the usage state of the CFP slot, based on Sync frames respectively corresponding to one or more SHR preambles that are available from among a plurality of SHR preambles.

In operation 750, the first electronic device 110 may transmit, to the second electronic device 120, a check message including usage information about the CFP slot by using the second communication.

In operation 760, the second electronic device 120 receives the check message, and when (e.g., based on) an available SHR preamble and an available CFP slot are present, the second electronic device 120 may transmit information about the SHR preamble and the CFP slot to the first electronic device 110. A configuration of the check message will be described below with reference to FIGS. 9 and 10.

The second electronic device 120 receives the check message, and when (e.g., based on) the available SHR preamble and the available CFP slot are not present, the second electronic device 120 may transmit, to the first electronic device 110, an unavailability notice message indicating that the available SHR preamble and the available CFP slot are not present. Then, returning to operation 740, the first electronic device 110 and the second electronic device 120 may check, by performing the scanning/listening operation, the usage state of the CFP slot through the Sync frame corresponding to the SHR preamble, and may stand by until an available SHR preamble and an available CFP slot are present.

The aforementioned descriptions may be equally applied to a case in which the first electronic device 110 receives a check message from the second electronic device 120.

In operation 770, the first electronic device 110 may perform pairing with the second electronic device 120 via the CAP 530 by using the first communication.

In operation 780, the first electronic device 110 may transmit the Sync frame to the second electronic device 120 and the third electronic device 115 via a Sync period 510 by using the first communication. The Sync frame may include the usage information about the CFP slot. The usage information about the CFP slot will be described below with reference to FIG. 9.

In operation 790, the first electronic device 110 may perform a ranging operation and data transmission or reception with respect to the second electronic device 120 by using the first communication and an available CFP slot in the CFP 550. A principle of the ranging operation, which will be described below with reference to FIGS. 11 and 12, may be applied to the ranging operation.

Referring to reference numeral 791 of FIG. 7, only the second electronic device 120, and not the third electronic device 115, may operate its receiver.

FIG. 8 illustrates a configuration of check message information, according to an embodiment.

Referring to FIG. 8, an octet of a CFP slot usage (CSU) bitmap has a value of 4, and the value of 4 of the octet may indicate 32 bits. As described above with reference to FIG. 5, the CFP 550 may consist of 32 slots, and bits of the CSU bitmap may correspond to respective slots of the CFP 550. For example, a $0^{th}$ bit of the CSU bitmap may correspond to a $0^{th}$ slot of the CFP 550, and a $31^{st}$ bit of the CSU bitmap may correspond to a $31^{st}$ slot of the CFP 550. When (e.g., based on) each bit of the CSU bitmap is "1," the slots of the CFP 550 may indicate an available state, and when each bit of the CSU bitmap is "0," the slots of the CFP 550 may indicate an unavailable state. It is understood, however, that one or more other embodiments are not limited to the aforementioned example and, by way of example, indications of "1" and "0" may be switched.

A CFP frequency of occupancy (CFOO) field may indicate the number of superframes that are not used between CFPs. A configuration of the CFOO field will be described below with reference to FIG. 10.

Preamble code may correspond to the SHR preamble 410 described above with reference to FIG. 4, and Preamble code index indicates a preamble code to be used in the first communication by each of a plurality of electronic devices. Different preamble codes may be distinguished therebetween according to the Preamble code index.

FIG. 9 illustrates a configuration of a CFOO value, according to an embodiment.

The CFOO value may designate the number of superframes not to be used. As described above with reference to FIG. 5, the UWB superframe 500 may have a length of 100 ms. This may mean that a maximum total of 10 superframes 500 may be transmitted per second.

When the CFOO value is "0," this may indicate that all superframes are used, and because 10 superframes are present per second, a usage frequency is 10 Hz. This may be calculated based on 10/(0+1)=10. When the CFOO value is "1," this may indicate that the number of superframes that are not used is 1, and thus, a usage frequency is 5 Hz. This may be calculated based on 10/(1+1)=5. When the CFOO value is "99," this may indicate that the number of superframes that are not used is 99, and thus, a usage frequency is 0.1 Hz. This may be calculated based on 10/(99+1)=0.1.

Figure 10:
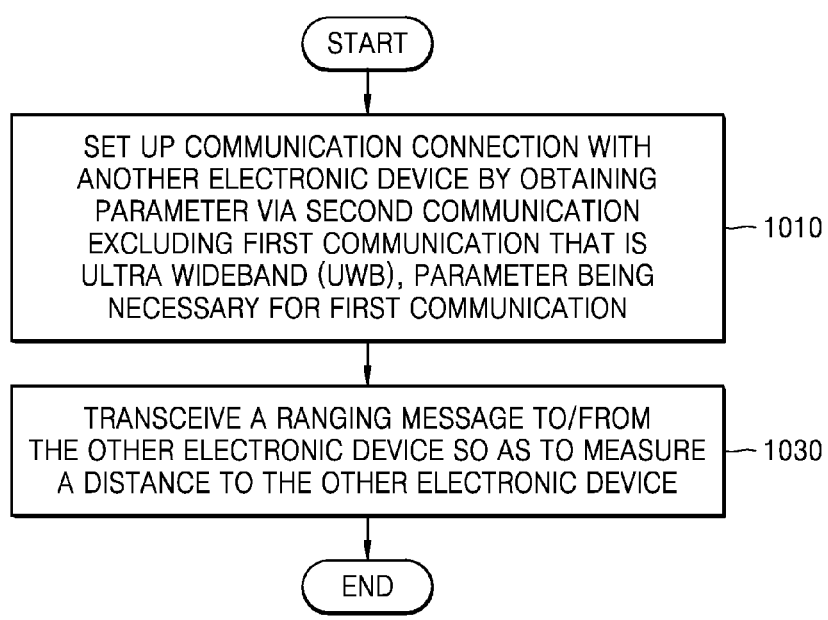
FIG. 10 is a flowchart of an operation method of an electronic device, according to an embodiment.

FIG. 10 is a flowchart of an operation method of an electronic device, according to an embodiment.

Referring to FIG. 10, in operation 1010, the electronic device may set up a communication connection to another electronic device by obtaining a parameter for first communication via a second communication distinct from the first communication that is an UWB.

In operation 1030, the electronic device may transceive a ranging message to/from the other electronic device so as to measure a distance to the other electronic device.

The parameter may include at least one of a MAC address, a group ID, and an application ID.

The transceiving of the data described with reference to FIG. 2B may include transceiving the ranging message to/from the other electronic device so as to measure the distance to the other electronic device.

Also, the transceiving of the ranging message to/from the other electronic device may include: transmitting a ranging initiation message including ranging duration data to the other electronic device; receiving a ranging response message from the other electronic device; and transmitting a ranging end message to the other electronic device.

Furthermore, the transceiving of the ranging message to/from the other electronic device may include transmitting the ranging initiation message to the other electronic device when (e.g., based on) a predetermined event (e.g., Pull Door) occurs.

Additionally, the transceiving of the ranging message to/from the other electronic device may include checking whether the other electronic device is located within a distance (SECURE_DISTANCE) that is preset with the other electronic device.

When (e.g., based on) measuring the distance to the other electronic device fails, the transceiving of the ranging message to/from the other electronic device may include determining a first back-off that is a time for re-transmitting the ranging message to the other electronic device.

Furthermore, when (e.g., based on) measuring the distance to the other electronic device is successful, the transceiving of the ranging message to/from the other electronic device may include determining a second back-off that is a time for re-transmitting the ranging message to the other electronic device.

A ranging packets exchanging time (RPET) may indicate a time during which ranging packets are exchanged between anchors of a first electronic device and a second electronic device. A default value of the RPET may be 20 ms (e.g., Ranging Packets Exchanging Time between the anchors of Vehicle and Smartphone, default is 20 ms).

SECURE_DISTANCE may indicate a distance in which a door of the first electronic device should be unlocked. SECURE_DISTANCE may indicate a length of a radius of a circle where a certain point of the first electronic device is centered. A default value of SECURE_DISTANCE may be 2 m (e.g., SECURE_DISTANCE: Distance(m) that should unlock the door, default is 2 m).

An average walking speed of human (AWSH) may indicate an average walking speed of a person. The person may possess the second electronic device, and the AWSH may refer to an average moving speed of the second electronic device. A default value of the AWSH may be 1.5 m/s (e.g., AWSH: Average Walking Speed of Human (default is 1.5 m/s))

PULL_DOOR_BACK_OFF may indicate a back-off duration when a predetermined event occurs in the first electronic device. The predetermined event may be that the door of the first electronic device is unlocked. A maximum value and a minimum value of PULL_DOOR_BACK_OFF may be respectively expressed as MAX_PULL_DOOR_BACK_OFF (ms) and MIN_PULL_DOOR_BACK_OFF (ms) (e.g., PULL_DOOR_BACK_OFF: Back off duration when "Pull Door" event happens, Maximum is MAX_PULL_DOOR_BACK_OFF (ms), Minimum is MIN_PULL_DOOR_BACK_OFF (ms)).

MAX_PULL_DOOR_BACK_OFF may indicate a maximum back-off duration when the predetermined event occurs in the first electronic device. The predetermined event may be that the door of the first electronic device is unlocked. A default value of MAX_PULL_DOOR_BACK_OFF may be 100 ms (e.g., MAX_PULL_DOOR_BACK_OFF: Max back off duration when "Pull Door" event happens, default is 100 ms).

MIN_PULL_DOOR_BACK_OFF may indicate a minimum back-off duration when the predetermined event occurs in the first electronic device. The predetermined event may be that the door of the first electronic device is unlocked. A default value of MIN_PULL_DOOR_BACK_OFF may be 0 ms (e.g., MIN_PULL_DOOR_BACK_OFF: Minimum back off duration when "Pull Door" event happens, default is 0 ms).

PULL_DOOR_BACK_OFF_WINDOW may indicate a scope of a back-off window with respect to PULL_DOOR_BACK. The back-off window may refer to a unit of a back-off operation. A default value of PULL_DOOR_BACK_OFF_WINDOW may be a random value from among real values between 0 to 5 (e.g., PULL_DOOR_BACK_OFF_WINDOW: The range of back off window for PULL_DOOR_BACK_OFF, default is random(0~5)).

FIRST_BACK_OFF may indicate a first re-try back-off time when a location of the second electronic device is within a SECURE_DISTANCE from the first electronic device. A maximum value of FIRST_BACK_OFF may be expressed as MAX_FIRST_BACK_OFF, and a minimum value of FIRST_BACK_OFF may be expressed as MIN_FIRST_BACK_OFF (e.g., FIRST_BACK_OFF: First re-try back off duration when the location of Smartphone is within 0~SECURE_DISTANCE (m), Maximum is MAX_FIRST_BACK_OFF (ms), Minimum is MIN_FIRST_BACK_OFF (ms)).

MAX_FIRST_BACK_OFF may indicate a maximum value of the first re-try back-off time when the location of the second electronic device is within SECURE_DISTANCE from the first electronic device. A default value of MAX_FIRST_BACK_OFF may be 400 ms (e.g., MAX_FIRST_BACK_OFF: First re-try max back off duration when the location of Smartphone is within 0~SECURE_DISTANCE (m), default is 400 ms).

MIN_FIRST_BACK_OFF may indicate a minimum value of the first re-try back-off time when the location of the second electronic device is within SECURE_DISTANCE from the first electronic device. A default value of MIN_FIRST_BACK_OFF may be 100 ms (e.g., MIN_FIRST_BACK_OFF: First re-try minimum back off duration when the location of Smartphone is within 0~SECIRE_DISTANCE (m), default is 100 ms).

FIRST_BACK_OFF_WINDOW may indicate a scope of the back-off window with respect to FIRST_BACK_OFF. The back-off window may refer to the unit of the back-off operation. A default value of FIRST_BACK_OFF_WINDOW may be a random value from among real values between 0 to 15 (e.g., FIRST_BACK_OFF_WINDOW: The range of back off window for FIRST_BACK_OFF, default is random(0~15)).

SECOND_BACK_OFF may indicate a second re-try back-off time when the location of the second electronic device is within SECURE_DISTANCE from the first electronic device. A maximum value of SECOND_BACK_OFF may be expressed as MAX_SECOND_BACK_OFF, and a minimum value of SECOND_BACK_OFF may be expressed as MAX_SECOND_BACK_OFF (e.g., SECOND_BACK_OFF: Second re-try back off duration when the location of Smartphone is within 0~SECURE_DISTANCE (m), Maximum is MAX_SECOND_BACK_OFF (ms), Minimum is MIN_SECOND_BACK OFF (ms)).

MAX_SECOND_BACK_OFF may indicate a maximum value of the second re-try back-off time when the location of the second electronic device is within SECURE_DISTANCE from the first electronic device. A default value of MAX_SECOND_BACK_OFF may be 300 ms (e.g., MAX_SECOND_BACK_OFF: Second re-try max back off duration when the location of Smartphone is within 0~SECURE_ DISTANCE (m), default is 300 ms).

MIN_SECOND_BACK_OFF may indicate a minimum value of the second re-try back-off time when the location of the second electronic device is within SECURE_DISTANCE from the first electronic device. A default value of MIN_SECOND_BACK_OFF may be 100 ms (e.g., MIN_SECOND_BACK_OFF: Second re-try minimum back off duration when the location of Smartphone is within 0~SECURE_DISTANCE (m), default is 100 ms).

SECOND_BACK_OFF_WINDOW may indicate a scope of the back-off window with respect to SECOND_BACK_OFF. The back-off window may refer to the unit of the back-off operation. A default value of SECOND_BACK_OFF_WINDOW may be a random value from among real values between 0 to 10 (e.g., SECOND_BACK_OFF_WINDOW: The range of back off window for SECOND_BACK_OFF, default is random(0~10)).

LAST_BACK_OFF may indicate re-try back-off duration until ranging is successful from a third re-try when the location of the second electronic device is within SECURE_DISTANCE from the first electronic device. A maximum value of LAST_BACK_OFF may be expressed as MAX_LAST_BACK_OFF, and a minimum value of LAST_ BACK_OFF may be expressed as MIN_LAST_BACK_ OFF (e.g., LAST_BACK_OFF: Re-try back off duration from third re-try until ranging is successful when the location of Smartphone is within 0~SECURE_DISTANCE (m), Maximum is MAX_LAST_BACK_OFF (ms), Minimum is MIN_LAST_BACK_OFF (ms)).

MAX_LAST_BACK_OFF may indicate maximum re-try back-off duration until ranging is successful from the third re-try when the location of the second electronic device is within SECURE_DISTANCE from the first electronic device. A default value of MAX_LAST_BACK_OFF may be 200 ms (e.g., MAX_LAST_BACK_OFF: Re-try max back off duration from third re-try until ranging is successful when the location of Smartphone is within 0~SECURE_DISTANCE (m), default is 200 ms).

MIN_LAST_BACK_OFF may indicate minimum re-try back-off duration until ranging is successful from the third re-try when the location of the second electronic device is within SECURE_DISTANCE from the first electronic device. A default value of MIN_LAST_BACK_OFF may be 100 ms (e.g., MIN_LAST_BACK_OFF: Re-try minimum back off duration from third re-try until ranging is successful when the location of Smartphone is within 0~SECURE_DISTANCE (m), default is 100 ms).

LAST_BACK_OFF_WINDOW may indicate a scope of the back-off window with respect to LAST_BACK_OFF. The back-off window may refer to the unit of the back-off operation. A default value of LAST_BACK_OFF_WINDOW may be a random value from among real values between 0 to 5 (e.g., LAST_BACK_OFF_WINDOW: The range of back off window for LAST_BACK_OFF, default is random(0~5)).

SUCCESS_BACK_OFF may indicate an interval for a next ranging session after ranging is successful. A maximum value of SUCCESS_BACK_OFF may be expressed as MAX_SUCCESS_BACK_OFF, and a minimum value of SUCCESS_BACK_OFF may be expressed as MIN_SUCCESS_BACK_OFF (e.g., SUCCESS_BACK_OFF: The interval for next ranging session after the ranging is successful, Maximum is MAX_SUCCESS_BACK_OFF (ms), Minimum is MIN_SUCCESS_BACK_OFF (ms)).

MAX_SUCCESS_BACK_OFF may indicate a maximum interval for the next ranging session after ranging is successful. A default value of MAX_SUCCESS_BACK_OFF may be 800 ms (e.g., MAX_SUCCESS_BACK_OFF: The max interval for next ranging session after the ranging is successful, default is 800 ms).

MIN_SUCCESS_BACK_OFF may indicate a minimum interval for the next ranging session after ranging is successful. A default value of MIN_SUCCESS_BACK_OFF may be 400 ms (e.g., MIN_SUCCESS_BACK_OFF: The minimum interval for next ranging session after the ranging is successful, default is 400 ms).

SUCCESS_BACK_OFF_WINDOW may indicate a scope of the back-off window with respect to SUCCESS_BACK_OFF. The back-off window may refer to the unit of the back-off operation. A default value of SUCCESS_BACK_OFF_WINDOW may be a random value from among real values between 0 to 20 (e.g., SUCCESS_BACK_ OFF_WINDOW: The range of back off window for SUCCESS_BACK_OFF, default is random(0~20)).

NORMAL_BACK_OFF may indicate a back-off time when the location of the second electronic device is over SECURE_DISTANCE from the first electronic device. A maximum value of NORMAL_BACK_OFF may be expressed as MAX_NORMAL_BACK_OFF, and a minimum value of NORMAL_BACK_OFF may be expressed as MIN_NORMAL_BACK_OFF (e.g., NORMAL_BACK_OFF: Back off duration when the location of Smartphone is over SECURE_DISTANCE, Maximum is MAX_NORMAL_BACK_OFF (ms), Minimum is MIN_NORMAL_BACK_OFF (ms)).

MAX_NORMAL_BACK_OFF may indicate a maximum back-off time when the location of the second electronic device is over SECURE_DISTANCE from the first electronic device. A default value of MAX_NORMAL_BACK_OFF may be 800 ms (e.g., MAX_NORMAL_BACK_OFF: Max back off duration when the location of Smartphone is over SECURE_DISTANCE, default is 800 ms).

MIN_NORMAL_BACK_OFF may indicate a minimum back-off time when the location of the second electronic device is over SECURE_DISTANCE from the first electronic device. A default value of MIN_NORMAL_BACK_OFF may be 400 ms (e.g., MIN_NORMAL_BACK_OFF: Minimum back off duration when the location of Smartphone is over SECURE_DISTANCE, default is 400 ms).

NORMAL_BACK_OFF_WINDOW may indicate a scope of the back-off window with respect to NORMAL_BACK_OFF. A default value of NORMAL_BACK_OFF_WINDOW may be a random value from among real values between 0 to 20 (e.g., NORMAL_BACK_OFF_WINDOW: The range of back off window for NORMAL_BACK_OFF, default is random(0~20)).

NRD_IN_RANGE may indicate next ranging duration when the location of the second electronic device is within SECURE_DISTANCE from the first electronic device and ranging is successful. A maximum value of NRD_IN_RANGE may be expressed as MAX_NRD_IN_RANGE, and a minimum value of NRD_IN_RANGE may be expressed as MIN_NRD_IN_RANGE (e.g., NRD_IN_RANGE: Next Ranging Duration when the location of the smartphone is within 0~SECURE_DISTANCE and ranging is successful, Maximum is MAX_NRD_IN_RANGE (ms), Minimum is MIN_NRD_IN_RANGE (ms)).

MAX_NRD_IN_RANGE may indicate a maximum value of the next ranging duration when the location of the second electronic device is within SECURE_DISTANCE from the first electronic device and ranging is successful. A default value of MAX_NRD_IN_RANGE maybe 400 ms (e.g., MAX_NRD_IN_RANGE: Max Next Ranging Duration when the location of the smartphone is within 0~SECURE_DISTANCE and ranging is successful, default is 400 ms).

MIN_NRD_IN_RANGE may indicate a minimum value of the next ranging duration when the location of the second electronic device is within SECURE_DISTANCE from the first electronic device and ranging is successful. A default value of MIN_NRD_IN_RANGE maybe 800 ms (e.g., MIN_NRD_IN_RANGE: Minimum Next Ranging Duration when the location of Smartphone is within 0~SECURE_ DISTANCE and ranging is successful, default is 800 ms).

NRD_IN_RANGE_WINDOW may indicate a scope of the back-off window with respect to NRD_IN_RANGE. The back-off window may refer to the unit of the back-off operation. A default value of NRD_IN_RANGE_WINDOW may be a random value from among real values between 0 to 20 (e.g., NRD_IN_RANGE_WINDOW: The range of back off window for NRD_IN_RANGE, default is random (0~20)).

MAX_DISTANCE_VALUE may indicate a distance from the first electronic device. MAX_DISTANCE_VALUE may be related to NRD_OUT_RANGE. A default value of MAX_DISTANCE_VALUE may be 5 m (e.g., MAX_DISTANCE_VALUE: The distance(m) from the vehicle using the NRD_OUT_RANGE, default is 5 m).

FORECAST_DISTANCE may indicate an estimated distance of the second electronic device which is related to a movement distance and a last measured distance (e.g., FORECAST_DISTANCE: The estimated distance (m) of Smartphone relative to the move and the last measured distance). FORECAST_DISTANCE may be calculated as below:

FORECAST_DISTANCE=The last measured distance (m)-(The elapsed time from the time of the last measure*AWSH (1.5 m/s)).

In this regard, "The elapsed time from the time of the last measure" may indicate the next ranging duration.

NRD_OUT_RANGE may indicate the next ranging duration when the location of the second electronic device is within MAX_DISTANCE_VALUE from SECURE_DISTANCE. NRD_OUT_RANGE is a value related to FORECAST_DISTANCE. A maximum value of NRD_OUT_RANGE may be expressed as MAX_NRD_OUT_RANGE, and a minimum value of NRD_OUT_RANGE may be expressed as MIN_NRD_ OUT_RANGE (e.g., NRD_OUT_ RANGE: Next Ranging Duration when the location of Smartphone is within SECURE_DISTANCE~MAX_DISTANCE_VALUE, It is relative to the FORECAST_DISTANCE, Maximum is MAX_NRD_OUT_ RANGE (ms), Minimum is MIN_NRD_OUT_RANGE (ms)).

MAX_NRD_OUT_RANGE may indicate a maximum value of the next ranging duration when the location of the second electronic device is within MAX_DISTANCE_VALUE from SECURE_DISTANCE. A default value of MAX_NRD_OUT_RANGE may be 1000 ms (e.g., MAX_NRD_OUT_RANGE: Max Next Ranging Duration when the location of Smartphone is within SECURE_DISTANCE~MAX_DISTANCE_VALUE, It is relative to the FORECAST_DISTANCE, default is 1000 ms).

MIN_NRD_OUT_RANGE may indicate a minimum value of the next ranging duration when the location of the second electronic device is within MAX_DISTANCE_VALUE from SECURE_DISTANCE. A default value of MAX_NRD_OUT_RANGE may be 400 ms (e.g., MIN_NRD_OUT_RANGE: Minimum Next Ranging Duration when the location of Smartphone is within SECURE_DISTANCE~MAX_DISTANCE_VALUE, It is relative to the FORECAST_DISTANCE, default is 400 ms).

NRD_OUT_RANGE_WINDOW may indicate a scope of the back-off window with respect to NRD_OUT_RANGE. The back-off window may refer to the unit of the back-off operation. A default value of NRD_OUT_RANGE_WINDOW may be a random value from among real values between 0 to 20 (e.g., NRD_OUT_RANGE_WINDOW: The range of back off window for NRD_OUT_RANGE, default is random(0~20)).

BASIC_DURATION may indicate a value obtained by dividing MAX_FIRST_BACK_OFF by SECURE_DISTANCE. A default value of BASIC_DURATION may be 200 ms (e.g., BASIC_DURATION: The value (ms) that MAX_FIRST_BACK_OFF(ms) divided by SECURE_DISTANCE(m), default is 200 ms).

NRD_MAX_RANGE may indicate the next ranging duration when the location of the second electronic device is over MAX_DISTANCE_VALUE and ranging is successful. A maximum value of NRD_MAX_RANGE may be expressed as MAX_NRD_MAX_RANGE, and a minimum value of NRD_MAX_RANGE may be expressed as MIN_NRD_MAX_RANGE (e.g., NRD_MAX_RANGE:

Next Ranging Duration when the location of Smartphone is over MAX_DISTANCE_VALUE and ranging is successful, Maximum is MAX_NRD_MAX_RANGE (ms), Minimum is MIN_NRD_MAX_RANGE (ms)).

MAX_NRD_MAX_RANGE may indicate a maximum value of the next ranging duration when the location of the second electronic device is over MAX_DISTANCE_VALUE and ranging is successful. A default value of MAX_NRD_MAX_RANGE may be 1400 ms (e.g., MAX_NRD_MAX_RANGE: Max Next Ranging Duration when the location of Smartphone is over MAX_DISTANCE_VALUE and ranging is successful, default is 1400 ms).

MIN_NRD_MAX_RANGE may indicate a minimum value of the next ranging duration when the location of the second electronic device is over MAX_DISTANCE_VALUE and ranging is successful. A default value of MIN_NRD_MAX_RANGE may be 1000 ms (e.g., MIN_NRD_MAX_RANGE: Minimum Next Ranging Duration when the location of Smartphone is over MAX_DISTANCE_VALUE and ranging is successful, default is 1000 ms).

NRD_MAX_RANGE_WINDOW may indicate a scope of the back-off window with respect to NRD_MAX_RANGE. The back-off window may refer to the unit of the back-off operation. A default value of NRD_MAX_RANGE_WINDOW may be a random value from among real values between 0 to 20 (e.g., NRD_MAX_RANGE_WINDOW: The range of back off window for NRD_MAX_RANGE, default is random(0~20)).

SECURE_DISTANCE_TIME_FOR_VEHICLE may indicate a time to estimate the location of the second electronic device within a range of SECURE_DISTANCE with respect to the first electronic device (e.g., SECURE_DISTANCE_TIME_FOR_VEHICLE: The time (s) to estimate the location of Smartphone within SECURE_DISTANCE for the vehicle-side). SECURE_DISTANCE_TIME_FOR_VEHICLE may be calculated as below:

(The last measured distance(m)−SECURE_DISTANCE)/AWSH(1.5 m/s).

SECURE_DISTANCE_TIME_FOR_SMARTPHONE may indicate a time to estimate the location of the second electronic device within a range of SECURE_DISTANCE with respect to the first electronic device (e.g., SECURE_DISTANCE_TIME_FOR_SMARTPHONE: The time (s) to estimate the location of Smartphone within SECURE_DISTANCE for the smartphone-side). SECURE_DISTANCE_TIME_FOR_SMARTPHONE may be calculated as below:
(The last measured distance(m)−SECURE_DISTANCE)/AWSH(1.5 m/s).

Figure 11:
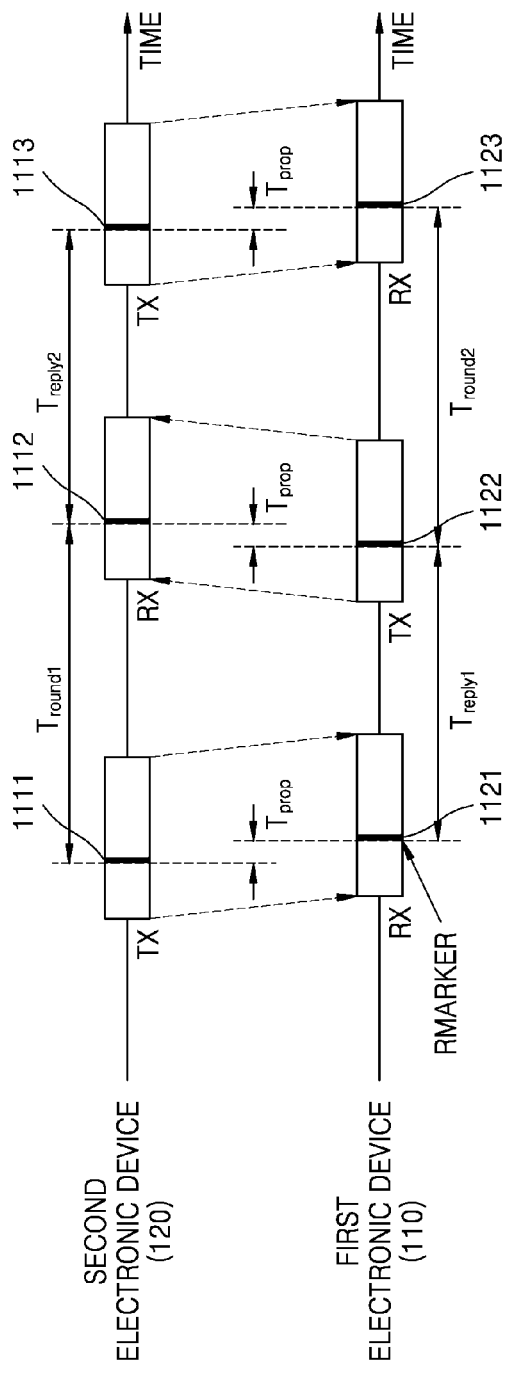
FIG. 11 is a diagram for describing double-sided two-way ranging (DS-TWR) operations of electronic devices.

FIG. 11 is a diagram for describing double-sided two-way ranging (DS-TWR) operations of electronic devices according to an embodiment.

RMARKER shown in FIG. 11 may refer to data in a frame so as to define a reference time point. Based on RMARKER, the electronic device may measure a time interval.

The second electronic device 120 may measure, as $T_{round1}$, a time between 2-1 RMARKER 1111 and 2-2 RMARKER 1112, the 2-1 RMARKER 1111 included in a frame transmitted (TX) to the first electronic device 110 and the 2-2 RMARKER 1112 included in a frame received (RX) from the first electronic device 110.

The first electronic device 110 may measure, as $T_{reply1}$, a time between 1-1 RMARKER 1121 and 1-2 RMARKER 1122, the 1-1 RMARKER 1121 included in a frame received (RX) from the second electronic device 120 and the 1-2 RMARKER 1122 included in a frame transmitted (TX) to the second electronic device 120.

The second electronic device 120 may measure, as $T_{reply2}$, a time between the 2-2 RMARKER 1112 and 2-3 RMARKER 1113, the 2-2 RMARKER 1112 included in the frame received (RX) from the first electronic device 110 and the 2-3 RMARKER 1113 included in a frame transmitted (TX) to the second electronic device 120.

The first electronic device 110 may measure, as $T_{round2}$, a time between the 1-2 RMARKER 1122 and 1-3 RMARKER 1123, the 1-2 RMARKER 1122 included in the frame transmitted (TX) to the second electronic device 120 and the 1-3 RMARKER 1123 included in a frame received (RX) from the second electronic device 120.

Time-of-Flight (ToF) $T_{prop}$ may be calculated according to Equation 1 below. $T_{prop}$ may also be referred to as $\hat{T}_{prop}$ including the hat operator (^). Hereinafter, for convenience of description, ToF is referred to as $T_{prop}$.

$$\hat{T}_{prop} = \frac{(T_{round1} \times T_{round2} - T_{reply1} \times T_{reply2})}{(T_{round1} + T_{round2} + T_{reply1} + T_{reply2})} \quad \text{[Equation 1]}$$

Figure 12:
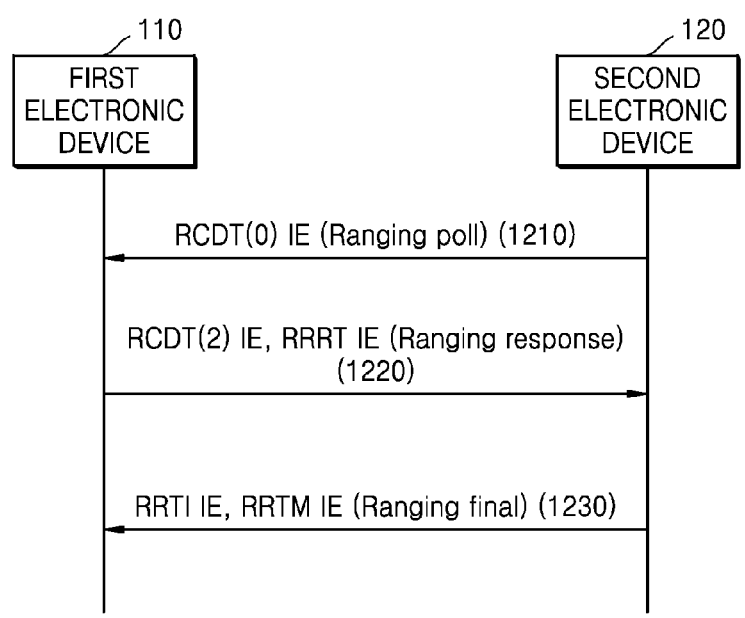
FIG. 12 is a diagram for describing DS-TWR ranging operations of electronic devices.

FIG. 12 is a diagram for describing DS-TWR ranging operations of electronic devices according to an embodiment.

Referring to FIG. 12, in operation 1210, the second electronic device 120 may start a ranging operation (Ranging poll) by transmitting, to the first electronic device 110, a data frame including Report Control Double-sided Two-way Ranging Information Element (RCDT(0) IE). RCDT(0) IE may indicate that the data frame including RCDT(0) IE starts a DS-TWR ranging operation and a transmitter does not require a ranging result.

In operation 1220, the first electronic device 110 may transmit (Ranging response) a data frame including RCDT(2) IE and Ranging Request Reply Time (RRRT) IE to the second electronic device 120. RCDT(2) IE may indicate that the data frame including RCDT(2) IE may perform a request for measuring a second transmission-reception (TX-RX) round while continuously performing the DS-TWR ranging operation. RRRT IE may be used to request a ranging response time from an electronic device performing a ranging operation.

In this regard, the first electronic device 110 may measure $T_{reply1}$. As described above, $T_{reply1}$ may indicate a time between RMARKER included in a data frame received (RX) from the second electronic device 120 and RMARKER included in a data frame transmitted (TX) to the second electronic device 120. Hereinafter, measurement principles related to time intervals described above with reference to FIG. 11 are equally applied to $T_{reply2}$, $T_{round1}$, and $T_{round2}$.

In operation 1230, the second electronic device 120 may transmit a data frame including RRTI IE ($T_{reply2}$) and RRTM IE ($T_{round1}$) that are each timestamp information (Ranging final) to the first electronic device 110. RRTM IE may indicate a time gap between a transmission time of a frame and a reception time of the frame, wherein round time measurement starts at the transmission time and ends the reception time.

The first electronic device 110 may measure a value of $T_{round2}$, and may calculate the ToF time $T_{prop}$ according to Equation 1 described above.

An estimated distance (Ranging) between two electronic devices may be calculated by multiplying $T_{prop}$ by the speed of light (3*10^8 m/s).

Figure 13:
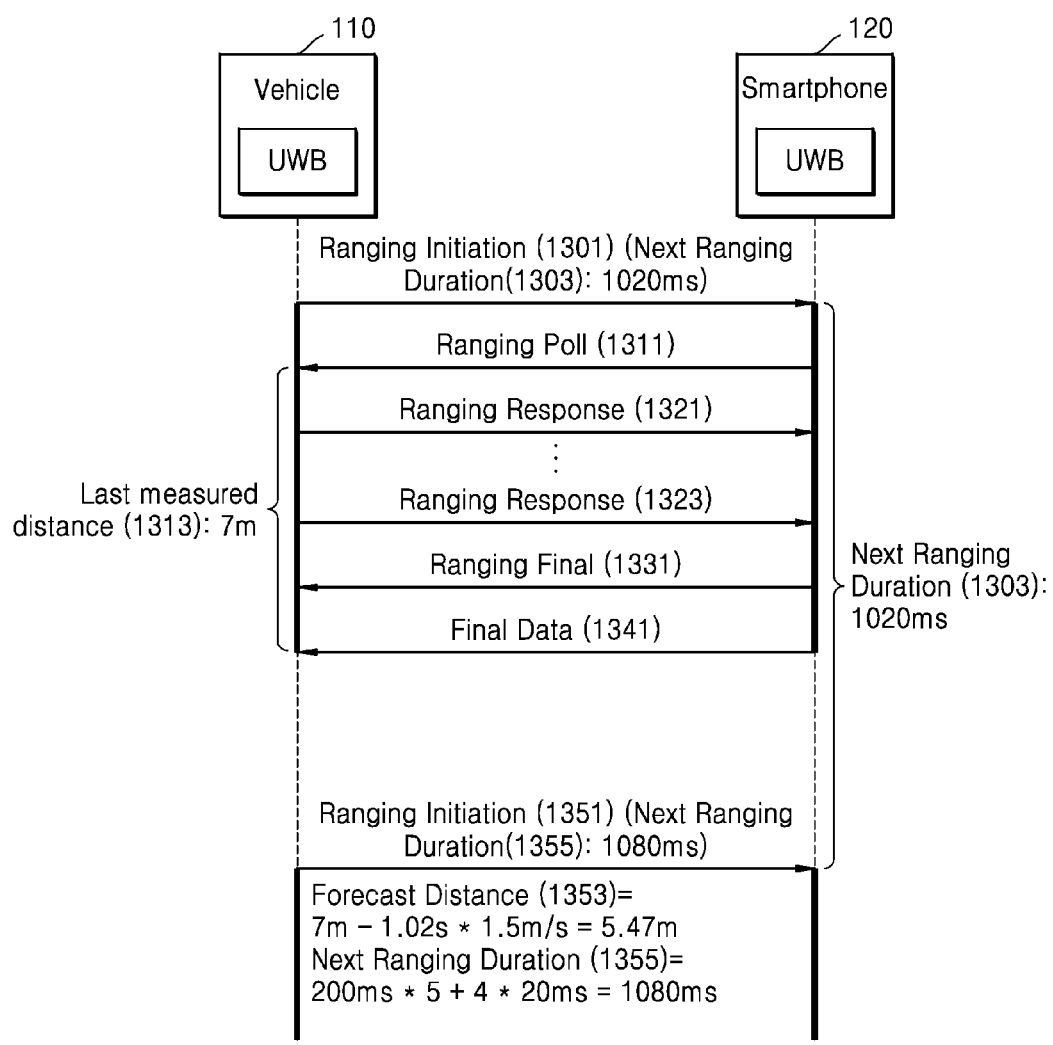
FIG. 13 is a diagram for describing a ranging operation for measuring a distance between electronic devices, according to an embodiment.

FIG. 13 is a diagram for describing a ranging operation for measuring a distance between electronic devices, according to an embodiment.

FIG. 13 illustrates Vehicle and Smartphone as respective examples of the first electronic device 110 and the second electronic device 120, but it is understood that one or more other embodiments are not limited thereto.

According to embodiments, the first electronic device 110 and the second electronic device 120 may measure a distance between the first electronic device 110 and the second electronic device 120 by exchanging data via a first communication (e.g., a UWB).

The first electronic device 110 and the second electronic device 120 may obtain parameters for the first communication by using a second communication distinct from the first communication. The first electronic device 110 and the second electronic device 120 may set up a communication environment to correspond to the parameters.

When (e.g., based on) the communication environment in which the first electronic device 110 and the second electronic device 120 can measure the distance via the first communication is set up, the first electronic device 110 may transmit a Ranging Initiation message 1301 to the second electronic device 120.

According to embodiments, the first electronic device 110 may transmit a Ranging Initiation message 1301 to the second electronic device 120 so as to start measuring the distance to the second electronic device 120. The Ranging Initiation message 1301 may include Next Ranging Duration data 1303 that is information about a next ranging duration. The Next Ranging Duration data 1303 may be information about duration in which the first electronic device 110 and the second electronic device 120 start a next ranging duration. In detail, the Next Ranging Duration data 1303 may indicate a duration between the Ranging Initiation message 1301 and a Ranging Initiation message 1351. As illustrated in FIG. 13, the Next Ranging Duration data 1303 may be 1020 ms.

The second electronic device 120 may transmit, to the first electronic device 110, a Ranging Poll message 1311 that is a reference message with respect to distance measurement.

The first electronic device 110 may transmit a Ranging Response message 1321 and a Ranging Response message 1323 by receiving the Ranging Poll message 1311. While FIG. 13 illustrates two Ranging Responses, it is understood that this is just an example, and the number of Ranging Responses may be greater than 2.

The second electronic device 120 may transmit, to the first electronic device 110, a Ranging Final message 1331 indicating an end of the ranging operation. The second electronic device 120 may transmit, to the first electronic device 110, a Final Data message 1341 including information about the distance measurement. The transmitting of the Ranging Final message 1331 and the transmitting of the Final Data message 1341 may be integrated into one operation.

Last measured distance 1313 may be calculated based on the Ranging Poll message 1311, the Ranging Response 1321, the Ranging Response 1323, the Ranging Final message 1331, and the Final Data message 1341. In the example shown in FIG. 13, the Last measured distance 1313 may be calculated to be 7 m.

Forecast Distance 1353 may be calculated as below, based on the Last measured distance 1313, the Next Ranging Duration 1303, and AWSH:

FORECAST_DISTANCE=The last measured distance(m)−(The elapsed time from the time of the last measure*AWSH (1.5 m/s))

In this regard, "The elapsed time from the time of the last measure" may indicate Next Ranging Duration.

In the example shown in FIG. 13, the Forecast Distance 1353 may be calculated based on the Last measured distance 1313 that is 7 m, the Next Ranging Duration 1303 that is 1.02 s (1020 ms), and AWSH that is 1.5 m/s. In the example shown in FIG. 13, the Forecast Distance 1353 may be calculated to be 5.47 m.

Next Ranging Duration 1355 may be calculated into Case 1 and Case 2 as below. In Case 1, the Next Ranging Duration 1355 may be NRD_OUT_RANGE, and in Case 2, the Next Ranging Duration 1355 may be NRD_MAX_RANGE.

Calculations of BASIC_DURATION, FORECAST_DISTANCE, and NRD_OUT_RANGE for Case 1 in which FORECAST_DISTANCE is over SECURE_DISTANCE and is equal to or less than MAX_DISTANCE_VALUE are as below:

<Case 1: SECURE_DISTANCE (2 m)<FORECAST_DISTANCE≤MAX_DISTANCE_VALUE (5 m)>
a. BASIC_DURATION(ms)=MAX_FIRST_BACK_OFF/SECURE_DISTANCE=200 ms
b. FORECAST_DISTANCE(m)=The last measured distance(m)−The elapsed time from the time of the last measure*AWSH (1.5 m/s)
c. NRD_OUT_RANGE(ms)=BASIC_DURATION(ms)*FORECAST_DISTANCE//RPET (20 ms)*RPET (20 ms): (MIN_NRD_OUT_RANGE, MAX_NRD_OUT_RANGE)

Calculation of NRD_MAX_RANGE for Case 2 in which FORECAST_DISTANCE is over MAX_DISTANCE_VALUE is as below.

<Case 2: MAX_DISTANCE_VALUE (5 m)<FORECAST_DISTANCE>
NRD_MAX_RANGE=BASIC_DURATION(ms)*MAX_DISTANCE_VALUE (5 m)+NRD_MAX_RANGE_WINDOW (Random(0~20))*RPET (20 ms): (MIN_NRD_MAX_RANGE, MAX_NRD_MAX_RANGE)

In the example shown in FIG. 13, FORECAST_DISTANCE between the second electronic device 120 and the first electronic device 110 is over 5 m, and thus, the Next Ranging Duration 1355 is 200 ms*5+Random(4)*20 ms=1080 ms. The Next Ranging Duration 1355 may be included in a Ranging Initiation message to be used in next distance measurement.

When the first electronic device 110 and the second electronic device 120 finish the distance measurement, the first electronic device 110 and the second electronic device 120 may transit to an UWB SLEEP state until a time of Next Ranging Duration comes. The UWB SLEEP state indicates a state in which an operation of measuring a distance by using an UWB is temporarily stopped.

After the Next Ranging Duration, the first electronic device 110 and the second electronic device 120 may transit to an UWB WAKE UP state and may perform distance measurement. The UWB WAKE UP state indicates a state in which the operation of measuring a distance by using the UWB is resumed.

Figure 14:
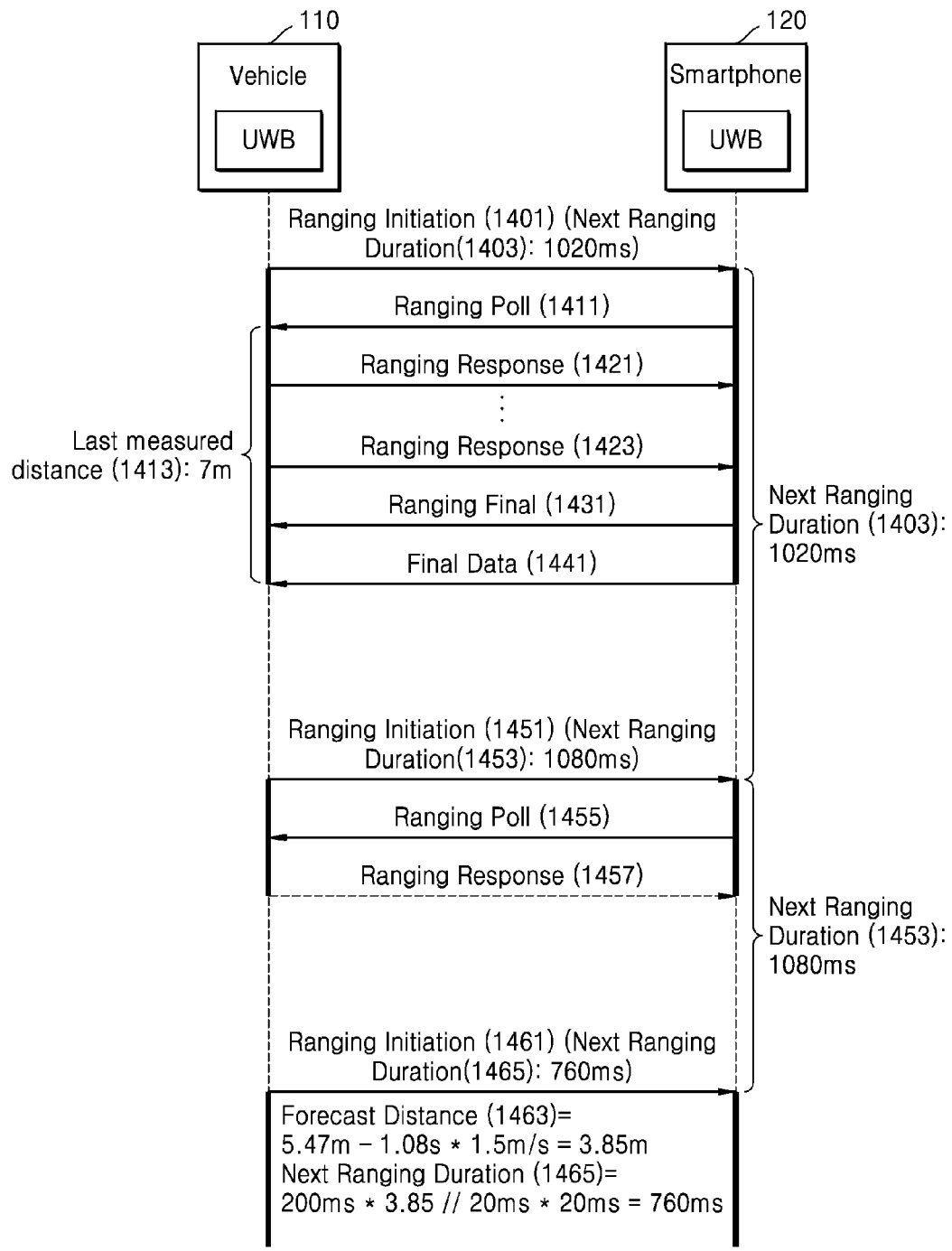
FIG. 14 is a diagram for describing a ranging operation of a case in which a distance between electronic devices is greater than a predetermined distance and distance measurement fails, according to an embodiment.

FIG. 14 is a diagram for describing a ranging operation of a case in which a distance between electronic devices is greater than a predetermined distance and distance measurement fails, according to an embodiment.

In detail, FIG. 14 illustrates a case in which the first electronic device 110 and the second electronic device 120 succeed in an exchange of Next Ranging Duration 1453 but fail with respect to distance measurement.

Whether the exchange of Next Ranging Duration 1453 is successful for the first electronic device 110 may be determined based on whether Ranging Poll 1455 is received from the second electronic device 120. Whether the exchange of Next Ranging Duration 1453 is successful for the second electronic device 120 may be determined based on whether a Ranging Initiation message 1451 is received from the first electronic device 110.

In the example shown in FIG. 14, the second electronic device 120 did not receive Ranging Response 1457 from the first electronic device 110 and thus it may be determined that the distance measurement between the first electronic device 110 and the second electronic device 120 fails.

FORECAST_DISTANCE(m) is calculated as below:
FORECAST_DISTANCE(m)=The last measured distance(m)−The elapsed time from the time of the last measure*AWSH (1.5 m/s).

As described above with reference to FIG. 13, "The last measured distance(m)" is calculated to be 5.47 m. Therefore, Forecast Distance 1463 is calculated to be 5.47 m−(1.08 s*1.5 m/s)=3.85 m.

The calculated Forecast Distance 1463 satisfies a condition below:
SECURE_DISTANCE (2 m)<FORECAST_DISTANCE≤MAX_DISTANCE_VALUE (5 m).

Therefore, NRD_OUT_RANGE(ms) is calculated as below:
NRD_OUT_RANGE(ms)=BASIC_DURATION(ms)*FORECAST_DISTANCE//RPET (20 ms)*RPET (20 ms): (MIN_NRD_OUT_RANGE, MAX_NRD_OUT_RANGE).

NRD_OUT_RANGE(ms) is calculated to be 760 ms, based on BASIC_DURATION(ms) that is 200 ms, FORECAST_DISTANCE that is 3.85 m, and RPET that is 20 ms.

When (e.g., based on) the exchange of Next Ranging Duration 1453 is successful but the distance measurement fails, the first electronic device 110 and the second electronic device 120 transit to an UWB SLEEP state until an elapse of the Next Ranging Duration 1453. In other words, until the first electronic device 110 transmits a Ranging Initiation message 1461 to the second electronic device 120, the first electronic device 110 and the second electronic device 120 maintain the UWB SLEEP state.

After the elapse of the Next Ranging Duration 1453, the first electronic device 110 and the second electronic device 120 may transit to an UWB WAKE UP state and may resume distance measurement.

Figure 15:
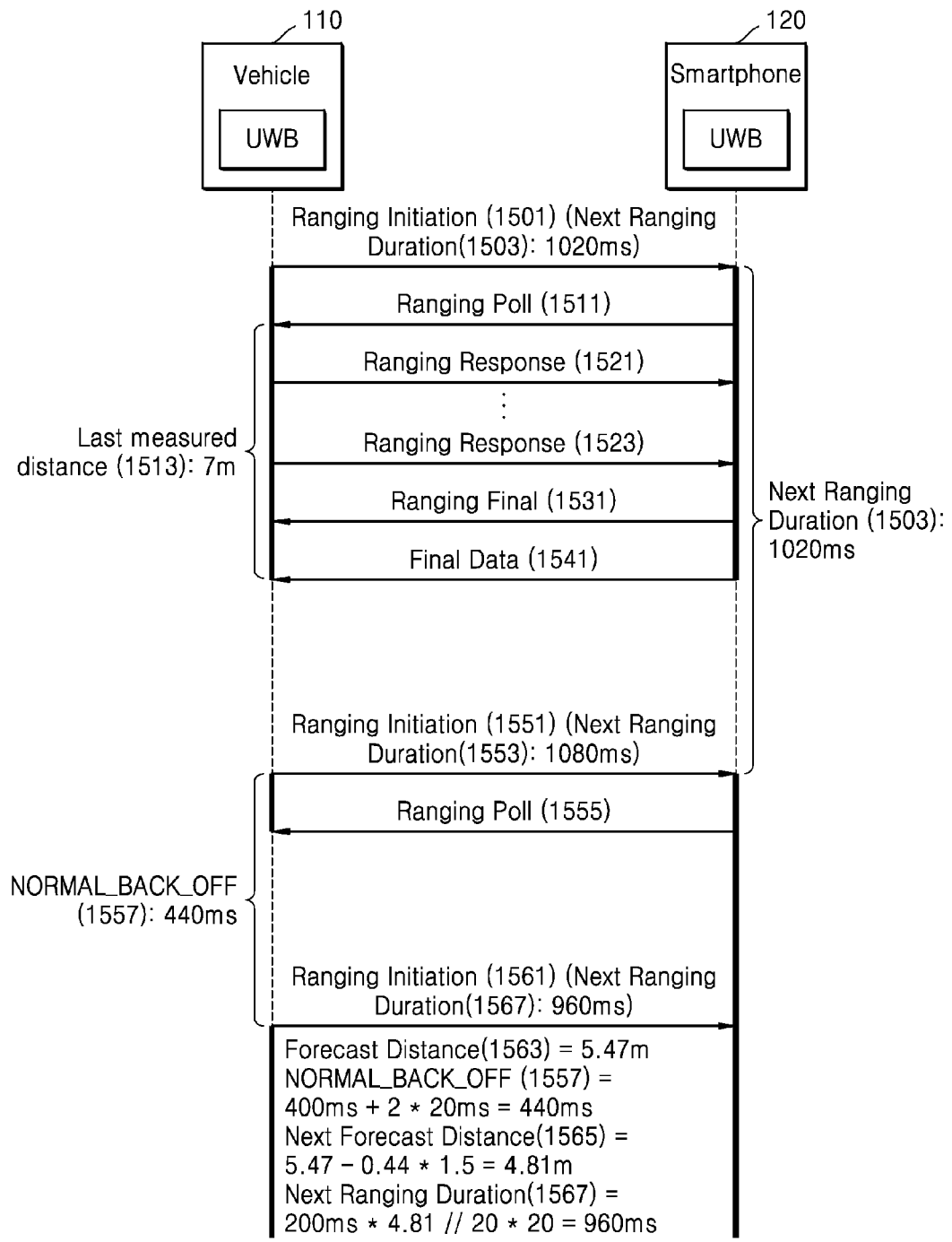
FIG. 15 is a diagram for describing a ranging operation of another case in which a distance between electronic devices is greater than a predetermined distance and distance measurement fails, according to an embodiment.

FIG. 15 is a diagram for describing a ranging operation of another case in which a distance between electronic devices is greater than a predetermined distance and distance measurement fails, according to an embodiment.

FIG. 15 illustrates a case in which the first electronic device 110 and the second electronic device 120 fail in both an exchange of Next Ranging Duration 1553 and distance measurement.

In the example of FIG. 14, the exchange of Next Ranging Duration 1553 is successful but the distance measurement fails. Meanwhile, in the example of FIG. 15, both the exchange of Next Ranging Duration 1553 and the distance measurement fail.

Whether the exchange of Next Ranging Duration 1553 is successful for the first electronic device 110 may be determined based on whether Ranging Poll 1555 is received from the second electronic device 120. When the second electronic device 120 receives a Ranging Initiation message 1551, the second electronic device 120 may determine that a message of Next Ranging Duration 1553 is successfully received.

In the example of FIG. 15, the second electronic device 120 fails in receiving the Ranging Initiation message 1551, and the first electronic device 110 fails in receiving the Ranging Poll 1555, and therefore, the first electronic device 110 and the second electronic device 120 may recognize that the exchange of Next Ranging Duration 1553 fails.

The second electronic device 120 remains in an UWB WAKE UP state until the distance measurement is successful, and the first electronic device 110 re-tries the distance measurement after an elapse of NORMAL_BACK_OFF 1557.

The NORMAL_BACK_OFF 1557 is calculated as below:
NORMAL_BACK_OFF=MAX_FIRST_BACK_OFF (ms)+NORMAL_BACK_OFF_WINDOW (Random (0~20))*RPET (20 ms): (MIN_NORMAL_BACK_OFF, MAX_NORMAL_BACK_OFF).

In the example of FIG. 15, MAX_FIRST_BACK_OFF is 400 ms. Also, NORMAL_BACK_OFF_WINDOW may be determined to be a value from among values between 0 to 20, and in the example of FIG. 15, NORMAL_BACK_OFF_WINDOW may be 2. Therefore, the NORMAL_BACK_OFF 1557 is calculated as 400 ms+2*20 ms=440 ms.

FORECAST_DISTANCE(m) is calculated as below:
FORECAST_DISTANCE(m)=The last measured distance(m)−The elapsed time from the time of the last measure*AWSH (1.5 m/s).

In the calculation, "The elapsed time from the time of the last measure" may denote the NORMAL_BACK_OFF 1557. As described above with reference to FIG. 13, The last measured distance(m) is calculated to be 5.47 m. Therefore, Forecast Distance 1463 is calculated as 5.47 m−(0.44 s*1.5 m/s)=4.81 m.

A calculated Next Forecast Distance 1565 satisfies a condition below:
SECURE_DISTANCE (2 m)<FORECAST_DISTANCE≤MAX_DISTANCE_VALUE (5 m).

Therefore, NRD_OUT_RANGE(ms) is calculated as below:
NRD_OUT_RANGE(ms)=BASIC_DURATION(ms)*FORECAST_DISTANCE//RPET (20 ms)*RPET (20 ms): (MIN_NRD_OUT_RANGE, MAX_NRD_OUT_RANGE).

In the present example, BASIC_DURATION(ms) is 200 ms, FORECAST_DISTANCE is 4.81 m, and RPET is 20 ms, and therefore, NRD_OUT_RANGE(ms) is calculated to be 960 ms.

Figure 16:
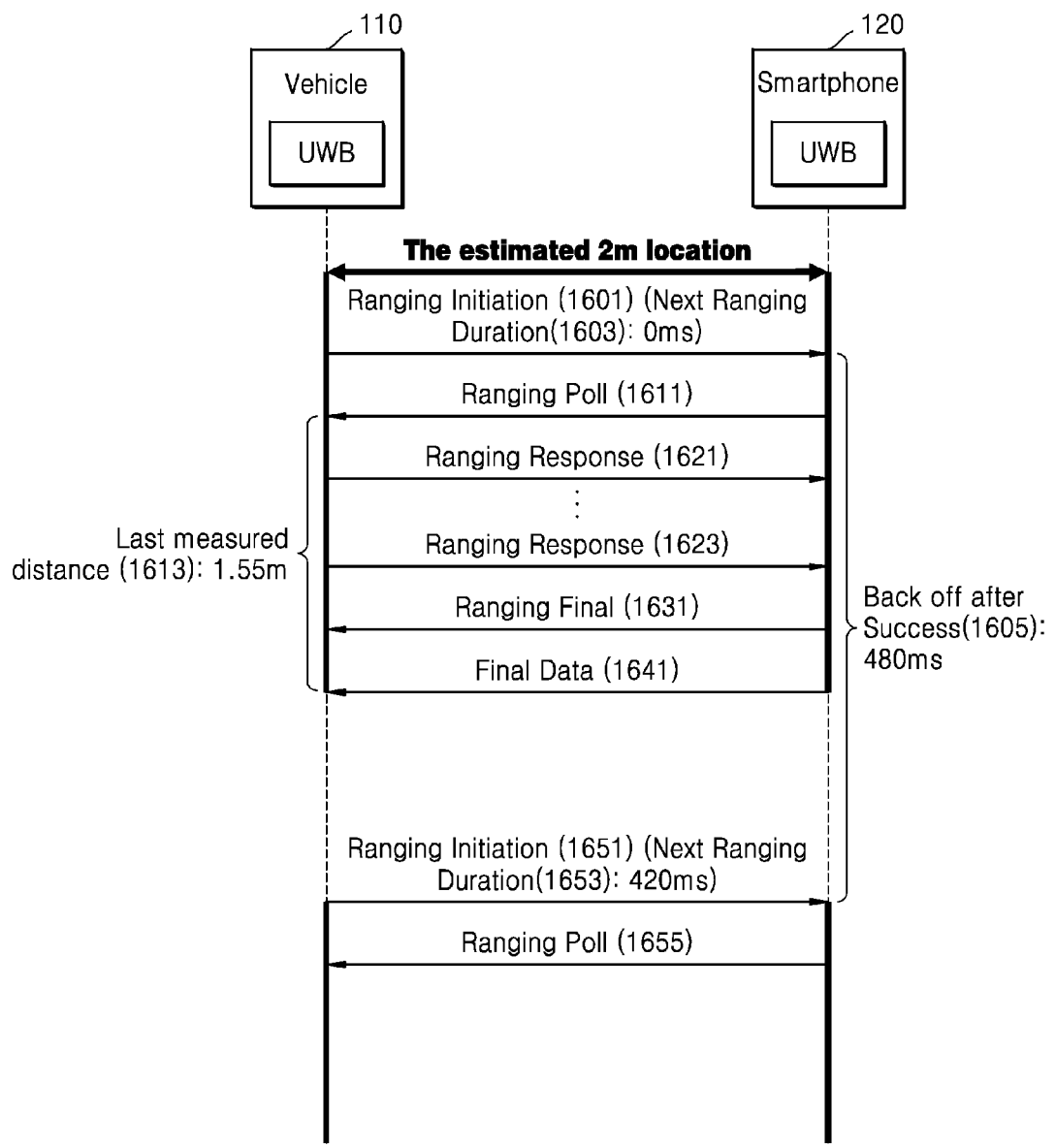
FIG. 16 illustrates a ranging operation of a case in which distance measurement is successful when a distance between electronic devices is within a predetermined distance, according to an embodiment.

FIG. 16 illustrates a ranging operation of a case in which distance measurement is successful when a distance between electronic devices is within a predetermined distance, according to an embodiment.

In the example of FIG. 16, Last measured distance 1613 that is a recently-measured distance between electronic devices is 1.55 m and thus is less than SECURE_DISTANCE(2 m).

The first electronic device 110 and the second electronic device 120 may estimate a case in which the second electronic device 120 enters a range of SECURE_DISTANCE, based on the measured distance or last received data of Next Ranging Duration 1603.

When it is determined that the second electronic device 120 is located within SECURE_DISTANCE, the first electronic device 110 and the second electronic device 120 transit to an UWB WAKE UP state and may immediately perform distance measurement. When the electronic devices succeed or fail with respect to the distance measurement, the electronic devices may re-try (1651) the distance measurement after a preset back-off time 1605.

The first electronic device 110 and the second electronic device 120 may estimate respective cases in which the second electronic device 120 enters SECURE_DISTANCE.

In the case of the first electronic device 110, the first electronic device 110 may estimate a time when the second electronic device 120 is to enter SECURE_DISTANCE, based on a last measured distance, SECURE_DISTANCE, and a value of AWSH that is an average walking speed of a person.

<time of entering SECURE_DISTANCE, which is estimated by the first electronic device 110>

(last measured distance (m)−SECURE_DISTANCE(ex. 2 m))/AWSH (1.5 m/s)=time that is estimated by the first electronic device 110 and in which the second electronic device 120 is estimated to be located within SECURE_DISTANCE after a time of the last measured distance.

<time of entering SECURE_DISTANCE, which is estimated by the second electronic device 120>

{last received Next Ranging Duration (ms)/BASIC_DURATION(ex. 200 ms)−SECURE_DISTANCE(ex. 2 m)}/AWSH (1.5 m/s)=time that is estimated by the second electronic device 120 and in which the second electronic device 120 is estimated to be located within SECURE_DISTANCE after last Next Ranging Duration is received.

The aforementioned example is one of various methods of estimating a time of entering SECURE_DISTANCE, and the average walking speed of human may be continuously changed according to not only the last measured distance, but also previously measured distances and previously measured times. In a situation where a person does not come toward a vehicle but becomes more distant from the vehicle, the average walking speed of human may have a negative value.

When a case where the second electronic device 120 enters SECURE_DISTANCE is estimated, an example of a back-off time related to a success or a failure with respect to distance measurement is as below.

When distance measurement between the first electronic device 110 and the second electronic device 120 is successful, the distance measurement is performed again after a time of SUCCESS_BACK_OFF.

[Back-Off Time after at Least One Successful Distance Measurement]

SUCCESS_BACK_OFF=FIRST_BACK_OFF+SUCCESS_BACK_OFF_WINDOW (Random (0~20))*RPET (20 ms): (MIN_SUCCESS_BACK_OFF,MAX_SUCCESS_BACK_OFF)

For example, a minimum value of SUCCESS_BACK_OFF may be 400 ms, a maximum value thereof may be 800 ms, and back-off after success 1605 in the example of FIG. 16 may be calculated as 480 ms.

Figure 17:
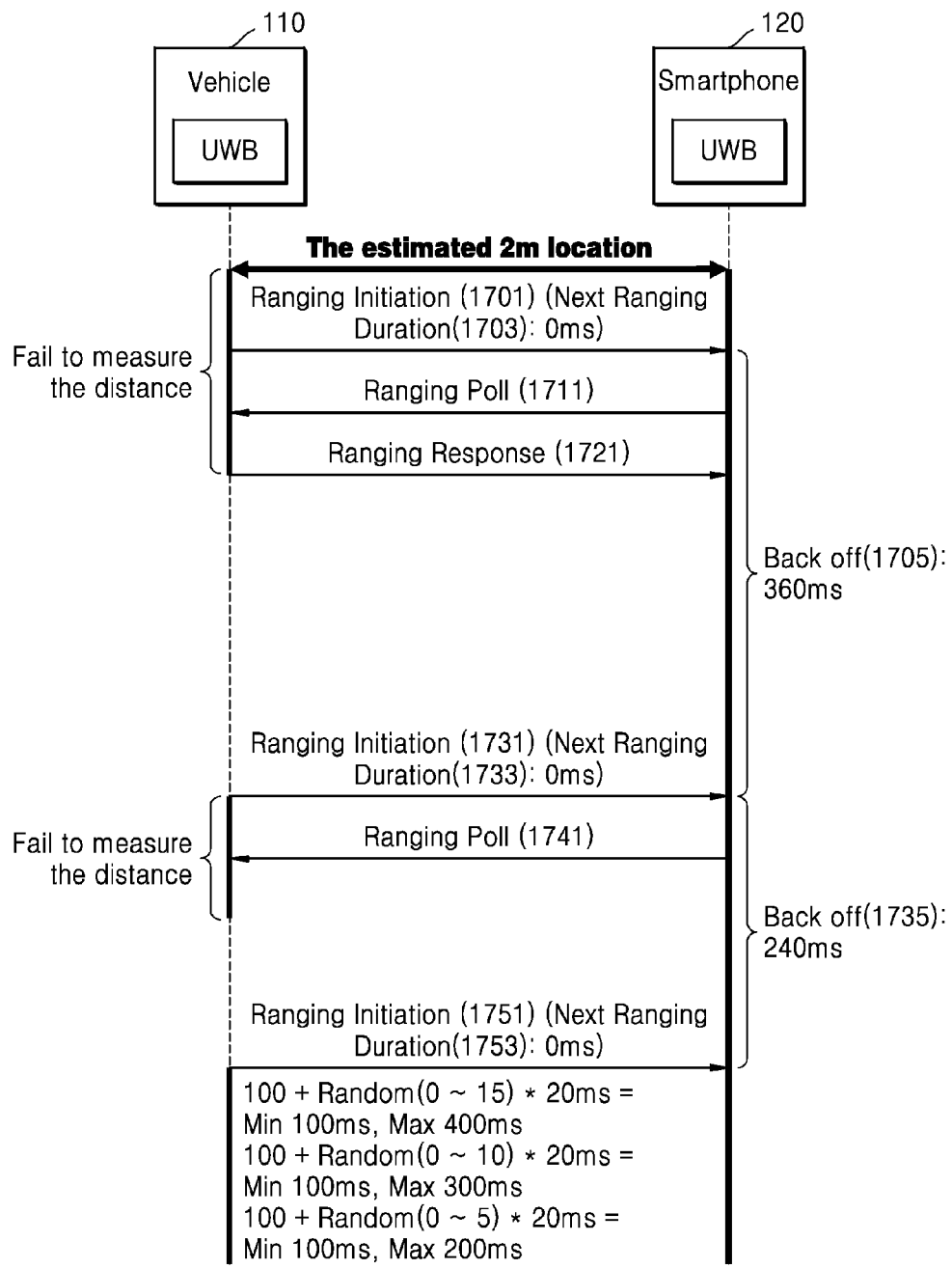
FIG. 17 illustrates a ranging operation of a case in which distance measurement fails when a distance between electronic devices is within a predetermined distance, according to an embodiment.

FIG. 17 illustrates a ranging operation of a case in which distance measurement fails when a distance between electronic devices is within a predetermined distance, according to an embodiment.

The embodiment of FIG. 16 corresponds to a case in which distance measurement is successful when a distance between electronic devices is within a predetermined distance, whereas the embodiment of FIG. 17 corresponds to a case where the distance measurement fails when the distance between electronic devices is within the predetermined distance.

In a case where it is estimated that the second electronic device 120 enters SECURE_DISTANCE, when distance measurement between the first electronic device 110 and the second electronic device 120 fails, the second electronic device 120 may perform a back-off operation.

When (e.g., based on) the distance measurement between the first electronic device 110 and the second electronic device 120 fails, in a first distance re-measurement, the first electronic device 110 and the second electronic device 120 may re-try distance measurement after a FIRST_BACK_OFF time. In a second distance re-measurement, the first electronic device 110 and the second electronic device 120 may re-try the distance measurement after a SECOND_BACK_OFF time. In a third distance re-measurement and thereafter, until the distance measurement becomes successful even once, the first electronic device 110 and the second electronic device 120 may re-try the distance measurement after a LAST_BACK_OFF time.

[Back-Off Time for First Distance Re-Measurement]

FIRST_BACK_OFF=PULL_DOOR_BACK_OFF (100 ms)+FIRST_BACK_OFF_WINDOW (Random(0~15))*RPET (20 ms)

For example, a minimum value of FIRST_BACK_OFF may be 100 ms, and a maximum value thereof may be 400 ms.

[Back-Off Time for Second Distance Re-Measurement]

SECOND_BACK_OFF=PULL_DOOR_BACK_OFF+ SECOND_BACK_OFF_WINDOW (Random (0~10))*RPET (20 ms)

For example, a minimum value of SECOND_BACK_OFF may be 100 ms, and a maximum value thereof may be 300 ms.

[Back-Off Time for Third Distance Re-Measurement Until Successful Distance Measurement]

LAST_BACK_OFF=PULL_DOOR_BACK_OFF+ LAST_BACK_OFF_WINDOW (Random (0~5))* RPET (20 ms): (MIN_LAST_BACK_OFF,MAX_LAST_BACK_OFF)

For example, a minimum value of LAST_BACK_OFF may be 100 ms, and a maximum value thereof may be 200 ms.

As illustrated in FIG. 17, when a first distance measurement between the first electronic device 110 and the second electronic device 120 fails, the first electronic device 110 and the second electronic device 120 may re-try a distance measurement after a back-off time 1705 that is 360 ms between 100 ms to 400 ms.

Even when a second distance measurement fails, the first electronic device 110 and the second electronic device 120 may re-try a distance measurement after a back-off time 1735 that is 240 ms between 100 ms to 300 ms. When it is determined that the second electronic device 120 is located within SECURE_DISTANCE, the second electronic device 120 has to maintain the UWB WAKE UP state and thus a value of Next Ranging Duration 1753 of a Ranging Initiation message 1751 transmitted from the first electronic device 110 is 0 ms.

Figure 18:
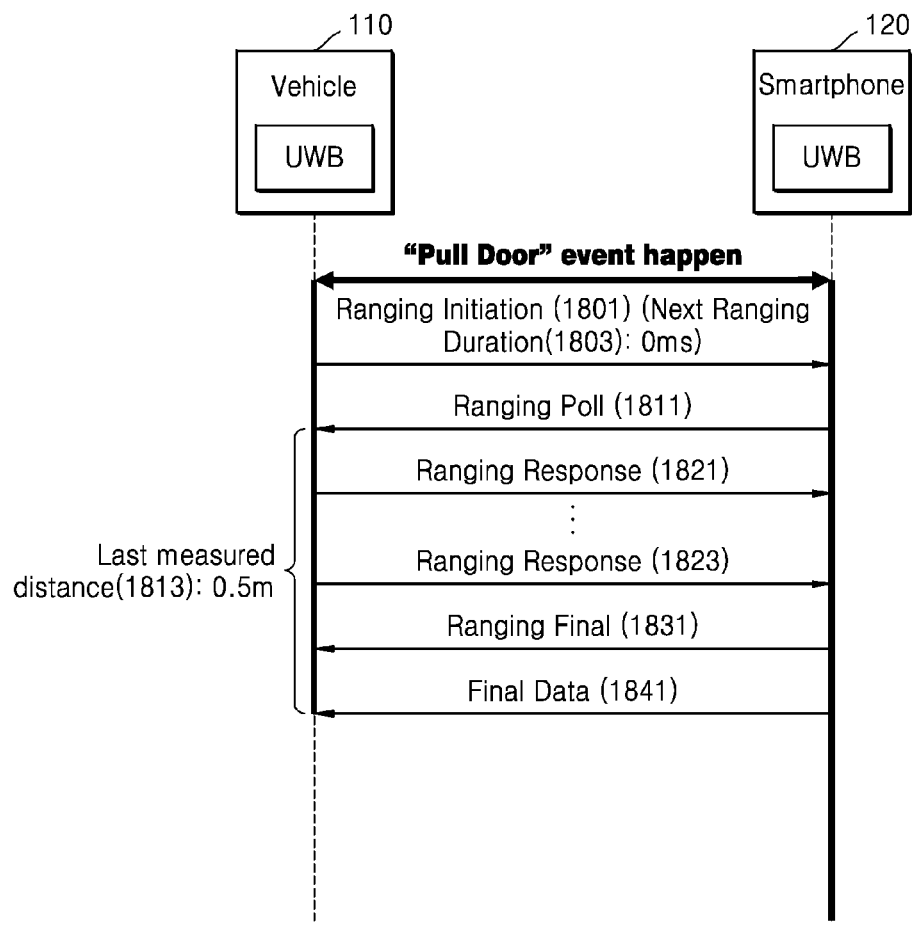
FIG. 18 illustrates a ranging operation of a case in which a predetermined event occurs in an electronic device, according to an embodiment.

FIG. 18 illustrates a ranging operation of a case in which a predetermined event occurs in an electronic device, according to an embodiment.

According to an embodiment, when (e.g., based on or in response to) a predetermined event occurs in the first electronic device 110 (e.g., an event in which a user pulls a vehicle door), the first electronic device 110 and the second electronic device 120 may transceive data via the first communication (e.g., the UWB) and thus may measure an actual distance.

When the predetermined event occurs in the first electronic device 110, the first electronic device 110 may transmit a Ranging Initiation message 1801 to the second electronic device 120 so as to start a distance measurement to the second electronic device 120.

The first electronic device 110 and the second electronic device 120 may estimate a case in which the second electronic device 120 enters SECURE_DISTANCE, based on a measured distance or last received Next Ranging Duration data.

In a case where the second electronic device 120 enters SECURE_DISTANCE, the first electronic device 110 and the second electronic device 120 transit to an UWB WAKE UP state.

Figure 19:
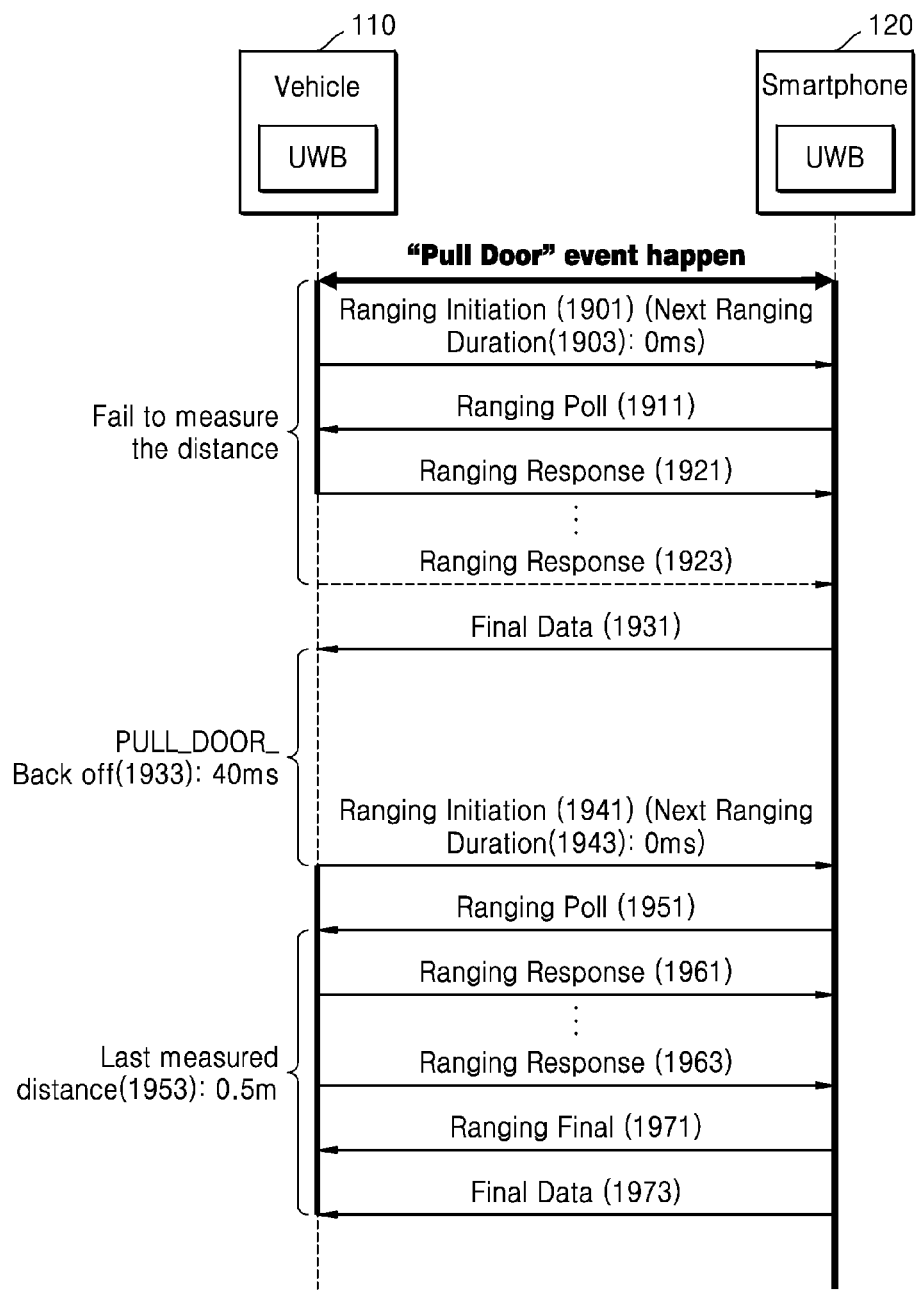
FIG. 19 illustrates a ranging operation of a case in which a predetermined event occurs in an electronic device and distance measurement fails, according to an embodiment.

FIG. 19 illustrates a ranging operation of a case in which a predetermined event occurs in an electronic device and distance measurement fails, according to an embodiment.

When (e.g., based on or in response to) a specific event occurs in the first electronic device 110 (e.g., an event in which a user pulls a vehicle door), the first electronic device 110 and the second electronic device 120 may transceive data via the first communication (e.g., the UWB) and thus may measure an actual distance.

According to an embodiment, when the first electronic device 110 and the second electronic device 120 fail in distance measurement, the first electronic device 110 may re-try the distance measurement after PULL_DOOR_BACK_OFF 1933.

A calculation formula of PULL_DOOR_BACK_OFF is as below:

PULL_DOOR_BACK_OFF=PULL_DOOR_BACK_OFF_WINDOW
(Random(0~5))*RPET (20 ms): (MIN_PULL_
DOOR_BACK_OFF,MAX_PULL_DOOR_
BACK_OFF)

Ex.) PULL_DOOR_BACK_OFF=Random(0~5)*20 ms: (Min 0 ms, Max 100 ms)

When (e.g., based on) a PULL DOOR event occurs and the distance measurement fails, Back Off Window (PULL_DOOR_BACK_OFF_WINDOW) may have a random value between 0 to 5. In the present embodiment, it is assumed that PULL_DOOR_BACK_OFF has a back-off time between 0 ms to 100 ms.

When (e.g., based on) first distance measurement between the first electronic device 110 and the second electronic device 120 fails, the first electronic device 110 may re-try the distance measurement to the second electronic device 120 after PULL_DOOR_BACK OFF (40 ms in the example of FIG. 19).

In the aforementioned embodiments of FIGS. 13 to 19, a Ranging Initiation message including Next Ranging Duration data that is information about a next ranging duration is transmitted from the first electronic device 110 (e.g., a vehicle) to the second electronic device 120 (e.g., a smartphone). In FIGS. 20 to 32 described below, a message including information about a ranging interval may be transmitted from a digital key (DK) device to a vehicle. In embodiments described below, a process of determining a ranging interval according to distances between electronic devices, based on a change in a transmitting entity of a message including ranging interval information.

Figure 20:
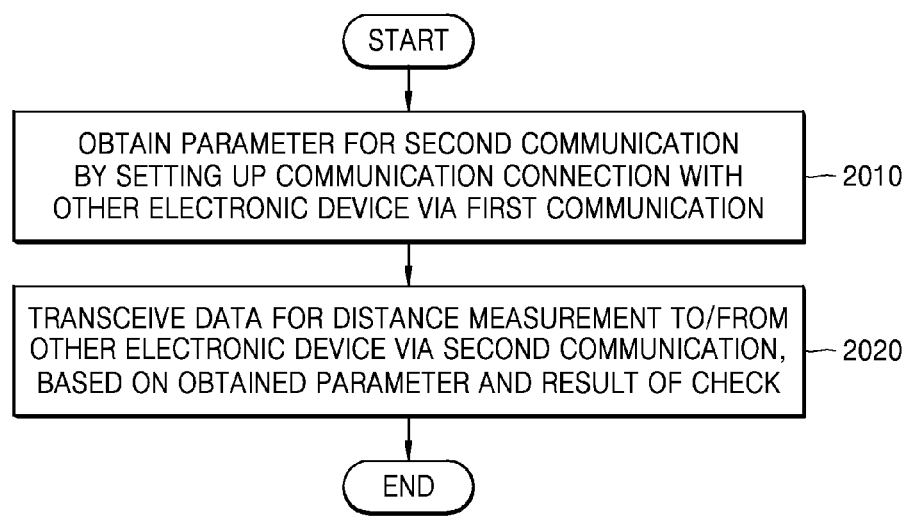
FIG. 20 is a diagram for describing an operation method of an electronic device, according to an embodiment.

FIG. 20 is a diagram for describing an operation method of an electronic device, according to an embodiment. In FIG. 20, the electronic device may be a DK device or a vehicle. The DK device may include a smartphone. In the descriptions below with reference to FIG. 20, the electronic device may indicate the first electronic device 110 and another electronic device may indicate the second electronic device 120. As examples of the first electronic device 110 and the second electronic device 120, a vehicle and a DK device are illustrated in FIG. 20, respectively, but it is understood that this is just an example and one or more other embodiments are not limited thereto.

Referring to FIG. 20, in operation 2010, the electronic device may obtain a parameter for a second communication by setting up a communication connection with the other electronic device via a first communication. In an embodiment, the first communication may include BLE, Wi-Fi, or UWB. The second communication may include UWB. In an embodiment, the parameter for the second communication may include a channel preamble, a PRF, and a data rate. That is, the electronic device may set up the communication connection with the other electronic device via the first communication. Afterward, the electronic device may exchange parameters for the second communication with the other electronic device.

In operation 2020, the electronic device may transceive data for distance measurement to/from the other electronic device via the second communication, based on the obtained parameter and a result of a check. For example, the electronic device may exchange the parameter for the second communication with the other electronic device and then may set up a communication environment for the second communication to correspond to the exchanged parameter. After setting up the communication environment for the second communication, the electronic device may measure a distance to the other electronic device via the second communication. In an embodiment, the checked result may indicate a result of checking, by using the second communication, an SHR preamble and a CFP slot that are available in the first communication.

According to embodiments, terms used in a process of measuring an actual distance between the first electronic device 110 and the second electronic device 120 by exchanging data between the first electronic device 110 and the second electronic device 120 via the second communication are described as below.

A ranging round length (RRL) may indicate a time taken to exchange data for measurement of a distance between the first electronic device 110 and the second electronic device 120 and locations thereof. In an embodiment, a value of the RRL may be assumed to be 20 ms (e.g., Ranging Round length between Vehicle and DK Device, default is 20 ms).

SECURE_DISTANCE may indicate a distance at which a predetermined event has to occur in the first electronic device 110 when the second electronic device 120 is located within a specific distance and is at a location from the first electronic device 110. For example, SECURE_DISTANCE may indicate a distance at which a door of a vehicle has to be unlocked. In an embodiment, a default value of SECURE_DISTANCE may be set to be 2 m. In another embodiment, SECURE_DISTANCE may indicate a distance at which the door of the vehicle is to be locked.

AWSH may indicate an average moving speed of a person. In an embodiment, a value of the AWSH may be assumed to be 1.5 m/s (e.g., Average Walking Speed of Human, default is 1.5 m/s).

A ranging control period (RCP) may indicate a period of transmitting a ranging control message (RCM) including a value of a time interval from current ranging to initiation of next ranging. In an embodiment, the value of the time interval may be referred to as a next ranging duration.

A polling period (PP) may indicate a period in which the DK device transmits a poll message to an anchor of the vehicle. In an embodiment, the DK device may be an initiator that transmits the poll message, and the anchor of the vehicle may be a responder that receives the poll message.

A ranging response period (RRP) may indicate a period in which the anchor of the vehicle transmits a response message to the DK device.

A measurement report period (MRP) may indicate a period in which data related to ranging is exchanged between the vehicle and the DK device. In the period, the vehicle may transmit a ranging result to the DK device.

A ranging interval update period (RIUP) may indicate a period in which the value of the time interval until the DK device initiates a next ranging may be changed.

In an embodiment, when the vehicle and the DK device fail to receive a frame during a ranging period, a time to initiate a next ranging (i.e., a back-off time) may be changed in the MRP period or the RIUP period. In an embodiment, DS-TWR with three messages may be assumed as a ranging method.

PULL_DOOR_BACK_OFF may indicate a back-off period when a predetermined event occurs in the first electronic device 110. The predetermined event may be an operation of pulling a door of the first electronic device 110. A maximum value and a minimum value of PULL_DOOR_BACK_OFF may be respectively expressed as MAX_PULL_DOOR_BACK_OFF (ms) and MIN_PULL_DOOR_BACK_OFF (ms) (e.g., PULL_DOOR_BACK_OFF: Back off duration when "Pull Door" event happens, Maximum is MAX_PULL_DOOR_BACK_OFF (ms), Minimum is MIN_PULL_DOOR_BACK_OFF (ms).

MAX_PULL_DOOR_BACK_OFF may indicate a maximum back-off period when a predetermined event occurs in the first electronic device 110. The predetermined event may be an operation of pulling a door of the first electronic device 110. A default value of MAX_PULL_DOOR_BACK_OFF may be 100 ms (e.g., MAX_PULL_DOOR_BACK_OFF: Max back off duration when "Pull Door" event happens, default is 100 ms).

MIN_PULL_DOOR_BACK_OFF may indicate minimum back-off duration when the predetermined event occurs in the first electronic device 110. The predetermined event may be the operation of pulling a door of the first electronic device 110. A default value of MIN_PULL_DOOR_BACK_OFF may be 0 ms (e.g., MIN_PULL_DOOR_BACK_OFF: Minimum back off duration when "Pull Door" event happens, default is 0 ms).

PULL_DOOR_BACK_OFF_WINDOW may indicate a scope of a back-off window with respect to PULL_DOOR_BACK. The back-off window may refer to a unit of a back-off operation. A default value of PULL_DOOR_BACK_OFF_WINDOW may be a random value from among real values between 0 to 5 (e.g., PULL_DOOR_BACK_OFF_WINDOW: The range of back off window for PULL_DOOR_BACK_OFF, default is random(0~5)).

FIRST_BACK_OFF may indicate a first re-try back-off time when a location of the second electronic device 120 is within SECURE_DISTANCE from the first electronic device 110. A maximum value of FIRST_BACK_OFF may be expressed as MAX_FIRST_BACK_OFF, and a minimum value of FIRST_BACK_OFF may be expressed as MIN_FIRST_BACK_OFF (e.g., FIRST_BACK_OFF: First re-try back off duration when the location of Smartphone is within 0~SECURE_DISTANCE (m), Maximum is MAX_FIRST_BACK_OFF (ms), Minimum is MIN_FIRST_BACK_OFF (ms)).

MAX_FIRST_BACK_OFF may indicate a maximum value of the first re-try back-off time when the location of the second electronic device 120 is within SECURE_DISTANCE from the first electronic device 110. A default value of MAX_FIRST_BACK_OFF may be 400 ms (e.g., MAX_FIRST_BACK_OFF: First re-try max back off duration when the location of Smartphone is within 0~SECURE_DISTANCE (m), default is 400 ms).

MIN_FIRST_BACK_OFF may indicate a minimum value of the first re-try back-off time when the location of the second electronic device 120 is within SECURE_DISTANCE from the first electronic device 110. A default value of MIN_FIRST_BACK_OFF may be 100 ms (e.g., MIN_FIRST_BACK_OFF: First re-try minimum back off duration when the location of Smartphone is within 0~SECIRE_DISTANCE (m), default is 100 ms).

FIRST_BACK_OFF_WINDOW may indicate a scope of the back-off window with respect to FIRST_BACK_OFF. The back-off window may refer to the unit of the back-off operation. A default value of FIRST_BACK_OFF_WINDOW may be a random value from among real values between 0 to 15 (e.g., FIRST_BACK_OFF_WINDOW: The range of back off window for FIRST_BACK_OFF, default is random(0~15)).

SECOND_BACK_OFF may indicate a second re-try back-off time when the location of the second electronic device 120 is within SECURE_DISTANCE from the first electronic device 110. A maximum value of SECOND_BACK_OFF may be expressed as MAX_SECOND_BACK_OFF, and a minimum value of SECOND_BACK_OFF may be expressed as MAX_SECOND_BACK_OFF (e.g., SECOND_BACK_OFF: Second re-try back off duration when the location of Smartphone is within 0~SECURE_ DISTANCE (m), Maximum is MAX_SECOND_BACK_ OFF (ms), Minimum is MIN_SECOND_BACK_OFF (ms)).

MAX_SECOND_BACK_OFF may indicate a maximum value of the second re-try back-off time when the location of the second electronic device 120 is within SECURE_DISTANCE from the first electronic device 110. A default value of MAX_SECOND_BACK_OFF may be 300 ms (e.g., MAX_SECOND_BACK_OFF: Second re-try max back off duration when the location of Smartphone is within 0~SECURE_DISTANCE (m), default is 300 ms).

MIN_SECOND_BACK_OFF may indicate a minimum value of the second re-try back-off time when the location of the second electronic device 120 is within SECURE_DISTANCE from the first electronic device 110. A default value of MIN_SECOND_BACK_OFF may be 100 ms (e.g., MIN_ SECOND_BACK_OFF: Second re-try minimum back off duration when the location of Smartphone is within 0~SECURE_DISTANCE (m), default is 100 ms).

SECOND_BACK_OFF_WINDOW may indicate a scope of the back-off window with respect to SECOND_BACK_OFF. The back-off window may refer to the unit of the back-off operation. A default value of SECOND_BACK_OFF_WINDOW may be a random value from among real values between 0 to 10 (e.g., SECOND_BACK_OFF_WINDOW: The range of back off window for SECOND_BACK_OFF, default is random(0~10)).

LAST_BACK_OFF may indicate a re-try back-off duration until ranging is successful from a third re-try when the location of the second electronic device 120 is within SECURE_DISTANCE from the first electronic device 110. A maximum value of LAST_BACK_OFF may be expressed as MAX_LAST_BACK_OFF, and a minimum value of LAST_BACK_OFF may be expressed as MIN_LAST_BACK_OFF (e.g., LAST_BACK_OFF: Re-try back off duration from third re-try until ranging is successful when the location of Smartphone is within 0~SECURE_DISTANCE (m), Maximum is MAX_LAST_BACK_OFF (ms), Minimum is MIN_LAST_BACK_OFF (ms)).

MAX_LAST_BACK_OFF may indicate a maximum re-try back-off duration until ranging is successful from the third re-try when the location of the second electronic device 120 is within SECURE_DISTANCE from the first electronic device 110. A default value of MAX_LAST_BACK_OFF may be 200 ms (e.g., MAX_LAST_BACK_OFF: Re-try max back off duration from third re-try until ranging is successful when the location of Smartphone is within 0~SECURE_DISTANCE (m), default is 200 ms).

MIN_LAST_BACK_OFF may indicate a minimum re-try back-off duration until ranging is successful from the third re-try when the location of the second electronic device 120 is within SECURE_DISTANCE from the first electronic device 110. A default value of MIN_LAST_BACK_OFF may be 100 ms (e.g., MIN_LAST_BACK_OFF: Re-try minimum back off duration from third re-try until ranging is successful when the location of Smartphone is within 0~SECURE_DISTANCE (m), default is 100 ms).

LAST_BACK_OFF_WINDOW may indicate a scope of the back-off window with respect to LAST_BACK_OFF. The back-off window may refer to the unit of the back-off operation. A default value of LAST_BACK_OFF_WINDOW may be a random value from among real values between 0 to 5 (e.g., LAST_BACK_OFF_WINDOW: The range of back off window for LAST_BACK_OFF, default is random(0~5)).

SUCCESS_BACK_OFF may indicate an interval for a next ranging session after ranging is successful. A maximum value of SUCCESS_BACK_OFF may be expressed as MAX_SUCCESS_BACK_OFF, and a minimum value of SUCCESS_BACK_OFF may be expressed as MIN_SUCCESS_BACK_OFF (e.g., SUCCESS_BACK_OFF: The interval for next ranging session after the ranging is successful, Maximum is MAX_SUCCESS_BACK_OFF (ms), Minimum is MIN_SUCCESS_BACK_OFF (ms)).

MAX_SUCCESS_BACK_OFF may indicate a maximum interval for the next ranging session after ranging is successful. A default value of MAX_SUCCESS_BACK_OFF may be 800 ms (e.g., MAX_SUCCESS_BACK_OFF: The max interval for next ranging session after the ranging is successful, default is 800 ms).

MIN_SUCCESS_BACK_OFF may indicate a minimum interval for the next ranging session after ranging is successful. A default value of MIN_SUCCESS_BACK_OFF may be 400 ms (e.g., MIN_SUCCESS_BACK_OFF: The minimum interval for next ranging session after the ranging is successful, default is 400 ms).

SUCCESS_BACK_OFF_WINDOW may indicate a scope of the back-off window with respect to SUCCESS_BACK_OFF. The back-off window may refer to the unit of the back-off operation. A default value of SUCCESS_BACK_OFF_WINDOW may be a random value from among real values between 0 to 20 (e.g., SUCCESS_BACK_OFF_WINDOW: The range of back off window for SUCCESS_BACK_OFF, default is random(0~20)).

NORMAL_BACK_OFF may indicate a back-off time when the location of the second electronic device is over SECURE_DISTANCE from the first electronic device. A maximum value of NORMAL_BACK_OFF may be expressed as MAX_NORMAL_BACK_OFF, and a minimum value of NORMAL_BACK_OFF may be expressed as MIN_NORMAL_BACK_OFF (e.g., NORMAL_BACK_OFF: Back off duration when the location of Smartphone is over SECURE_DISTANCE, Maximum is MAX_NORMAL_BACK_OFF (ms), Minimum is MIN_NORMAL_BACK_OFF (ms)).

MAX_NORMAL_BACK_OFF may indicate a maximum back-off time when the location of the second electronic device is over SECURE_DISTANCE from the first electronic device. A default value of MAX_NORMAL_BACK_OFF may be 800 ms (e.g., MAX_NORMAL_BACK_OFF: Max back off duration when the location of Smartphone is over SECURE_DISTANCE, default is 800 ms).

MIN_NORMAL_BACK_OFF may indicate a minimum back-off time when the location of the second electronic device 120 is over SECURE_DISTANCE from the first electronic device 110. A default value of MIN_NORMAL_BACK_OFF may be 400 ms (e.g., MIN_NORMAL_BACK_OFF: Minimum back off duration when the location of Smartphone is over SECURE_DISTANCE, default is 400 ms).

NORMAL_BACK_OFF_WINDOW may indicate a scope of the back-off window with respect to NORMAL_BACK_OFF. A default value of NORMAL_BACK_OFF_WINDOW may be a random value from among real values between 0 to 20 (e.g., NORMAL_BACK_OFF_WINDOW: The range of back off window for NORMAL_BACK_OFF, default is random(0~20)).

NRD_IN_RANGE may indicate next ranging duration when the location of the second electronic device 120 is within SECURE_DISTANCE from the first electronic device 110 and ranging is successful. A maximum value of NRD_IN_RANGE may be expressed as MAX_NRD_IN_RANGE, and a minimum value of NRD_IN_RANGE may be expressed as MIN_NRD_IN_RANGE (e.g., NRD_IN_RANGE: Next Ranging Duration when the location of the smartphone is within 0~SECURE_DISTANCE and ranging is successful, Maximum is MAX_NRD_IN_RANGE (ms), Minimum is MIN_NRD_IN_RANGE (ms)).

MAX_NRD_IN_RANGE may indicate a maximum value of the next ranging duration when the location of the second electronic device 120 is within SECURE_DISTANCE from the first electronic device 110 and ranging is successful. A default value of MAX_NRD_IN_RANGE maybe 400 ms (e.g., MAX_NRD_IN_RANGE: Max Next Ranging Duration when the location of the smartphone is within 0~SECURE_DISTANCE and ranging is successful, default is 400 ms).

MIN_NRD_IN_RANGE may indicate a minimum value of the next ranging duration when the location of the second electronic device 120 is within SECURE_DISTANCE from the first electronic device 110 and ranging is successful. A default value of MIN_NRD_IN_RANGE maybe 800 ms (e.g., MIN_NRD_IN_RANGE: Minimum Next Ranging Duration when the location of Smartphone is within 0~SECURE_DISTANCE and ranging is successful, default is 800 ms).

NRD_IN_RANGE_WINDOW may indicate a scope of the back-off window with respect to NRD_IN_RANGE. The back-off window may refer to the unit of the back-off operation. A default value of NRD_IN_RANGE_WINDOW may be a random value from among real values between 0 to 20 (e.g., NRD_IN_RANGE_WINDOW: The range of back off window for NRD_IN_RANGE, default is random (0~20)).

MAX_DISTANCE_VALUE may indicate a distance from the first electronic device 110. MAX_DISTANCE_VALUE may be related to NRD_OUT_RANGE. A default value of MAX_DISTANCE_VALUE may be 5 m (e.g., MAX_DISTANCE_VALUE: The distance(m) from the vehicle using the NRD_OUT_RANGE, default is 5 m).

FORECAST_DISTANCE may indicate an estimated distance of the second electronic device 120 which is related to a movement distance and a last measured distance (e.g., FORECAST_DISTANCE: The estimated distance (m) of Smartphone relative to the move and the last measured distance). FORECAST_DISTANCE may be calculated as below:

FORECAST_DISTANCE=The last measured distance (m)−(The elapsed time from the time of the last measure*AWSH (1.5 m/s)).

In this regard, "The elapsed time from the time of the last measure" may indicate the next ranging duration.

NRD_OUT_RANGE may indicate the next ranging duration when the location of the second electronic device 120 is within MAX_DISTANCE_VALUE from SECURE_DISTANCE. NRD_OUT_RANGE is a value related to FORECAST_DISTANCE. A maximum value of NRD_OUT_RANGE may be expressed as MAX_NRD_OUT_RANGE, and a minimum value of NRD_OUT_RANGE may be expressed as MIN_NRD_OUT_RANGE (e.g., NRD_OUT_RANGE: Next Ranging Duration when the location of Smartphone is within SECURE_DISTANCE~MAX_DISTANCE_VALUE, It is relative to the FORECAST_DISTANCE, Maximum is MAX_NRD_OUT_RANGE (ms), Minimum is MIN_NRD_OUT_RANGE (ms)).

MAX_NRD_OUT_RANGE may indicate a maximum value of the next ranging duration when the location of the second electronic device 120 is within MAX_DISTANCE_VALUE from SECURE_DISTANCE. A default value of MAX_NRD_OUT_RANGE may be 1000 ms (e.g., MAX_NRD_OUT_RANGE: Max Next Ranging Duration when the location of Smartphone is within SECURE_DISTANCE~MAX_DISTANCE_VALUE, It is relative to the FORECAST_DISTANCE, default is 1000 ms).

MIN_NRD_OUT_RANGE may indicate a minimum value of the next ranging duration when the location of the second electronic device 120 is within MAX_DISTANCE_VALUE from SECURE_DISTANCE. A default value of MAX_NRD_OUT_RANGE may be 400 ms (e.g., MIN_NRD_OUT_RANGE: Minimum Next Ranging Duration when the location of Smartphone is within SECURE_DISTANCE~MAX_DISTANCE_VALUE, It is relative to the FORECAST_DISTANCE, default is 400 ms).

NRD_OUT_RANGE_WINDOW may indicate a scope of the back-off window with respect to NRD_OUT_RANGE. The back-off window may refer to the unit of the back-off operation. A default value of NRD_OUT_RANGE_WINDOW may be a random value from among real values between 0 to 20 (e.g., NRD_OUT_RANGE_WINDOW: The range of back off window for NRD_OUT_RANGE, default is random(0~20)).

BASIC_DURATION may indicate a value obtained by dividing MAX_FIRST_BACK_OFF by SECURE_DISTANCE. A default value of BASIC_DURATION may be 200 ms (e.g., BASIC_DURATION: The value (ms) that MAX_FIRST_BACK_OFF(ms) divided by SECURE_DISTANCE(m), default is 200 ms).

NRD_MAX_RANGE may indicate the next ranging duration when the location of the second electronic device 120 is over MAX_DISTANCE_VALUE and ranging is successful. A maximum value of NRD_MAX_RANGE may be expressed as MAX_NRD_MAX_RANGE, and a minimum value of NRD_MAX_RANGE may be expressed as MIN_NRD_MAX_RANGE (e.g., NRD_MAX_RANGE: Next Ranging Duration when the location of Smartphone is over MAX_DISTANCE_VALUE and ranging is successful, Maximum is MAX_NRD_MAX_RANGE (ms), Minimum is MIN_NRD_MAX_RANGE (ms)).

MAX_NRD_MAX_RANGE may indicate a maximum value of the next ranging duration when the location of the second electronic device 120 is over MAX_DISTANCE_VALUE and ranging is successful. A default value of MAX_NRD_MAX_RANGE may be 1400 ms (e.g., MAX_NRD_MAX_RANGE: Max Next Ranging Duration when the location of Smartphone is over MAX_DISTANCE_VALUE and ranging is successful, default is 1400 ms).

MIN_NRD_MAX_RANGE may indicate a minimum value of the next ranging duration when the location of the second electronic device 120 is over MAX_DISTANCE_VALUE and ranging is successful. A default value of MIN_NRD_MAX_RANGE may be 1000 ms (e.g., MIN_NRD_MAX_RANGE: Minimum Next Ranging Duration when the location of Smartphone is over MAX_DISTANCE_VALUE and ranging is successful, default is 1000 ms).

NRD_MAX_RANGE_WINDOW may indicate a scope of the back-off window with respect to NRD_MAX_RANGE. The back-off window may refer to the unit of the back-off operation. A default value of NRD_MAX_RANGE_WINDOW may be a random value from among real values between 0 to 20 (e.g., NRD_MAX_RANGE_WINDOW: The range of back off window for NRD_MAX_RANGE, default is random(0~20)).

SECURE_DISTANCE_TIME_FOR_VEHICLE may indicate a time to estimate the location of the second electronic device 120 within a range of SECURE_DISTANCE with respect to the first electronic device 110 (e.g., SECURE_DISTANCE_TIME_FOR_VEHICLE: The time (s) to estimate the location of Smartphone within SECURE_DISTANCE for the vehicle-side). SECURE_DISTANCE_TIME_FOR_VEHICLE may be calculated as below:

(The last measured distance(m)−SECURE_DISTANCE)/AWSH(1.5 m/s).

SECURE_DISTANCE_TIME_FOR_SMARTPHONE may indicate a time to estimate the location of the second electronic device 120 within a range of SECURE_DISTANCE with respect to the second electronic device 120 (e.g., SECURE_DISTANCE_TIME_FOR_SMARTPHONE: The time (s) to estimate the location of Smartphone within SECURE_DISTANCE for the smartphone-side). SECURE_DISTANCE_TIME_FOR_SMARTPHONE may be calculated as below:

(The last measured distance(m)−SECURE_DISTANCE)/AWSH(1.5 m/s).

Figure 21:
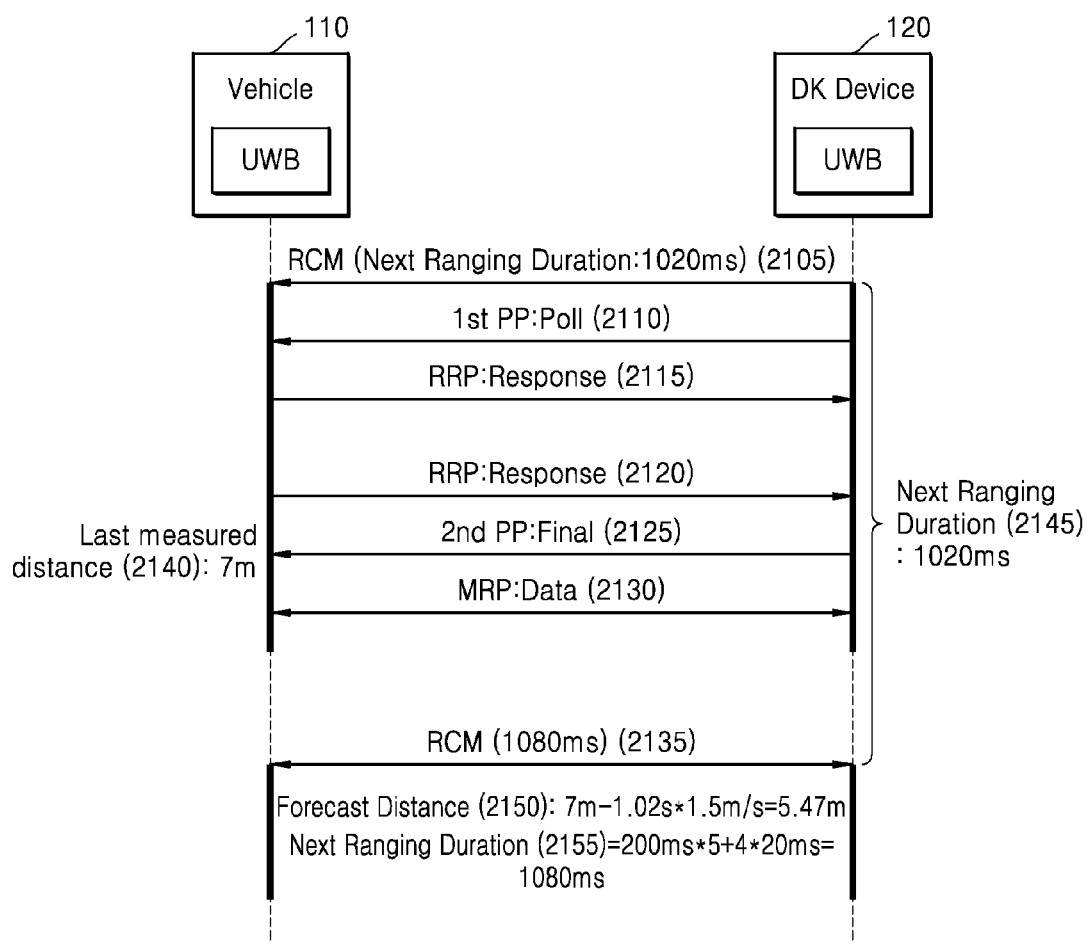
FIG. 21 is a diagram for describing a ranging operation for measuring a distance between electronic devices, according to an embodiment.

FIG. 21 is a diagram for describing a ranging operation for measuring a distance between electronic devices, according to an embodiment. FIG. 21 illustrates Vehicle and DK Device as respective examples of the first electronic device 110 and the second electronic device 120, but it is understood that this is just an example and one or more other embodiments are not limited thereto.

Referring to FIG. 21, the second electronic device 120 may transmit a RCM 2105 to initiate a process of distance measurement with respect to the first electronic device 110. In an embodiment, the RCM 2105 may include Next Ranging Duration data 2145 that is information about a next ranging duration. The Next Ranging Duration data 2145 may include information about a period in which the second electronic device 120 initiates a next distance measurement operation. In detail, the Next Ranging Duration data 2145 may indicate an interval between the RCM 2105 and a next RCM 2105. As illustrated in FIG. 21, the Next Ranging Duration data 2145 may, by way of example, be 1020 ms.

In a 1$^{st}$ PP, the second electronic device 120 may transmit, to the first electronic device 110, a Poll message 2110 that is a reference message with respect to distance measurement.

In an RRP, the first electronic device 110 may transmit a Response 2115 and a Response 2120, in response to the received Poll message 2110. In the example of FIG. 21, two Responses are illustrated but the number of Responses may be more than 2.

In a 2$^{nd}$ PP, the second electronic device 120 may transmit, to the first electronic device 110, a Final message 2125 indicating an end of a ranging operation.

The first electronic device 110 and the second electronic device 120 may exchange, in an MRP, data 2130 related to ranging. For example, the first electronic device 110 may transmit a ranging result to the second electronic device 120. In an embodiment, the transmitting of the Final message 2125 and the exchanging of the data 2130 may be integrated to one operation.

In an embodiment, a Last measured distance 2140 indicating a most recently measured distance may be calculated based on the Poll message 2110, the Response 2115, the Response 2120, the Final message 2125, and the data 2130. In the example of FIG. 21, the Last measured distance 2140 may be calculated to be 7 m.

In an embodiment, a Forecast Distance 2150 indicating an estimated distance may be calculated as below, based on the Last measured distance 2140, the Next Ranging Duration 2145, and an AWSH.

Forecast Distance 2150=Last measured distance 2140−Next Ranging Duration 2145*AWSH. For example, when the Last measured distance 2140 is 7 m, the Next Ranging Duration 2145 is 1020 ms, and the AWSH is 1.5 m/s, the Forecast Distance 2150 may be calculated as 5.47 m.

In an embodiment, to further accurately calculate the Forecast Distance 2150, a time between a point of time when the second electronic device 120 transmitted a frame in the MRP and a point of time when the second electronic device 120 transmits a next RCM may be considered. In this regard, a formula that is Next Ranging Duration−Slot length*(N+3) may be used. N may indicate the number of anchors.

In an embodiment, Next Ranging Duration 2155 indicating a next ranging duration may be calculated as 200 ms*5+4*20 ms=1080 ms. For further calculation descriptions, a method described above with reference to FIG. 13 may be referred to.

When the first electronic device 110 and the second electronic device 120 finish distance measurement, the first electronic device 110 and the second electronic device 120 may transit to an UWB SLEEP state until a time of Next Ranging Duration. In the UWB SLEEP state, an operation of measuring a distance by using the UWB is temporarily stopped.

After the time of Next Ranging Duration, the first electronic device 110 and the second electronic device 120 may transit to an UWB WAKE UP state and, thus, may perform distance measurement. In the UWB WAKE UP state, the operation of measuring a distance by using the UWB is resumed. As described above, the first electronic device 110 and the second electronic device 120 may measure an actual distance between the first electronic device 110 and the second electronic device 120 by transceiving data via the second communication (e.g., the UWB).

Figure 22:
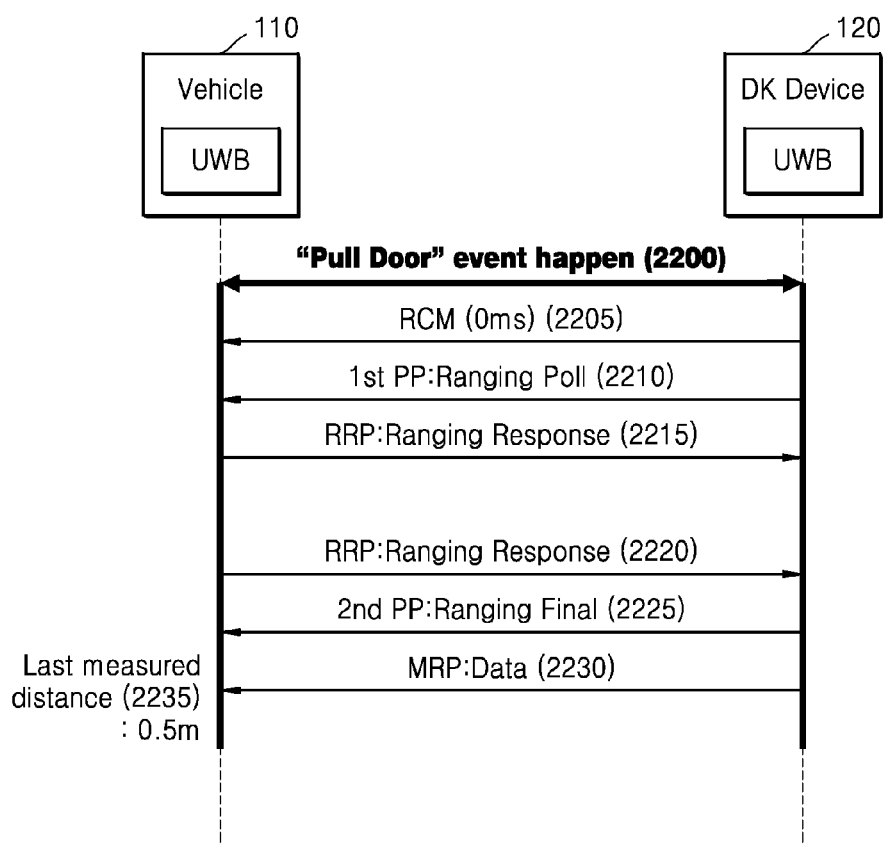
FIG. 22 illustrates a ranging operation for measuring a distance between electronic devices when a predetermined event occurs in an electronic device, according to an embodiment.

FIG. 22 illustrates a ranging operation for measuring a distance between electronic devices when (e.g., based on) a predetermined event occurs in an electronic device, according to an embodiment. FIG. 22 illustrates Vehicle and DK Device as respective examples of the first electronic device 110 and the second electronic device 120, but it is understood that these are just examples and one or more other embodiments are not limited thereto.

Referring to FIG. 22, the predetermined event occurring in the first electronic device 110 may indicate an event in which a user pulls a door of Vehicle. In an embodiment, when the predetermined event occurs, the first electronic device 110 and the second electronic device 120 may measure an actual distance between the first electronic device 110 and the second electronic device 120 by transceiving data via the second communication. In an embodiment, the first electronic device 110 and the second electronic device 120 may estimate that the second electronic device 120 is to enter SECURE_DISTANCE (e.g., 2 m) from the first electronic device 110, based on a last measured distance or last received data related to Next Ranging Duration. In an embodiment, when the second electronic device 120 enters SECURE_DISTANCE from the first electronic device 110, the first electronic device 110 and the second electronic device 120 may transit to an UWB WAKE UP state. Further, when the predetermined event occurs in the first electronic device 110, the second electronic device 120 may transmit data expressed as a RCM to the first electronic device 110 so as to initiate distance measurement with respect to the first electronic device 110. By doing so, the second electronic device 120 may initiate the distance measurement. When the distance measurement fails, the first electronic device 110 may re-try the distance measurement after a certain time of back off. An embodiment in which the distance measurement is re-tried after a certain time of back off is described below with reference to FIG. 23.

In an embodiment, the RCM transmitted from the second electronic device 120 to the first electronic device 110 may include a ranging interval value that is information about a next ranging duration. Furthermore, the ranging interval value included in the RCM may be changed according to an interval calculation formula of a vehicle original equipment manufacturer (OEM). In the example of FIG. 22, the ranging interval value may be set as 0 ms. Operations of the first electronic device 110 and the second electronic device 120, which are illustrated in FIG. 22, are described in detail below.

The predetermined event may occur in the first electronic device 110. For example, the predetermined event may indicate a pull door event 2200 in which a door of a vehicle is pulled.

When the predetermined event occurs, the second electronic device 120 may transmit a RCM 2205 to the first electronic device 110. In an embodiment, a ranging interval value included in the RCM 2205 may be 0 ms.

In a 1$^{st}$ PP, the second electronic device 120 may transmit, to the first electronic device 110, a Ranging Poll message 2210 that is a reference message with respect to distance measurement.

In an RRP, the first electronic device 110 may transmit a Ranging Response 2215 and a Ranging Response 2220, in response to the received Ranging Poll message 2210. In the example of FIG. 22, two Ranging Responses are illustrated but the number of Ranging Responses may be more than 2.

In a 2$^{nd}$ PP, the second electronic device 120 may transmit, to the first electronic device 110, a Ranging Final message 2225 indicating an end of the ranging operation.

The first electronic device 110 and the second electronic device 120 may exchange, in an MRP, data 2230 related to ranging. For example, the first electronic device 110 may transmit a ranging result to the second electronic device 120.

In an embodiment, the transmitting of the Ranging Final message 2225 and the exchanging of the data 2230 may be integrated into one operation.

In an embodiment, a Last measured distance 2235 indicating a most recently measured distance may be calculated based on the Ranging Poll message 2210, the Ranging Response 2215, the Ranging Response 2220, the Ranging Final message 2225, and the data 2230. In the example of FIG. 22, the Last measured distance 2235 may be calculated to be 0.5 m.

Figure 23:
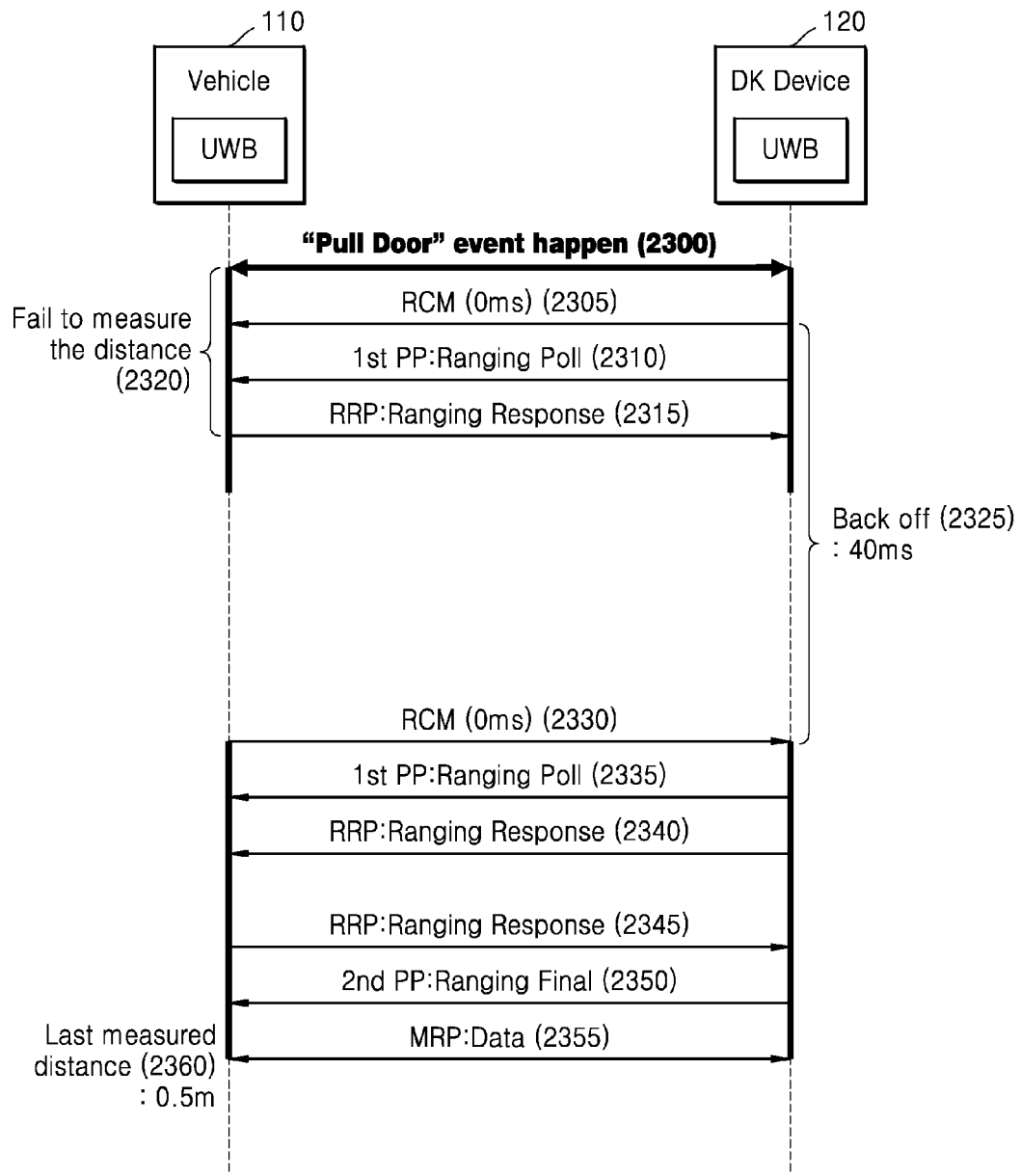
FIG. 23 illustrates a ranging operation of a case in which distance measurement between electronic devices fails when a predetermined event occurs in an electronic device, according to an embodiment.

FIG. 23 illustrates a ranging operation of a case in which distance measurement between electronic devices fails when a predetermined event occurs in an electronic device, according to an embodiment. FIG. 23 illustrates Vehicle and DK Device as respective examples of the first electronic device 110 and the second electronic device 120, but it is understood that these are just examples and one or more other embodiments are not limited thereto.

Referring to FIG. 23, the predetermined event occurring in the first electronic device 110 may indicate an event in which a user pulls a door of Vehicle. In an embodiment, when (e.g., based on) the predetermined event occurs, the first electronic device 110 and the second electronic device 120 may measure an actual distance between the first electronic device 110 and the second electronic device 120 by transceiving data via the second communication. FIG. 23 illustrates operations of the first electronic device 110 and the second electronic device 120 when the first electronic device 110 and the second electronic device 120 fail to measure a distance in the aforementioned process of measuring the distance.

The predetermined event may occur in the first electronic device 110. For example, the predetermined event may indicate a pull door event 2300 in which a door of a vehicle is pulled.

When the predetermined event occurs, the second electronic device 120 may transmit a RCM 2305 to the first electronic device 110. In an embodiment, a ranging interval value included in the RCM 2305 may be 0 ms.

In a $1^{st}$ PP, the second electronic device 120 may transmit, to the first electronic device 110, a Ranging Poll message 2310 that is a reference message with respect to distance measurement.

In an RRP, the first electronic device 110 may transmit a Ranging Response 2315, in response to the received Ranging Poll message 2310.

In an embodiment, the first electronic device 110 and the second electronic device 120 may fail to measure the distance (2320). The first electronic device 110, after failure in first distance measurement, may re-try distance measurement with respect to the second electronic device 120 after PULL_DOOR_BACK_OFF. In an embodiment, a value of PULL_DOOR_BACK_OFF may be a value of Back off 2325 in FIG. 23, which is exemplified as 40 ms.

Figures 24, 25:
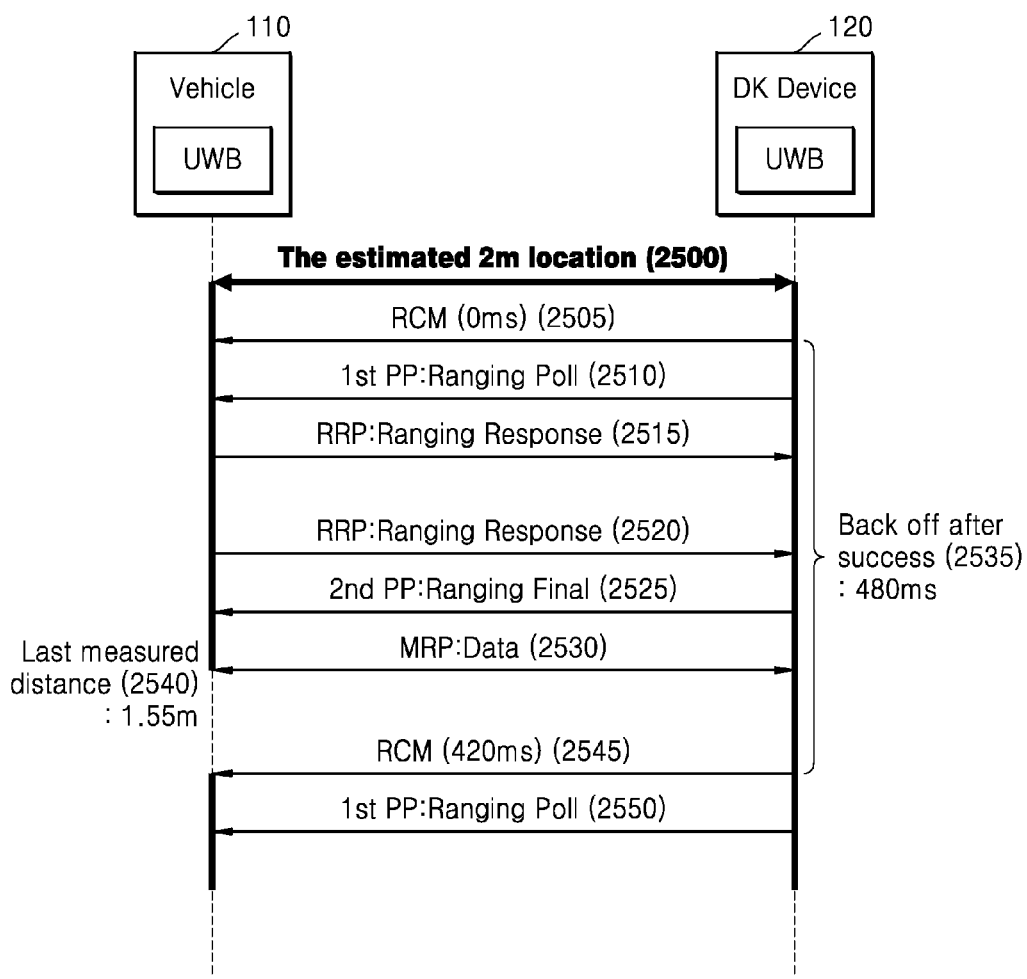
FIG. 24 illustrates a method of determining a back-off time when a predetermined event occurs in an electronic device, according to an embodiment.
FIG. 25 is a diagram for describing a ranging operation for distance measurement when a distance between electronic devices is within a predetermined distance, according to an embodiment.

FIG. 24 illustrates a method of determining a back-off time when a predetermined event occurs in an electronic device, according to an embodiment.

Referring to FIG. 24, when the predetermined event occurs, i.e., when an event in which a door of a vehicle is pulled occurs, the first electronic device 110 and the second electronic device 120 may fail to perform distance measurement. When the first electronic device 110 and the second electronic device 120 fail to perform the distance measurement, a value indicating a scope of a back-off window with respect to PULL_DOOR_BACK may have a random value between 0 to 5. A back-off time may vary according to a selected value indicating the scope of the back-off window.

In an embodiment as illustrated in FIG. 24, the back-off time may have a value between 0 ms to 100 ms.

The first electronic device 110 may transmit a RCM 2330 to the second electronic device 120 after the back-off time 2325.

In a $1^{st}$ PP, the second electronic device 120 may transmit, to the first electronic device 110, a Ranging Poll message 2335 that is a reference message with respect to distance measurement.

In an RRP, the first electronic device 110 may transmit a Ranging Response 2340 and a Ranging Response 2345, in response to the received Ranging Poll message 2335. In the example of FIG. 23, two Ranging Responses are illustrated but the number of Ranging Responses may be more than 2.

In a $2^{nd}$ PP, the second electronic device 120 may transmit, to the first electronic device 110, a Ranging Final message 2350 indicating an end of a ranging operation.

The first electronic device 110 and the second electronic device 120 may exchange, in an MRP, data 2355 related to ranging. For example, the first electronic device 110 may transmit a ranging result to the second electronic device 120. In an embodiment, the transmitting of the Ranging Final message 2350 and the exchanging of the data 2355 may be integrated into one operation.

In an embodiment, a Last measured distance 2360 indicating a most recently measured distance may be calculated based on the Ranging Poll message 2335, the Ranging Response 2340, the Ranging Response 2345, the Ranging Final message 2350, and the data 2355. In the example of FIG. 23, the Last measured distance 2360 may be calculated to be 0.5 m.

FIG. 25 is a diagram for describing a ranging operation for distance measurement when a distance between electronic devices is within a predetermined distance, according to an embodiment. FIG. 25 illustrates Vehicle and DK Device as respective examples of the first electronic device 110 and the second electronic device 120, but it is understood that these are only examples and one or more other embodiments are not limited thereto.

Referring to FIG. 25, the first electronic device 110 and the second electronic device 120 may estimate that the second electronic device 120 is to enter SECURE_DISTANCE (e.g., 2 m) from the first electronic device 110, based on a last measured distance or last receive data related to Next Ranging Duration. An estimating method according to an embodiment is described below with reference to FIG. 26. In an embodiment, when (e.g., based on) the second electronic device 120 enters SECURE_DISTANCE with respect to the first electronic device 110, the first electronic device 110 and the second electronic device 120 may transit to an UWB WAKE UP state and may perform distance measurement. Furthermore, when the first electronic device 110 and the second electronic device 120 succeed or fail to perform the distance measurement, the first electronic device 110 and the second electronic device 120 may re-try the distance measurement after a preset back-off time.

In an embodiment, a RCM transmitted from the second electronic device 120 to the first electronic device 110 may include a ranging interval value that is information about a next ranging duration. The ranging interval value included in the RCM may be changed according to an interval calculation formula of a vehicle OEM. In the example of FIG. 25, the ranging interval value may be set as 0 ms. Operations of the first electronic device 110 and the second electronic device 120, which are illustrated in FIG. 25, are described in detail below.

The first electronic device 110 and the second electronic device 120 may estimate that the second electronic device 120 is to enter a range that is expressed as SECURE_DISTANCE from the first electronic device 110. For example, the first electronic device 110 may estimate that the second electronic device 120 is to enter a range of 2 m (see reference numeral 2500 in FIG. 25).

When the entry of the second electronic device 120 is estimated, the second electronic device 120 may transmit a RCM 2505 to the first electronic device 110. In an embodiment, a ranging interval value included in the RCM 2505 may be 0 ms.

In a $1^{st}$ PP, the second electronic device 120 may transmit, to the first electronic device 110, a Ranging Poll message 2510 that is a reference message with respect to distance measurement.

In an RRP, the first electronic device 110 may transmit a Ranging Response 2515 and a Ranging Response 2520, in response to the received Ranging Poll message 2510. In the example of FIG. 25, two Ranging Responses are illustrated but the number of Ranging Responses may be more than 2.

In a $2^{nd}$ PP, the second electronic device 120 may transmit, to the first electronic device 110, a Ranging Final message 2525 indicating an end of a ranging operation.

The first electronic device 110 and the second electronic device 120 may exchange, in an MRP, data 2530 related to ranging. For example, the first electronic device 110 may transmit a ranging result to the second electronic device 120. In an embodiment, the transmitting of the Ranging Final message 2525 and the exchanging of the data 2530 may be integrated into one operation.

In an embodiment, a Last measured distance 2540 indicating a most recently measured distance may be calculated based on the Ranging Poll message 2510, the Ranging Response 2515, the Ranging Response 2520, the Ranging Final message 2525, and the data 2530. In the example of FIG. 25, the Last measured distance 2540 may be calculated to be 1.55 m.

In an embodiment, after the distance measurement is successful, the first electronic device 110 and the second electronic device 120 may re-try the distance measurement after a back-off time. For example, referring to FIG. 25, after the distance measurement is successful, the first electronic device 110 and the second electronic device 120 may re-try the distance measurement after 480 ms that is a back-off time 2535. After the back-off time, the second electronic device 120 may transmit a RCM 2545 to the first electronic device 110. In this regard, a ranging interval value included in the RCM 2545 may be 420 ms. In a $1^{st}$ PP, the second electronic device 120 may transmit, to the first electronic device 110, a Ranging Poll message 2550 that is a reference message with respect to the distance measurement. An operation performed after the Ranging Poll message 2550 is transmitted may be similarly performed to operations of the first electronic device 110 and the second electronic device 120, the operations being described above with reference to FIG. 25.

FIG. 26 illustrates an example of a method of determining an estimated entry time into a specific range from an electronic device, according to an embodiment.

Referring to FIG. 26, the first electronic device 110 or the second electronic device 120 may estimate a time when the second electronic device 120 is to enter SECURE_DISTANCE with respect to the first electronic device 110, based on a value of a distance last measured by the first electronic device 110 and the second electronic device 120, SECURE_DISTANCE, and a value of an AWSH that is an average walking speed of a person.

With reference to FIG. 26, the value of the distance last measured by the first electronic device 110 and the second electronic device 120 is described, but it is understood that one or more other embodiments are not limited thereto. For example, the AWSH may be changed based on distances and times that were measured before the last time. In an embodiment, a speed of the person and acceleration may be estimated. The speed of the person may have a negative value. A scenario in which the speed has a negative value may correspond to a case in which the person does not come toward a vehicle but becomes more distant from the vehicle.

FIG. 27 illustrates an example of a back-off related to a success or a failure in distance measurement when an electronic device enters a specific distance, according to an embodiment.

FIG. 27 illustrates an example of a back-off time that is determinable according to a success or a failure in distance measurement performed by the first electronic device 110 or the second electronic device 120 when it is estimated that the second electronic device 120 is to enter a range (e.g., 2 m) expressed as SECURE_DISTANCE from the first electronic device 110. For example, when distance measurement performed between the first electronic device 110 or the second electronic device 120 is successful, the distance measurement may be performed again after a SUCCESS_BACK_OFF time. When the distance measurement performed between the first electronic device 110 or the second electronic device 120 fails, first distance measurement may be performed after a FIRST_BACK_OFF time. Second distance measurement may be performed after a SECOND_BACK_OFF time. A back-off time from third distance measurement to successful distance measurement may be defined as a LAST_BACK_OFF time. Until the first electronic device 110 and the second electronic device 120 are successful in distance measurement, the first electronic device 110 and the second electronic device 120 may perform (e.g., repeatedly and periodically) distance measurement from third distance measurement after the LAST_BACK_OFF time.

Figure 28:
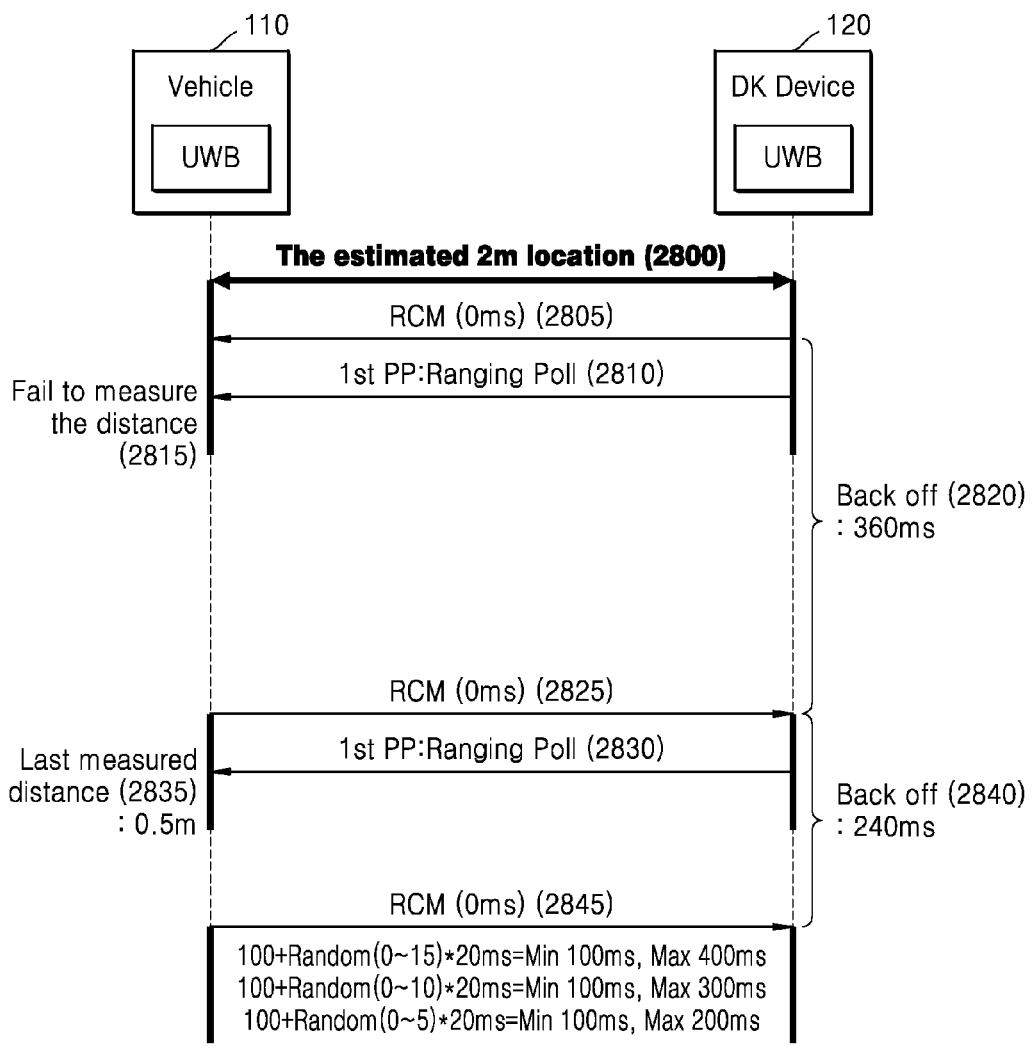
FIG. 28 is a diagram for describing a ranging operation performed when a distance between electronic devices is equal to or less than a predetermined distance and distance measurement fails, according to an embodiment.

FIG. 28 is a diagram for describing a ranging operation performed when a distance between electronic devices is equal to or less than a predetermined distance and distance measurement fails, according to an embodiment. FIG. 28 illustrates Vehicle and DK Device as respective examples of the first electronic device 110 and the second electronic device 120, but it is understood that these are just examples, and one or more other embodiments are not limited thereto.

Referring to FIG. 28, when it is estimated that the second electronic device 120 is to enter a range (e.g., 2 m) expressed as SECURE_DISTANCE from the first electronic device 110, and the first electronic device 110 and the second electronic device 120 fail to perform distance measurement, the first electronic device 110 and the second electronic device 120 may perform a back-off operation. The back-off operation performed when the distance measurement fails will now be described in detail.

The first electronic device 110 and the second electronic device 120 may estimate that the second electronic device 120 is to enter a range expressed as SECURE_DISTANCE from the first electronic device 110. For example, the first electronic device 110 may estimate that the second electronic device 120 is to enter a range of 2 m (see reference numeral 2800).

When an entry of the second electronic device 120 is estimated, the second electronic device 120 may transmit a RCM 2805 to the first electronic device 110. In an embodiment, a ranging interval value included in the RCM 2805 may be 0 ms.

In a $1^{st}$ PP, the second electronic device 120 may transmit, to the first electronic device 110, a Ranging Poll message 2810 that is a reference message with respect to distance measurement.

In an embodiment, the first electronic device 110 and the second electronic device 120 may fail in a first distance measurement (see reference numeral 2815). When the first electronic device 110 and the second electronic device 120 fail in the first distance measurement, the first electronic device 110 and the second electronic device 120 may re-try a distance measurement after a back-off time. For example, the first electronic device 110 and the second electronic device 120 may re-try a distance measurement after a back-off time 2820 that is 360 ms between 100 ms to 400 ms.

After 360 ms of the back-off time 2820, the second electronic device 120 may transmit a RCM 2825 to the first electronic device 110. In an embodiment, a ranging interval value included in the RCM 2825 may be 0 ms.

In a $1^{st}$ PP, the second electronic device 120 may transmit, to the first electronic device 110, a Ranging Poll message 2830 that is a reference message with respect to distance measurement.

In an embodiment, the first electronic device 110 and the second electronic device 120 may fail in a second distance measurement (see reference numeral 2835). When the first electronic device 110 and the second electronic device 120 fail in the second distance measurement, the first electronic device 110 and the second electronic device 120 may re-try a distance measurement after a back-off time. For example, the first electronic device 110 and the second electronic device 120 may re-try a distance measurement after a back-off time 2840 that is 240 ms between 100 ms to 300 ms.

In an embodiment, the ranging interval value included in the RCM 2805 or 2825 may be changed according to an interval calculation formula of a vehicle OEM. In the example of FIG. 28, the ranging interval value may be set as 0 ms.

After 240 ms of the back-off time 2840, the first electronic device 110 may transmit a RCM 2845 to the second electronic device 120. In an embodiment, the ranging interval value included in the RCM 2845 may be 0 ms.

The first electronic device 110 and the second electronic device 120 may obtain parameters for a second communication by using a first communication. The first electronic device 110 and the second electronic device 120 may set up a communication environment for the second communication, based on the obtained parameters and a checked result, the communication environment corresponding to an exchanged parameter. For example, the first communication may indicate BLE, and the second communication may indicate an UWB. When the communication environment in which the first electronic device 110 and the second electronic device 120 are able to measure a distance via the second communication is set, the second electronic device 120 may transmit RCM information to the first electronic device 110. The RCM information that is initially transmitted from the second electronic device 120 to the first electronic device 110 may include a Next Ranging Duration value indicating a next ranging period. FIG. 29 described below illustrates an example of determining a NRD_MAX_RANGE value when the second electronic device 120 transmits the NRD_MAX_RANGE value as the Next Ranging Duration value.

FIG. 29 illustrates a method of determining a NRD_MAX_RANGE value, according to an embodiment.

Referring to FIG. 29, when the second electronic device 120 transmits a NRD_MAX_RANGE value as a Next Ranging Duration value, the NRD_MAX_RANGE value may be a value between 1000 ms to 1400 ms. For example, the NRD_MAX_RANGE value may be 1020 ms.

The first electronic device 110 and the second electronic device 120 may perform a distance measurement, and after 1020 ms, the first electronic device 110 and the second electronic device 120 may re-try the distance measurement. The first electronic device 110 and the second electronic device 120 may transit to and remain at an UWB SLEEP state until an elapse of 1020 ms for a next distance measurement.

According to an embodiment, after 1020 ms, the second electronic device 120 may calculate FORECAST_DISTANCE that is a distance to the first electronic device 110, based on a measured distance (e.g., 7 m) to the first electronic device 110. For example, FORECAST_DISTANCE may be calculated by using an AWSH value (e.g., 1.5 m/s) indicating an average moving speed of a person, and a time (e.g., 1020 ms) from a time of last distance measurement to a time of next distance measurement. In the example of FIG. 29, a value of FORECAST_DISTANCE may be calculated to be 5.47 m. When the value of FORECAST_DISTANCE is equal to or greater than 5 m, a Next Ranging Duration value included in a RCM for next distance measurement may be calculated as 200 ms*5+Random(4)* 20 ms=1080 ms.

Figure 30:
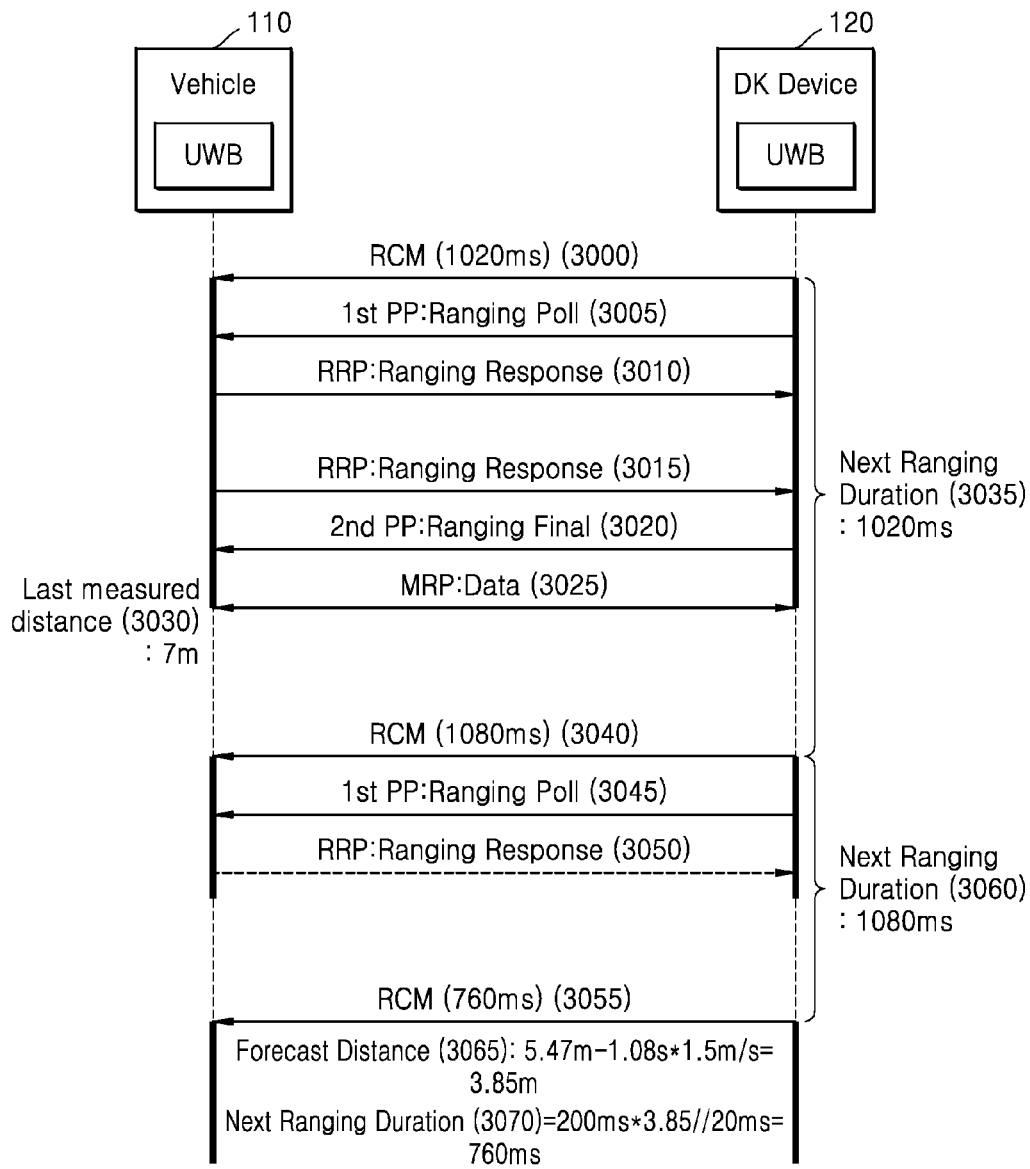
FIG. 30 is a diagram for describing a ranging operation of a case in which distance measurement between electronic devices fails but an exchange of time data is successful, according to an embodiment.
Figure 31:
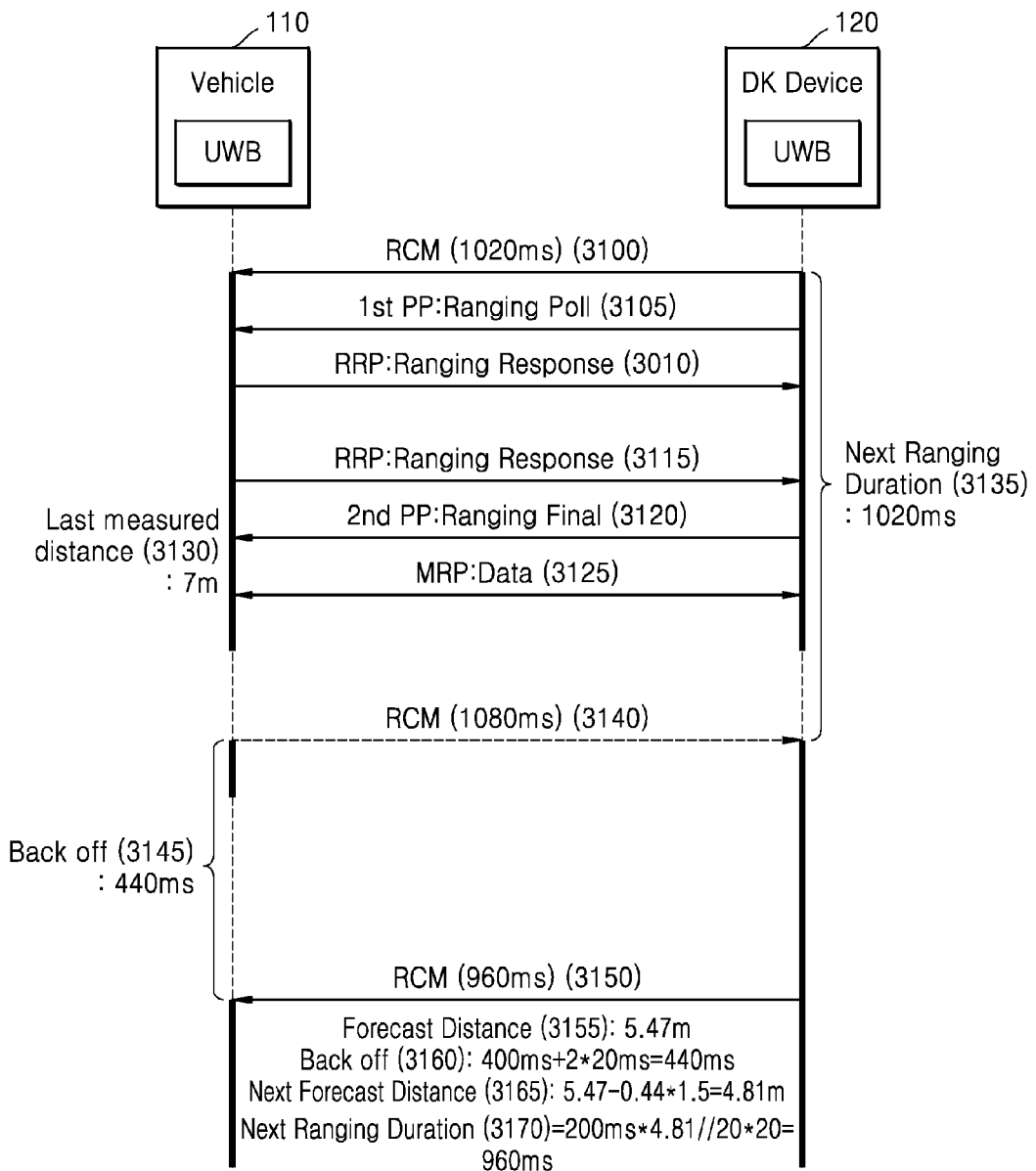
FIG. 31 is a diagram for describing a ranging operation of a case in which distance measurement between electronic devices fails and an exchange of time data also fails, according to an embodiment.

FIGS. 30 and 31 illustrate a possible scenario of a case in which distance measurement between the first electronic device 110 and the second electronic device 120 fails.

FIG. 30 is a diagram for describing a ranging operation of a case in which distance measurement between electronic devices fails but an exchange of time data is successful, according to an embodiment. FIG. 30 illustrates Vehicle and DK Device as respective examples of the first electronic device 110 and the second electronic device 120, but it is understood that these are just examples and one or more other embodiments are not limited thereto.

With reference to FIG. 30, when an exchange of Next Ranging Duration between the first electronic device 110 and the second electronic device 120 is successful but the first electronic device 110 and the second electronic device 120 fail in distance measurement, operations of the first electronic device 110 and the second electronic device 120 may be as will now be described.

In an embodiment, whether the exchange of Next Ranging Duration between the first electronic device 110 and the second electronic device 120 is successful may be differently determined with respect to the first electronic device 110 and the second electronic device 120. For example, whether the exchange is successful to the first electronic device 110 may be determined based on whether the first electronic device 110 receives RCM information from the second electronic device 120. The second electronic device 120 may determine that the exchange of Next Ranging Duration is successful when (e.g., based on) the second electronic device 120 receives a Response frame or acknowledgement (ACK) from the first electronic device 110.

According to another embodiment, when the second electronic device 120 receives the Response frame or negative acknowledgement (NACK) from the first electronic device 110, the second electronic device 120 may determine that the exchange of Next Ranging Duration is successful.

In an embodiment, when the exchange of Next Ranging Duration between the first electronic device 110 and the second electronic device 120 is successful but the first electronic device 110 and the second electronic device 120 fail in distance measurement, the first electronic device 110 and the second electronic device 120 may transit to an UWB SLEEP state until Next Ranging Duration. After Next Ranging Duration, the first electronic device 110 and the second electronic device 120 may transit to an UWB WAKE UP state and may perform distance measurement. Operations of the first electronic device 110 and the second electronic device 120 that are illustrated in FIG. 30 are described below.

The second electronic device 120 may transmit a RCM 3000 to start a procedure of distance measurement with respect to the first electronic device 110. In an embodiment of the disclosure, a ranging interval value included in the RCM 3000 may be 1020 ms.

In a $1^{st}$ PP, the second electronic device 120 may transmit, to the first electronic device 110, a Ranging Poll message 3005 that is a reference message with respect to distance measurement.

In an RRP, the first electronic device 110 may transmit a Ranging Response 3010 and a Ranging Response 3015, in response to the received Ranging Poll message 3005. In the example of FIG. 30, two Ranging Responses are illustrated but it is understood that the number of Ranging Responses may be more than 2 in one or more other embodiments.

In a $2^{nd}$ PP, the second electronic device 120 may transmit, to the first electronic device 110, a Ranging Final message 3020 indicating an end of a ranging operation.

The first electronic device 110 and the second electronic device 120 may exchange, in an MRP, data 3025 related to ranging. For example, the first electronic device 110 may transmit a ranging result to the second electronic device 120. In an embodiment, the transmitting of the Ranging Final message 3020 and the exchanging of the data 3025 may be integrated into one operation.

In an embodiment, a Last measured distance 3030 indicating a most recently measured distance may be calculated based on the Ranging Poll message 3005, the Ranging Response 3010, the Ranging Response 3015, the Ranging Final message 3020, and the data 3025. In the example of FIG. 30, the Last measured distance 3030 may be calculated to be 7 m.

In an embodiment, after the distance measurement is successful, the first electronic device 110 and the second electronic device 120 may re-try the distance measurement after 1020 ms that is Next Ranging Duration 3035.

After the Next Ranging Duration 3035, the second electronic device 120 may transmit a RCM 3040 to the first electronic device 110. In this regard, a ranging interval value included in the RCM 3040 may be 1080 ms.

In a $1^{st}$ PP, the second electronic device 120 may transmit, to the first electronic device 110, a Ranging Poll message 3045 that is a reference message with respect to the distance measurement.

In an RRP, the first electronic device 110 may transmit a Ranging Response 3050, in response to the received Ranging Poll message 3045. A distance measurement procedure thereafter may be similar to, the same as, or substantially the same as the process described above with reference to FIG. 30.

In an embodiment, the first electronic device 110 and the second electronic device 120 may re-try the distance measurement after 1080 ms that is Next Ranging Duration 3060. For example, after the Next Ranging Duration 3060, the second electronic device 120 may transmit a RCM 3055 to the first electronic device 110. In this regard, a ranging interval value included in the RCM 3055 may be 760 ms. In an embodiment, Forecast Distance 3065 indicating an estimated distance may be calculated to be 3.85 m. In an embodiment, Next Ranging Duration may be calculated to be 760 ms.

FIG. 31 is a diagram for describing a ranging operation of a case in which distance measurement between electronic devices fails and an exchange of time data also fails, according to an embodiment. FIG. 31 illustrates Vehicle and DK Device as respective examples of the first electronic device 110 and the second electronic device 120, but it is understood that these are just examples and one or more other embodiments are not limited thereto.

With reference to FIG. 31, when an exchange of Next Ranging Duration between the first electronic device 110 and the second electronic device 120 fails and the first electronic device 110 and the second electronic device 120 also fail in distance measurement, operations of the first electronic device 110 and the second electronic device 120 may be as will now be described.

In an embodiment, when the exchange of Next Ranging Duration between the first electronic device 110 and the second electronic device 120 fails and the first electronic device 110 and the second electronic device 120 also fail in the distance measurement, the first electronic device 110 and the second electronic device 120 may remain at an UWB WAKE UP state until the distance measurement becomes successful. Afterward, as illustrated in FIG. 32, the second electronic device 120 may determine a value of NORMAL_BACK_OFF, and after NORMAL_BACK_OFF, the second electronic device 120 may re-perform the distance measurement. For example, the value of NORMAL_BACK_OFF may be determined to be a value between 400 ms to 800 ms. Operations of the first electronic device 110 and the second electronic device 120 that are illustrated in FIG. 31 are described below.

The second electronic device 120 may transmit a RCM 3100 to start a procedure of distance measurement with respect to the first electronic device 110. In an embodiment, a ranging interval value included in the RCM 3100 may be 1020 ms.

In a $1^{st}$ PP, the second electronic device 120 may transmit, to the first electronic device 110, a Ranging Poll message 3105 that is a reference message with respect to distance measurement.

In an RRP, the first electronic device 110 may transmit a Ranging Response 3110 and a Ranging Response 3115, in response to the received Ranging Poll message 3105. In the example of FIG. 30, two Ranging Responses are illustrated but the number of Ranging Responses may be more than 2.

In a $2^{nd}$ PP, the second electronic device 120 may transmit, to the first electronic device 110, a Ranging Final message 3020 indicating an end of a ranging operation.

The first electronic device 110 and the second electronic device 120 may exchange, in an MRP, data 3025 related to ranging. For example, the first electronic device 110 may transmit a ranging result to the second electronic device 120. In an embodiment, the transmitting of the Ranging Final message 3020 and the exchanging of the data 3025 may be integrated into one operation.

In an embodiment, a Last measured distance 3030 indicating a most recently measured distance may be calculated based on the Ranging Poll message 3005, the Ranging Response 3010, the Ranging Response 3015, the Ranging Final message 3020, and the data 3025. In the example of FIG. 30, the Last measured distance 3030 may be calculated to be 7 m.

In an embodiment, the first electronic device 110 and the second electronic device 120 may re-try the distance measurement after 1020 ms that is Next Ranging Duration 3135. For example, the first electronic device 110 may transmit a RCM 3140 to the second electronic device 120. In this regard, a ranging interval value included in the RCM 3140 may be 1080 ms.

In an embodiment, the second electronic device 120 may transmit a RCM 3150 to the first electronic device 110 after 440 ms that is a back-off time 3145. In this regard, a ranging interval value included in the RCM 3150 may be 960 ms. In an embodiment, Forecast Distance 3155 may be calculated to be 5.47 m. Furthermore, a back-off value 3160 may be calculated as 440 ms+2*20 ms=440 ms, and a value of Next Forecast Distance 3165 may be calculated as 5.47-0.44*1.5=4.81 m. Moreover, a value of Next Ranging Duration 3170 may be calculated as 960 ms.

FIGS. 33 to 40 are diagrams for describing a method of recovering a ranging operation when reception of a frame fails in a ranging duration. For example, when reception of a frame fails in a ranging duration, a DK device cannot obtain a ranging result, and thus a ranging interval included in a RCM in a next ranging block may be defined based on a vehicle OEM policy.

According to an embodiment, electronic devices that perform ranging may set up a communication connection via a first communication (e.g., BLE, WiFi, an UWB, or the like), and may exchange parameters (e.g., a channel, a preamble, a PRF, a data rate, or the like) required for a second communication (e.g., the UWB). The electronic devices may exchange the parameters for the second communication, and may set up a communication environment for the second communication according to the exchanged parameters. After the communication environment is set up, the electronic devices may measure a distance between the electronic devices via the second communication.

Figure 33:
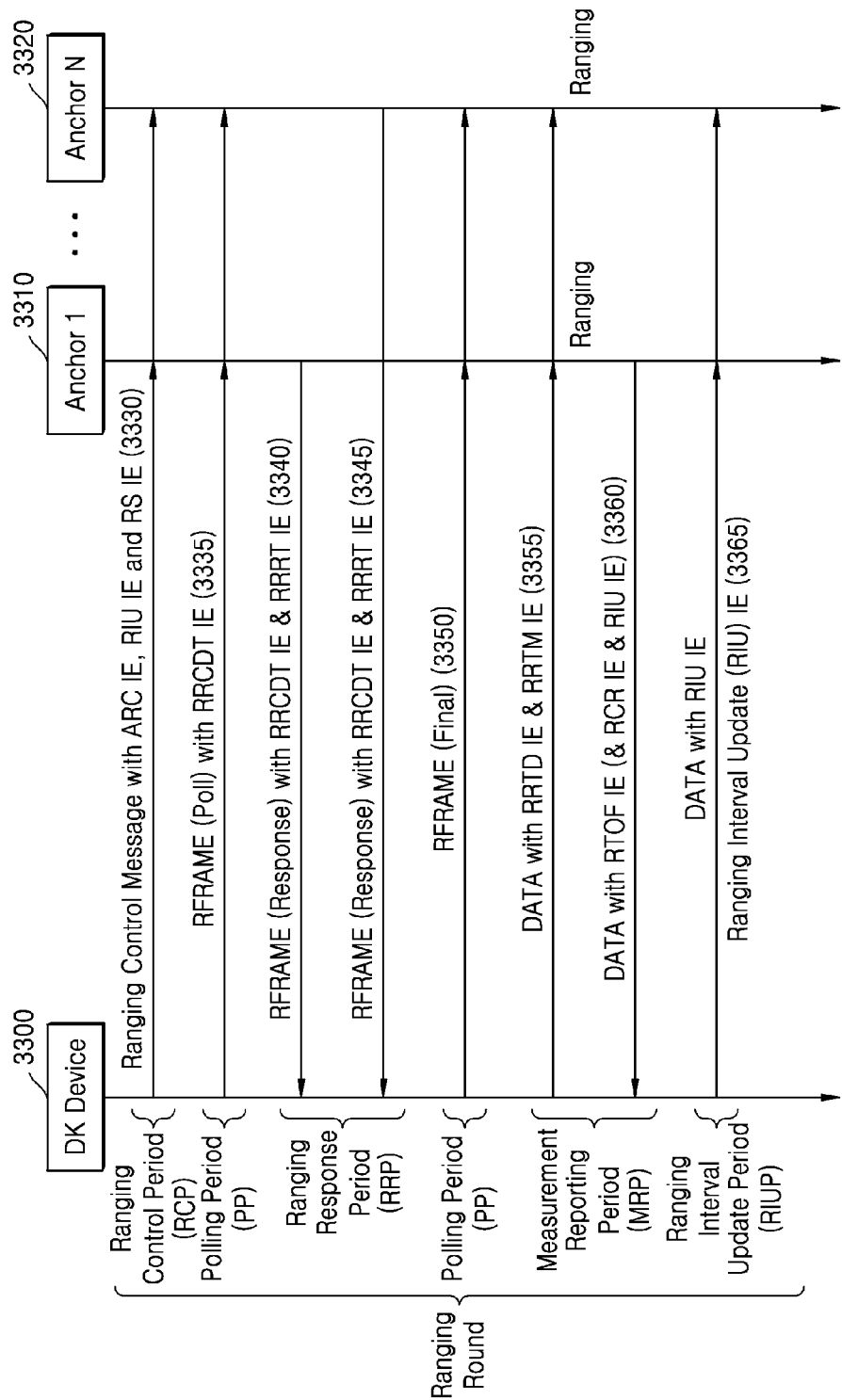
FIG. 33 is a diagram for describing a ranging operation performed between an electronic device and anchors, according to an embodiment.

In embodiments described below, as examples of the electronic devices, N UWB anchors attached to a vehicle, and a DK device (e.g., a smartphone) may be considered. The DK device may operate as an initiator to transmit a Poll frame, and each of the N UWB anchors may operate as a responder to receive the Poll frame. In an embodiment, it is assumed that the N UWB anchors that are responders from among the electronic devices performing ranging turn on their receivers during a ranging round duration indicating a time taken to perform ranging. A time from a start of a current frame to a time when a next ranging round initiates, i.e., the time from the current frame to transmission of a next RCM, may be referred to as a block interval or a round interval. FIG. 33 illustrates a ranging process between a DK device and an anchor. In this regard, information elements (IEs) described with reference to FIG. 33 may be defined according to IEEE 802.14.4z.

FIG. 33 is a diagram for describing a ranging operation performed between an electronic device and anchors, according to an embodiment. In FIG. 33, a DK device 3300 may be the second electronic device 120, and a first anchor 3310 or an Nth anchor 3320 may be included in the first electronic device 110. In FIG. 33, the DK device 3300, the first anchor 3310, and the Nth anchor 3320 are illustrated as examples and it is understood that one or more other embodiments are not limited thereto.

Referring to FIG. 33, in an RCP, the DK device 3300 may transmit, to the first anchor 3310 or the Nth anchor 3320, IEs 3330 including an advanced ranging control (ARC) IE including a ranging configuration parameter, a ranging interval update (RIU) IE including ranging interval information indicating when a next ranging initiates, and a ranging scheduling (RS) IE including information indicating which ranging slot is used for communication of each anchor.

In a $1^{st}$ PP, the DK device 3300 may transmit, to the first anchor 3310 or the Nth anchor 3320, an RCDT(0) IE 3335 indicating that the DK device 3300 initiates DS-TWR requesting a ranging result.

In an RRP, the first anchor 3310 or the Nth anchor 3320 may transmit, to the DK device 3300, a ranging report control double-sided two-way ranging (RRCDT) IE indicating a start of a second round trip of DS-TWR by anchors, and a ranging request reply time (RRRT) IE requesting a reply time of the DK device 3300. For example, the first anchor 3310 may transmit a RFRAME (Response) with RRCDT IE & RRRT IE 3340 to the DK device 3300. The Nth anchor 3320 may transmit a RFRAME (Response) with RRCDT IE & RRRT IE 3345 to the DK device 3300.

In a $2^{nd}$ PP, the DK device 3300 may transmit a Ranging Final frame 3350 to the first anchor 3310 or the Nth anchor 3320.

In an MRP, the DK device 3300 may transmit, to the first anchor 3310 or the Nth anchor 3320, IEs 3355 including a ranging reply time deferred (RRTD) IE including information about the reply time of the DK device 3300 and a ranging round trip time measurement (RRTM) IE including information about the round trip.

The first anchor 3310 or the Nth anchor 3320 may determine a ranging result, based on the received RRTD IE & RRTM IE 3355. The first anchor 3310 or the Nth anchor 3320 may transmit, to the DK device 3300, a ranging time-of-flight (RTOF) IE 3360 including the determined ranging result. In an embodiment of the disclosure, when the first anchor 3310 or the Nth anchor 3320 attempts to change a ranging interval received in the RCP, the first anchor 3310 or the Nth anchor 3320 may transmit a ranging interval value to be updated, by using a ranging change request (RCR) IE and a ranging interval update (RIU) IE.

When the DK device 3300 attempts to change the ranging interval in an RIUP, the DK device 3300 may transmit the ranging interval value to be updated, by using an RIU IE 3365.

Figure 34:
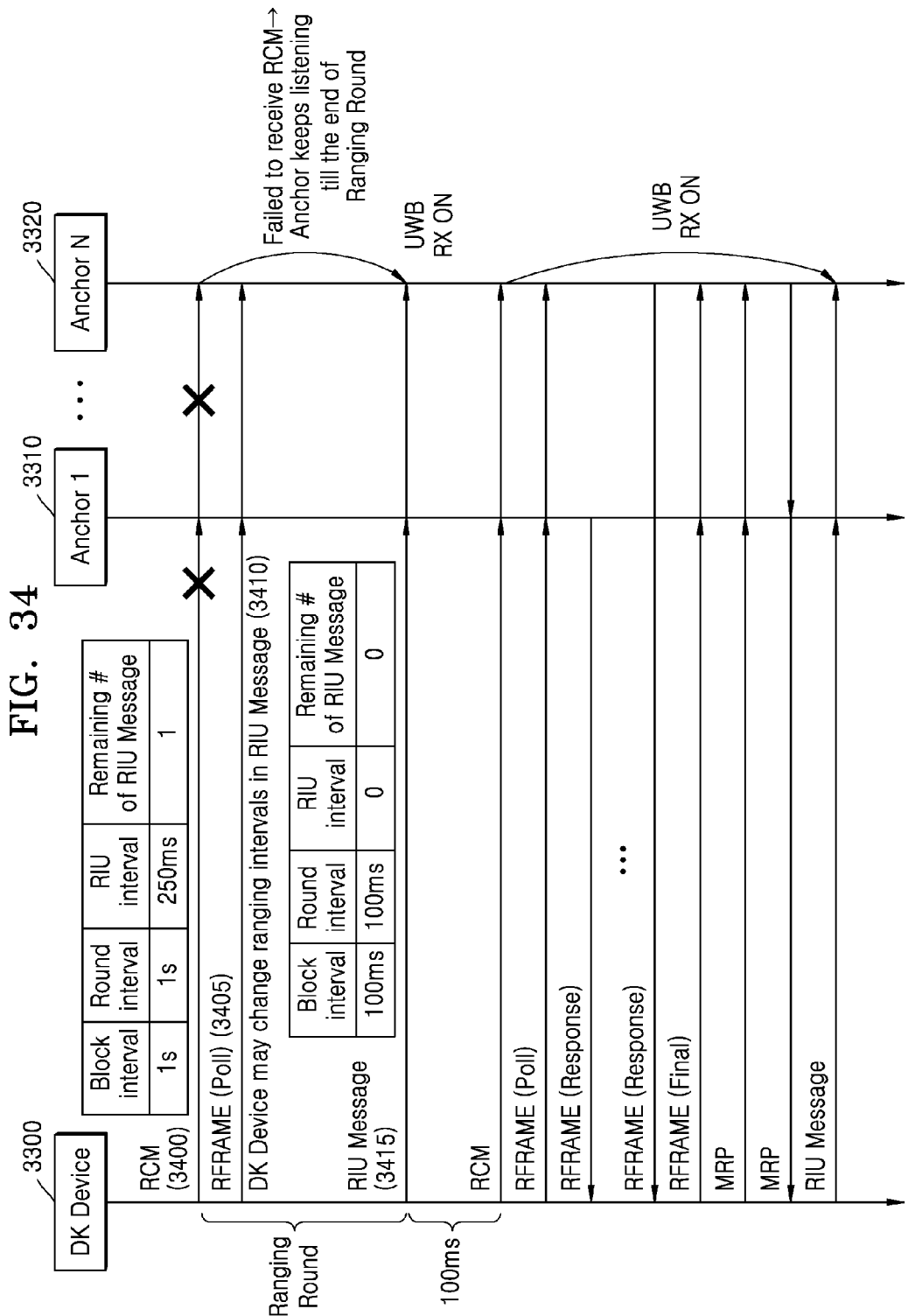
FIG. 34 is a diagram for describing a ranging operation performed between an electronic device and anchors when one of the anchors fails to receive a ranging control message (RCM), according to an embodiment.

FIG. 34 is a diagram for describing a ranging operation performed between an electronic device and anchors when one of the anchors fails to receive a RCM, according to an embodiment. In FIG. 34, the DK device 3300 may be the second electronic device 120, and the first anchor 3310 or the Nth anchor 3320 may be included in the first electronic device 110. In FIG. 34, the DK device 3300, the first anchor 3310, and the Nth anchor 3320 are illustrated as examples but it is understood that one or more other embodiments are not limited thereto.

Referring to FIG. 34, the DK device 3300 transmits a RCM 3400 including ranging interval information about a block interval or a round interval to the first anchor 3310 or the Nth anchor 3320, but the first anchor 3310 or the Nth anchor 3320 may fail to receive the RCM 3400. The DK device 3300 may transmit a Poll 3405 to the first anchor 3310 or the Nth anchor 3320. When the first anchor 3310 or the Nth anchor 3320 fails to receive the RCM 3400, the DK device 3300 may change a ranging interval in a RIU message during a RIUP (see reference numeral 3410). The DK device 3300 may transmit an RIU message 3415 to the first anchor 3310 or the Nth anchor 3320. When the DK device 3300 changes the ranging interval, receivers of the anchors remain turned on during a ranging round, such that the first anchor 3310 or the Nth anchor 3320 may perform next ranging, based on updated block interval or round interval information received from the DK device 3300 in the RIUP.

Figure 35:
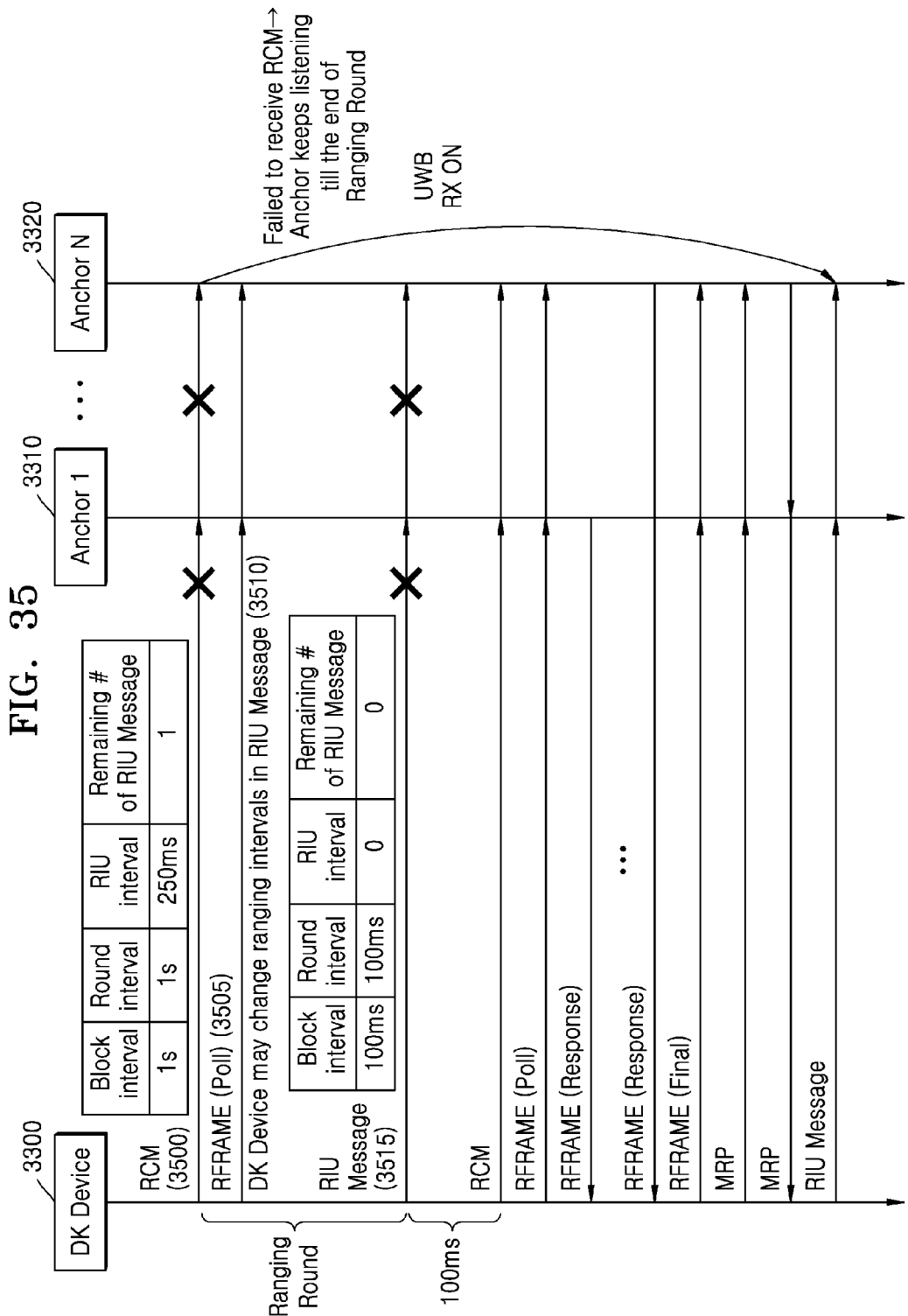
FIG. 35 is a diagram for describing a ranging operation performed between an electronic device and anchors when one of the anchors fails to receive a RCM and a ranging interval update (RIU), according to an embodiment.

FIG. 35 is a diagram for describing a ranging operation performed between an electronic device and anchors when one of the anchors fails to receive a RCM and an RIU message, according to an embodiment. In FIG. 35, the DK device 3300 may be the second electronic device 120, and the first anchor 3310 or the Nth anchor 3320 may be included in the first electronic device 110. In FIG. 35, the DK device 3300, the first anchor 3310, and the Nth anchor 3320 are illustrated as examples and it is understood that one or more other embodiments are not limited thereto.

Referring to FIG. 35, the DK device 3300 transmits a RCM 3500 including ranging interval information about a block interval or a round interval to the first anchor 3310 or the Nth anchor 3320, but the first anchor 3310 or the Nth anchor 3320 may fail to receive the RCM 3500. The DK device 3300 may transmit a Poll 3505 to the first anchor 3310 or the Nth anchor 3320. When (e.g., based on) the first anchor 3310 or the Nth anchor 3320 fails to receive the RCM 3500, the DK device 3300 may change a ranging interval in a RIU message during a RIUP (see reference numeral 3510). In the RIUP, when the first anchor 3310 or the Nth anchor 3320 fails to receive an RIU message 3515 including a ranging interval updated by the DK device 3300, the first anchor 3310 or the Nth anchor 3320 may allow their receivers to remain turned on so as to receive a next RCM.

Figure 36:
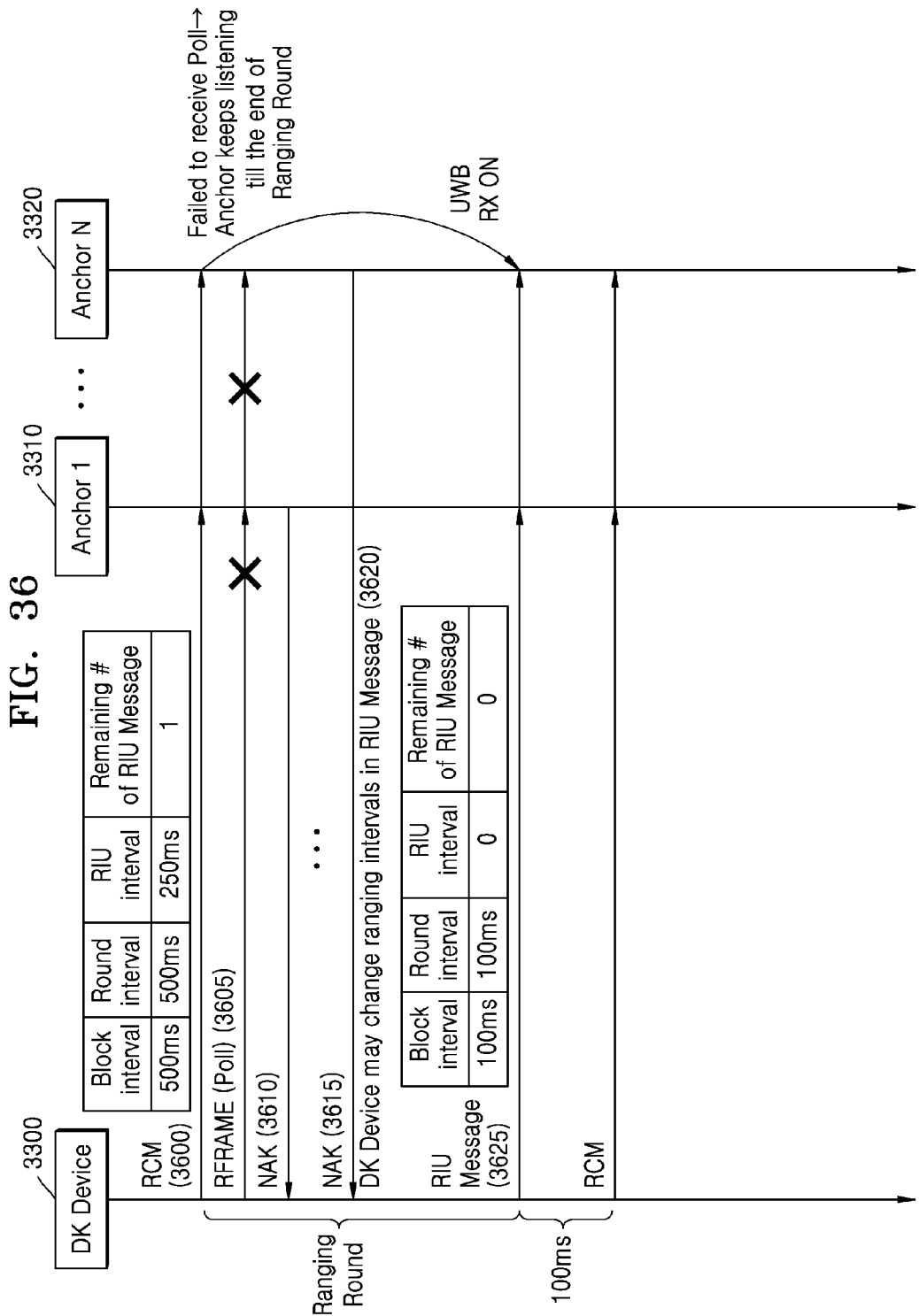
FIG. 36 is a diagram for describing a ranging operation performed between an electronic device and anchors when one of the anchors fails to receive a Poll frame, according to an embodiment.

FIG. 36 is a diagram for describing a ranging operation performed between an electronic device and anchors when one of the anchors fails to receive a Poll frame, according to an embodiment. In FIG. 36, the DK device 3300 may be the second electronic device 120, and the first anchor 3310 or the Nth anchor 3320 may be included in the first electronic device 110. In FIG. 36, the DK device 3300, the first anchor 3310, and the Nth anchor 3320 are illustrated as examples and it is understood that one or more other embodiments are not limited thereto.

Referring to FIG. 36, the DK device 3300 may transmit a RCM 3600 to the first anchor 3310 or the Nth anchor 3320, and the first anchor 3310 or the Nth anchor 3320 may receive the RCM 3600. In an embodiment, the DK device 3300 may transmit a Poll 3605 to the first anchor 3310 or the Nth anchor 3320. The first anchor 3310 or the Nth anchor 3320 may fail to receive the Poll 3605. Because the anchors fail to receive the Poll 3605, the anchors may transmit NAK to the DK device 3300. For example, the first anchor 3310 may transmit NAK 3610 to the DK device 3300. The Nth anchor 3320 may transmit NAK 3615 to the DK device 3300. The DK device 3300 may change a ranging interval in a RIU message (see reference numeral 3620). The DK device 3300 may transmit an RIU message 3625 to the first anchor 3310 or the Nth anchor 3320. However, when the DK device 3300 does not change a ranging interval in an RIUP, the first anchor 3310 and the Nth anchor 3320 may transit to a sleep state, based on ranging interval information about a block interval or a round interval included in a received RCM, and may transit to a wake up state at a later time. The embodiment shown in FIG. 36 corresponds to a case in which the DK device 3300 changes the ranging interval in the RIUP. In this case, the anchors may have receivers turned on in a ranging round, and may perform next ranging based on updated block interval or round interval information received from the DK device 3300 in the RIUP.

Figure 37:
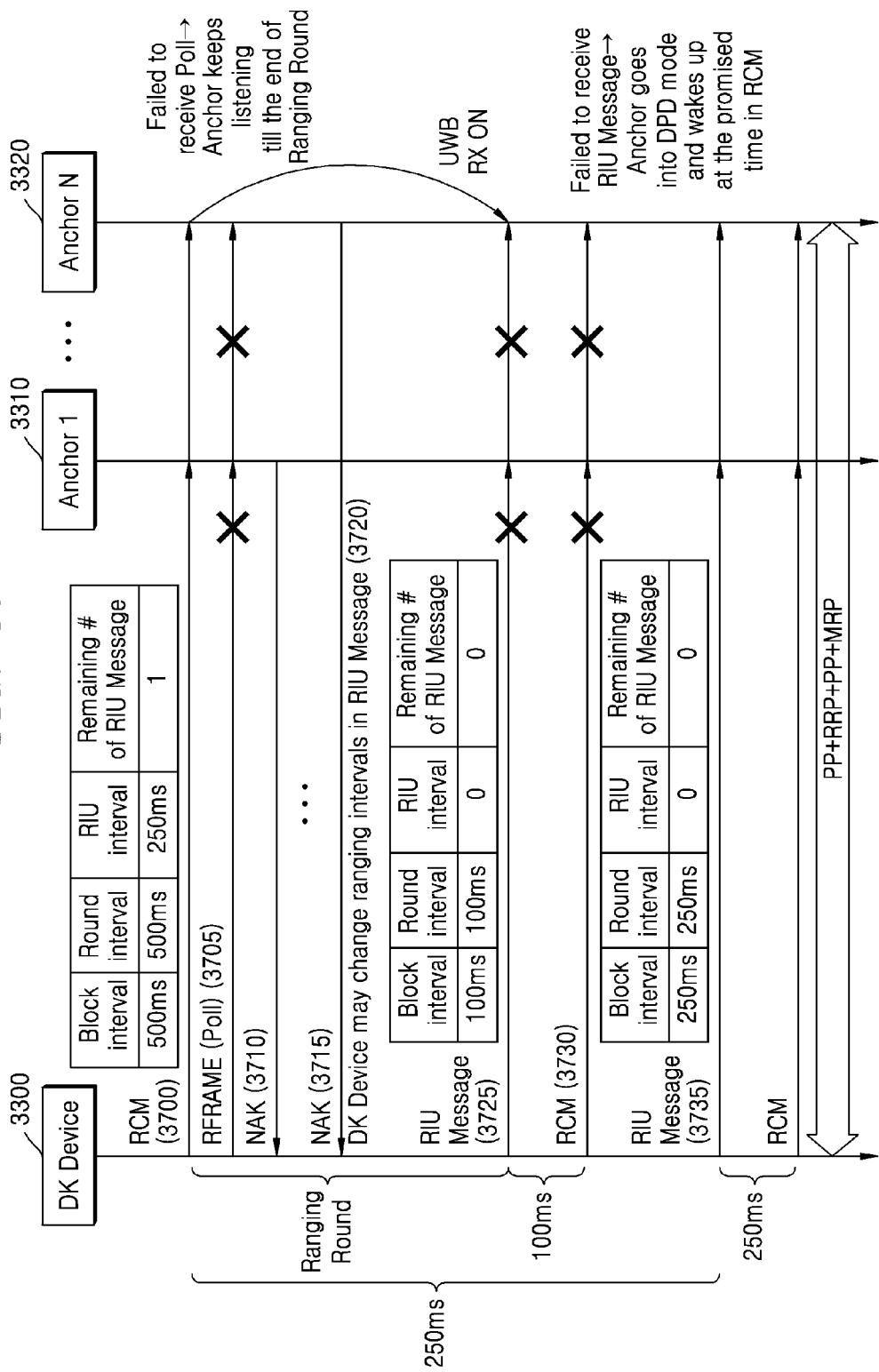
FIG. 37 is a diagram for describing a ranging operation performed between an electronic device and anchors when one of the anchors fails to receive a Poll frame and a RIU, according to an embodiment.

FIG. 37 is a diagram for describing a ranging operation performed between an electronic device and anchors when (e.g., based on) one of the anchors fails to receive a Poll frame and a RIU message, according to an embodiment. In FIG. 37, the DK device 3300 may be the second electronic device 120, and the first anchor 3310 or the Nth anchor 3320 may be included in the first electronic device 110. In FIG. 37, the DK device 3300, the first anchor 3310, and the Nth anchor 3320 are illustrated as examples and it is understood that one or more other embodiments are not limited thereto.

Referring to FIG. 37, the first anchor 3310 and the Nth anchor 3320 may receive a RCM 3700 transmitted by the DK device 3300, and may not receive a Poll 3705. Because the first anchor 3310 and the Nth anchor 3320 could not receive the Poll 3705, the first anchor 3310 and the Nth anchor 3320 may transmit NAK to the DK device 3300. For example, the first anchor 3310 may transmit NAK 3710 to the DK device 3300, and the Nth anchor 3320 may transmit NAK 3715 to the DK device 3300. The DK device 3300 may change a ranging interval in a RIU message during a RIUP (see reference numeral 3720). The DK device 3300 may transmit a RIU message 3725 including information about a changed ranging interval to the first anchor 3310 and the Nth anchor 3320. In an embodiment, the first anchor 3310 and the Nth anchor 3320 may fail to receive the RIU message 3725 from the DK device 3300. Because the first anchor 3310 and the Nth anchor 3320 do not know updated ranging interval information, the first anchor 3310 and the Nth anchor 3320 may transit to a sleep state, based on ranging interval information about a block interval or a round interval, the ranging interval information being received via the previous RCM 3700. Afterward, the first anchor 3310 and the Nth anchor 3320 may transit to a wake up state. In an embodiment, the first anchor 3310 and the Nth anchor 3320 may fail to receive a RCM 3730 transmitted by the DK device 3300. Further, the first anchor 3310 and the Nth anchor 3320 may transit to the sleep state, and after a ranging interval included in the RCM 3700, the first anchor 3310 and the Nth anchor 3320 may transit to the wake up state. The first anchor 3310 and the Nth anchor 3320 that transit to the wake up state may receive a RIU message 3735 from the DK device 3300.

Figure 38:
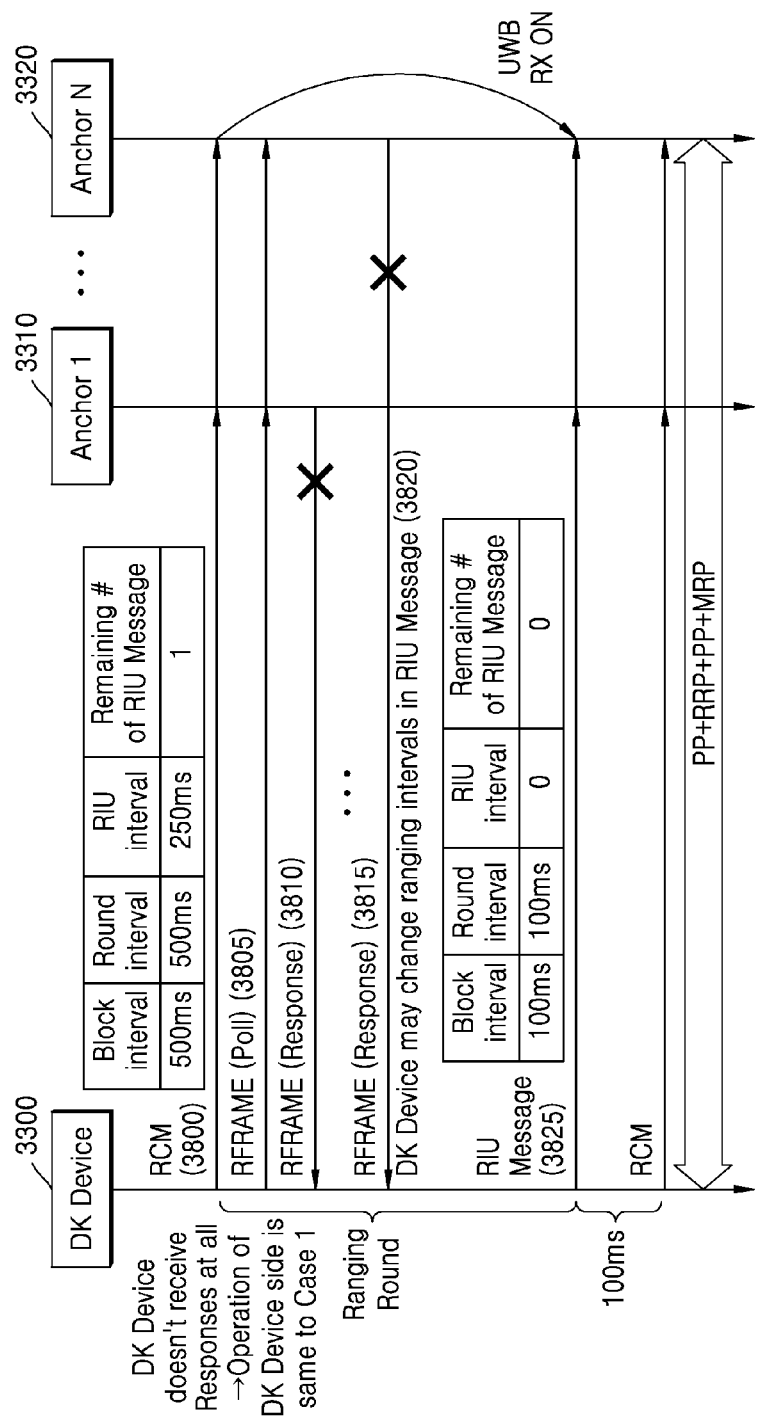
FIG. 38 is a diagram for describing a ranging operation performed between an electronic device and anchors when one of the anchors fails to receive a Response frame, according to an embodiment.

FIG. 38 is a diagram for describing a ranging operation performed between an electronic device and anchors when (e.g., based on) one of the anchors fails to receive a Response frame, according to an embodiment. In FIG. 38, the DK device 3300 may be the second electronic device 120, and the first anchor 3310 or the Nth anchor 3320 may be included in the first electronic device 110. In FIG. 38, the DK device 3300, the first anchor 3310, and the Nth anchor 3320 are illustrated as examples and it is understood that one or more other embodiments are not limited thereto.

Referring to FIG. 38, the DK device 3300 may transmit a RCM 3800 to the first anchor 3310 or the Nth anchor 3320, and the first anchor 3310 or the Nth anchor 3320 may receive the RCM 3800. In an embodiment, the DK device 3300 may transmit a Poll 3805 to the first anchor 3310 or the Nth anchor 3320. The first anchor 3310 or the Nth anchor 3320 may receive the Poll 3805. In an RRP, the DK device 3300 may fail to receive a Response frame with respect to the Poll 3805 from the first anchor 3310 or the Nth anchor 3320. For example, the DK device 3300 may fail to receive a Response 3810 from the first anchor 3310. Also, the DK device 3300 may fail to receive a Response 3815 from the Nth anchor 3320.

In an embodiment, the DK device 3300 may change a ranging interval in a RIU message during a RIUP (see reference numeral 3820). The DK device 3300 may transmit a RIU message 3825 including information about a changed ranging interval to the first anchor 3310 or the Nth anchor 3320. Because receivers of the anchors remain turned on during a ranging round, the first anchor 3310 or the Nth anchor 3320 may perform next ranging, based on updated block interval or round interval information received from the DK device 3300 in the RIUP.

Figure 39:
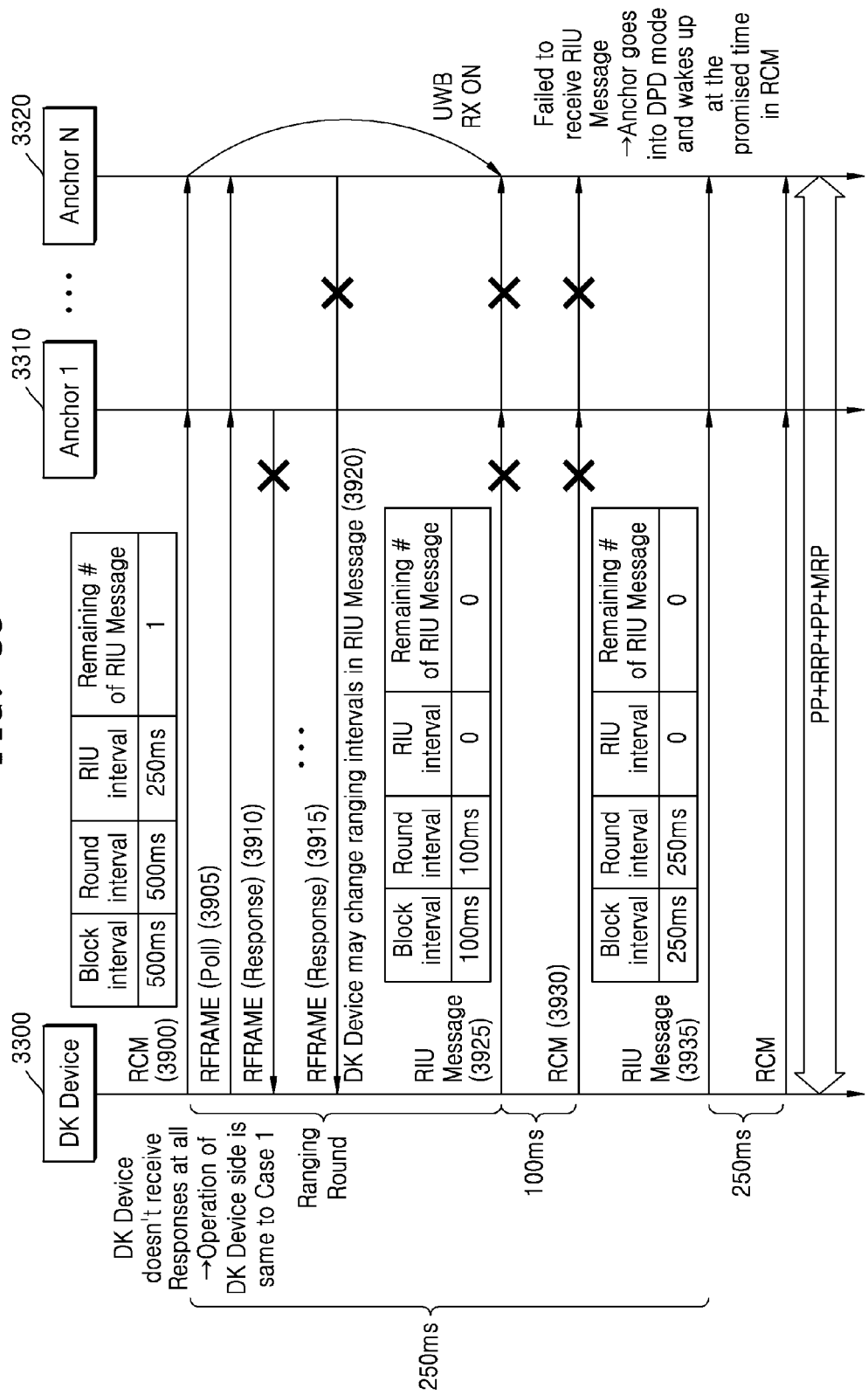
FIG. 39 is a diagram for describing a ranging operation performed between an electronic device and anchors when the electronic device fails to receive a response frame and one of the anchors fails to receive a RIU, according to an embodiment.

FIG. 39 is a diagram for describing a ranging operation performed between an electronic device and anchors when the electronic device fails to receive a response frame and one of the anchors fails to receive a RIU message, according to an embodiment. In FIG. 39, the DK device 3300 may be the second electronic device 120, and the first anchor 3310 or the Nth anchor 3320 may be included in the first electronic device 110. In FIG. 39, the DK device 3300, the first anchor 3310, and the Nth anchor 3320 are illustrated as examples and it is understood that one or more other embodiments are not limited thereto.

Referring to FIG. 39, the DK device 3300 may transmit a RCM 3900 to the first anchor 3310 or the Nth anchor 3320, and the first anchor 3310 or the Nth anchor 3320 may receive the RCM 3900. In an embodiment, the DK device 3300 may transmit a Poll 3905 to the first anchor 3310 or the Nth anchor 3320. The first anchor 3310 or the Nth anchor 3320 may receive the Poll 3905. In an RRP, the DK device 3300 may fail to receive a Response frame with respect to the Poll 3905 from the first anchor 3310 or the Nth anchor 3320. For example, the DK device 3300 may fail to receive a Response 3910 from the first anchor 3310. Also, the DK device 3300 may fail to receive a Response 3915 from the Nth anchor 3320.

In an embodiment, the DK device 3300 may change a ranging interval in a RIU message during a RIUP (see reference numeral 3920). The DK device 3300 may transmit a RIU message 3925 including information about a changed ranging interval to the first anchor 3310 or the Nth anchor 3320. However, the first anchor 3310 and the Nth anchor 3320 may fail to receive the RIU message 3925 including the information about the updated ranging interval. Because the RIU message 3925 is not received, the first anchor 3310 and the Nth anchor 3320 may not know the information about the ranging interval updated by the DK device 3300. The first anchor 3310 and the Nth anchor 3320 may transit to a sleep state, based on ranging interval information (e.g., a block interval or a round interval) received via the previous RCM 3900, and may transit to a wake up state at a later time. In an embodiment, the first anchor 3310 and the Nth anchor 3320 may not receive a RCM 3930 from the DK device 3300. Furthermore, the first anchor 3310 and the Nth anchor 3320 may receive a RIU message 3935 from the DK device 3300.

Figure 40:
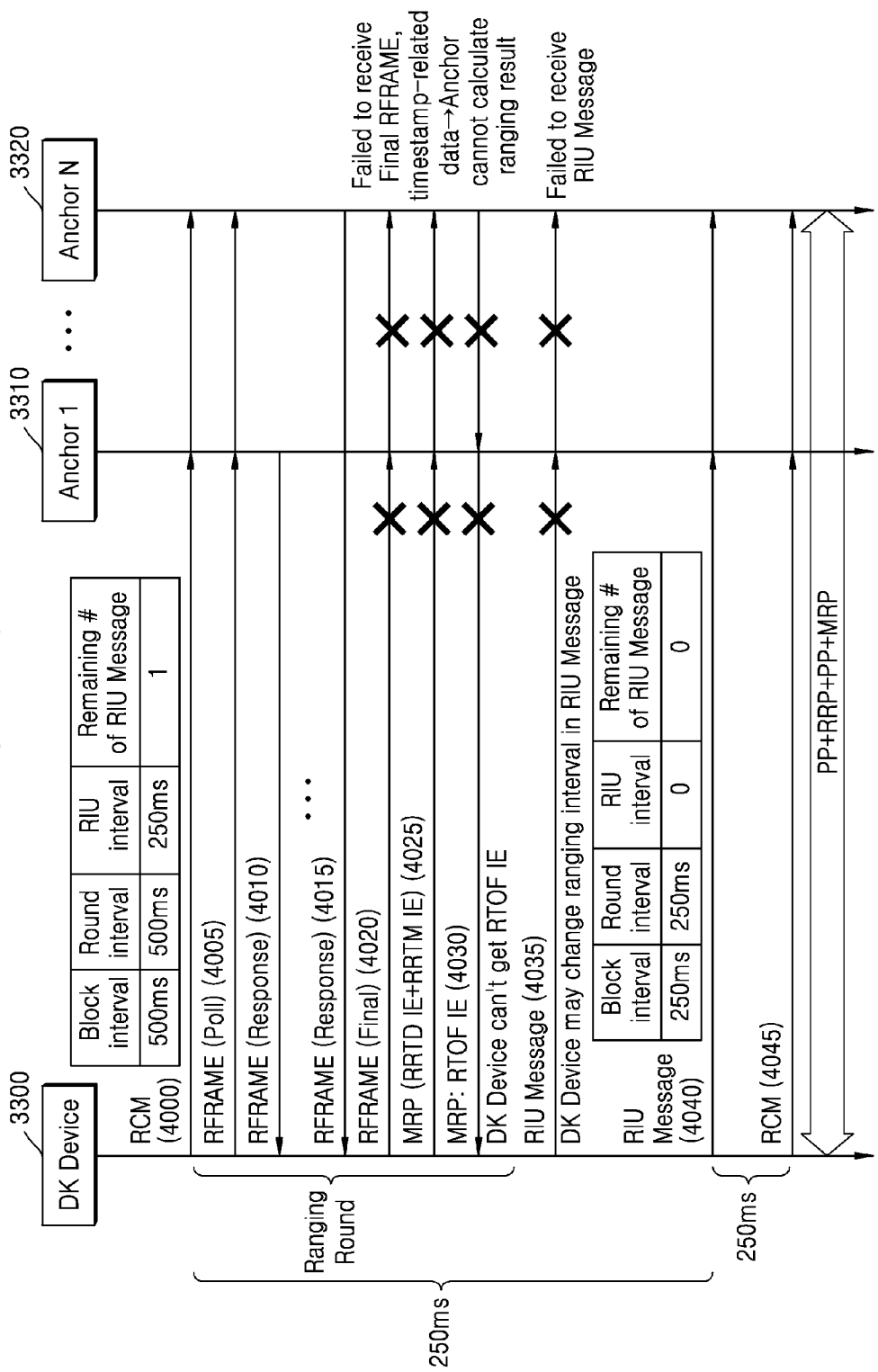
FIG. 40 is a diagram for describing a ranging operation performed between an electronic device and anchors when one of the anchors fails to receive a second Poll frame, timestamp-related information, and a RIU, according to an embodiment.

FIG. 40 is a diagram for describing a ranging operation performed between an electronic device and anchors when one of the anchors fails to receive a second Poll frame, timestamp-related information, and a RIU message, according to an embodiment. In FIG. 40, the DK device 3300 may be the second electronic device 120, and the first anchor 3310 or the Nth anchor 3320 may be included in the first electronic device 110. In FIG. 40, the DK device 3300, the first anchor 3310, and the Nth anchor 3320 are illustrated exemplarily, and it is understood that one or more other embodiments are not limited thereto.

Referring to FIG. 40, the DK device 3300 may transmit a RCM 4000 to the first anchor 3310 or the Nth anchor 3320, and the first anchor 3310 or the Nth anchor 3320 may receive the RCM 4000. The DK device 3300 may transmit a Poll 4005 to the first anchor 3310 or the Nth anchor 3320. The first anchor 3310 or the Nth anchor 3320 may receive the Poll 4005. In an RRP, the DK device 3300 may fail to receive a Response frame with respect to the Poll 4005 from the first anchor 3310 or the Nth anchor 3320. For example, the DK device 3300 may fail to receive a Response 4010 from the first anchor 3310. Also, the DK device 3300 may fail to receive a Response 4015 from the Nth anchor 3320.

Furthermore, the anchors may fail to receive a second Poll frame from the DK device 3300. For example, the first anchor 3310 and the Nth anchor 3320 may fail to receive a Final 4020 that is a second Poll frame from the DK device 3300.

Moreover, the anchors may fail to receive timestamp-related information in an MRP. For example, the first anchor 3310 or the Nth anchor 3320 may fail to receive IEs 4025 including a RRTD IE including information about a reply time of the DK device 3300 and a RRTM IE including information about a round trip, the IEs 4025 being transmitted by the DK device 3300 in an MRP.

Also, the anchors may fail to receive ranging interval information updated by the DK device 3300 in a RIU. For example, the first anchor 3310 and the Nth anchor 3320 may fail to receive a RIU message 4035 including the ranging interval information updated by the DK device 3300 in the RIU.

The DK device 3300 may fail to receive ranging results transmitted by the anchors in the MRP. For example, the DK device 3300 may fail to receive a RTOF IE 4030 indicating ranging results received from the first anchor 3310 and the Nth anchor 3320 in the MRP.

When the anchors fail to receive the second Poll frame, and the timestamp-related information in the MRP, the anchors may fail to transmit information related to ranging results to the DK device 3300 in the MRP. When (e.g., based on) the ranging results are not transmitted by the anchors, the DK device 3300 may determine a reception failure. When the DK device 3300 determines the reception failure, the DK device 3300 may change a ranging interval in a RIU message during a RIUP. Hereinafter, the anchors may denote the first anchor 3310 or the Nth anchor 3320.

According to an embodiment, receivers of the anchors remain turned on during a ranging round, such that the anchors may perform next ranging, based on updated block interval or round interval information received from the DK device 3300 in the RIUP.

When the anchors fail to receive the updated block interval or round interval information from the DK device 3300 in the RIUP, the anchors may transit to a sleep state, based on ranging interval information (e.g., a block interval or a round interval) received via a previous RCM. The anchors may transit to a wake up state at a later time.

When the DK device 3300 fails to receive the ranging results transmitted by the anchors in the MRP, the DK device 3300 fails to determine a ranging interval to be included in a RCM in a next ranging block, and thus, the ranging interval may for example be defined based on a vehicle OEM policy.

The DK device 3300 may transmit a RIU message 4040 and a RCM 4045 to the first anchor 3310 or the Nth anchor 3320. In this regard, the RCM 4045 may include information related to a ranging interval used in a previous ranging block. According to methods described above with reference to FIGS. 33 to 40, when reception of a frame fails in a ranging duration, a ranging operation may be recovered.

Figure 41:
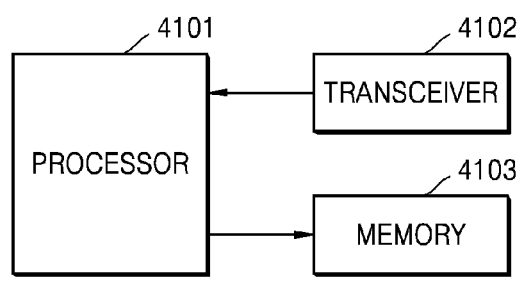
FIG. 41 illustrates a configuration of an electronic device, according to an embodiment.

FIG. 41 illustrates a configuration of an electronic device, according to an embodiment.

The electronic device according to an embodiment may include a processor 4101, a transceiver 4102, and a memory 4103. The processor 4101 may indicate one processor or a plurality of processors, the transceiver 4102 may indicate one transceiver or a plurality of transceivers, and the memory 4103 may indicate one memory or a plurality of memories.

The processor 4101 may be defined or realized as an integrated circuit or at least one processor dedicated to a circuit or an application.

The processor 4101 may control all operations of the electronic device. For example, the processor 4101 may control a signal flow between blocks so as to allow operations to be performed according to the aforementioned flowcharts. Also, the processor 4101 may write data to and read data from the memory 4103. In addition, the processor 4101 may perform functions of a protocol stack, which are requested by a communication standard. To do so, the processor 4101 may include at least one processor or microprocessor, or may be a part of another processor. Also, a part of the transceiver 4102 and the processor 4101 may be referred to as a communication processor (CP).

According to an embodiment, the processor 4101 may control operations of the electronic device, which are described above.

The processor 4101 may be configured to execute a program, which is stored in at least one memory 4103, to set up a communication connection with another electronic device by obtaining a parameter for first communication by using a second communication distinct from the first communication, and transceive data with the other electronic device via the first communication.

The parameter may include at least one of an MAC address, a group ID, and an application ID.

The at least one processor may transceive a ranging message to/from the other electronic device so as to measure a distance to the other electronic device.

The at least one processor may transmit a ranging initiation message including ranging duration data to the other electronic device, may receive a ranging response message from the other electronic device, and may transmit a ranging end message to the other electronic device.

The at least one processor may transmit the ranging initiation message to the other electronic device when a predetermined event (e.g., a Pull door event) occurs in the electronic device.

The at least one processor may check whether the other electronic device is located within a distance (i.e., SECURE_ DISTANCE) that is preset with the other electronic device.

When distance measurement with respect to the other electronic device fails, the at least one processor may determine a first back-off time that is a time to re-transmit the ranging message to the other electronic device.

When the distance measurement with respect to the other electronic device is successful, the at least one processor may determine a second back-off time that is a time to re-transmit the ranging message to the other electronic device.

The at least one processor checks, via the second communication, a SHR preamble and a CFP slot corresponding to the SHR preamble, which are available in the first communication, and may transceive data with the other electronic device via the first communication, based on a result of the check.

The at least one processor may check a usage state of the CFP slot, based on Sync frames respectively corresponding to some SHR preambles from among a plurality of SHR preambles.

The at least one processor may transmit, to the other electronic device, a check message including information about the usage state of the CFP slot.

The at least one processor may receive, when the SHR preamble and the CFP slot that are available are present, information about the available SHR preamble and the available CFP slot from the other electronic device.

The at least one processor may receive, when the SHR preamble and the CFP slot are not available, an unavailability notice message from the other electronic device.

The at least one processor may broadcast the information about the available CFP slot via a Sync frame.

The at least one processor may perform pairing with the other electronic device in a CAP by using the parameter.

The at least one processor may transceive data by using the SHR preamble and the CFP slot that are available in the first communication.

The transceiver 4102 according to an embodiment may perform functions for transceiving a signal via a wireless channel. For example, the transceiver 4102 may perform conversion between a baseband signal and a bitstream based on physical layer specifications of a system. For example, for data transmission, the transceiver 4102 may generate complex symbols by encoding and modulating a transmit bit string. For data reception, the transceiver 4102 may reconstruct a received bit stream by demodulating and decoding a baseband signal. Also, the transceiver 4102 may up-convert a baseband signal into an RF band signal and then may transmit the RF band signal through an antenna, and may down-convert an RF band signal received through an antenna, into a baseband signal. For example, the transceiver 4102 may include a transmitting filter, a receiving filter, an amplifier, a mixer, an oscillator, a digital-to-analog convertor (DAC), an analog-to-digital convertor (ADC), or the like. Also, the transceiver 4102 may include a plurality of transceiving paths. In addition, the transceiver 4102 may include at least one antenna array configured by a plurality of antenna elements. In a hardware aspect, the transceiver 4102 may be configured as a digital circuit and an analog circuit (e.g., a radio frequency integrated circuit (RFIC)). In this regard, the digital circuit and the analog circuit may be implemented as one package. Also, the transceiver 4102 may include a plurality of RF chains. The transceiver 4102 may include a first transceiver and a second transceiver. The first transceiver may support the second communication, and the second transceiver may support the first communication.

Although FIG. 41 illustrates one transceiver 4102, the first transceiver supporting the second communication, and the second transceiver supporting the first communication may exist as separate transceivers.

The memory 4103 according to an embodiment may store basic programs, application programs, configuration information, instructions or the like, for operations of the electronic device. The memory 4103 may be implemented as a volatile memory, a non-volatile memory, or a combination of a volatile memory and a non-volatile memory. The memory 4103 may provide stored data, in response to a request by the processor 4101. The memory 4103 may store at least one of information transceived by the transceiver 4102 or information generated by the processor 4101.

According to embodiments, the processor 4101 may schedule an SHR preamble and a CFP slot to be communicated between a plurality of electronic devices by performing signaling via communication other than an UWB. By doing so, the number of electronic devices unnecessarily operating an UWB receiver from among the plurality of electronic devices is decreased, such that power consumption in the plurality of electronic devices may be improved, and unnecessary latency of the plurality of electronic devices may be decreased.

In accordance with an aspect of the disclosure, a method of operating a controller that performs a ranging with a controlee using ultra wideband (UWB) communication in a wireless communication system, the method includes: transmitting, to the controlee, a first ranging control message (RCM) comprising information of a first ranging interval for a second RCM; changing a ranging interval for the second RCM from the first ranging interval to a second ranging interval; transmitting, to the controlee, an interval update message for the second RCM comprising information for the changed ranging interval based on the first ranging interval; and transmitting, to the controlee, the second RCM based on the changed ranging interval.

The method further includes: in case that the controlee receives the interval update message from the controller, receiving, from the controlee, a response message for the interval update message.

The method further includes: in case that the controller receives the response message, stopping the transmitting of the update message.

The method further includes: transmitting, to the controlee, the interval update message repeatedly until the controller receives the response message.

In the method, in case that the controlee fails to receive the first RCM and the interval update message, wherein a channel to receive the second RCM is listened by the controlee.

In accordance with another aspect of the disclosure, a method of operating a controlee that performs a ranging with a controller using ultra wideband (UWB) communication in a wireless communication system, the method includes: receiving, from the controller, a first ranging control message (RCM) comprising information of a first ranging interval for a second RCM; receiving, from the controller, based on the first ranging interval, an interval update message for the second RCM comprising information for a second ranging interval, wherein a ranging interval for the second RCM is changed from the first ranging interval to the second ranging interval; and receiving, from the controller, the second RCM based on the second ranging interval.

The method further includes: in case that the controlee receives the interval update message from the controller, transmitting, to the controller, a response message for the interval update message.

In the method, in case that the controller receives the response message, wherein a transmitting of the updated message is stopped.

The method further includes: receiving, from the controller, the interval update message repeatedly until the controller receives the response message.

The method further includes: in case that the controlee fails to receive the first RCM and the interval update message, listening a channel to receive the second RCM.

In accordance with another aspect of the disclosure, a controller that performs a ranging with a controlee using ultra wideband (UWB) communication in a wireless communication system, the controller includes: a transceiver; a memory; and a processor configured to: transmit, to the controlee, a first ranging control message (RCM) comprising information of a first ranging interval for a second RCM, change a ranging interval for the second RCM from the first ranging interval to a second ranging interval, transmit, to the controlee, an interval update message for the second RCM comprising information for the changed ranging interval based on the first ranging interval, and transmit, to the controlee, the second RCM based on the changed ranging interval.

The processor is further configured to: in case that the controlee receives the interval update message from the controller, receive, from the controlee, a response message for the interval update message.

The processor is further configured to: in case that the controller receives the response message, stop the transmitting of the update message.

The processor is further configured to: transmit, to the controlee, the interval update message repeatedly until the controller receives the response message.

in case that the controlee fails to receive the first RCM and the interval update message, wherein a channel to receive the second RCM is listened by the controlee.

In accordance with another aspect of the disclosure, a non-transitory computer-readable recording medium has recorded thereon instruction executable by at least one processor to perform the method of the controller.

In accordance with another aspect of the disclosure, a non-transitory computer-readable recording medium has recorded thereon instruction executable by at least one processor to perform the method of the controlee.

The methods according to embodiments as described above or in the following claims may be implemented as hardware, software, or a combination of hardware and software.

When implemented as software, a computer-readable storage medium storing one or more programs (e.g., software modules) may be provided. The one or more programs stored in the computer-readable storage medium are configured for execution by one or more processors in an electronic device. The one or more programs include instructions directing the electronic device to execute the methods according to embodiments of the disclosure as described the specification or in the following claims.

The programs (e.g., software modules or software) may be stored in non-volatile memory including random access memory (RAM) or flash memory, read only memory (ROM), electrically erasable programmable read only memory (EEPROM), a magnetic disc storage device, a compact disc (CD)-ROM, a digital versatile disc (DVD), another optical storage device, or a magnetic cassette. Alternatively, the programs may be stored in memory including a combination of some or all of the above-mentioned storage media. A plurality of such memories may be included.

In addition, the programs may be stored in an attachable storage device accessible through any or a combination of communication networks such as Internet, an intranet, a local area network (LAN), a wide LAN (WLAN), and a storage area network (SAN). Such a storage device may access the electronic device performing the embodiments of the disclosure via an external port. Furthermore, a separate storage device on the communication network may access the electronic device performing the embodiments of the disclosure.

Specific embodiments have been described above, but it is understood that various modifications can be made without departing from the scope of the disclosure. Thus, it is apparent to one of ordinary skill in the art that the scope of the disclosure is not limited to embodiments described herein and should be defined by the appended claims and their equivalents.

The block diagrams as described in the disclosure may be construed by one of ordinary skill in the art as conceptual representation of circuitry for implementing the principles of the disclosure. Similarly, it is also understood by one of ordinary skill in the art that any flowcharts, flow diagrams, state transitions, pseudo codes, etc., may be substantially embodied in a computer-readable medium as various processes that may be carried out by a computer or processor, whether or not the computer or the processor is explicitly shown. Accordingly, the aforementioned embodiments of the disclosure may be written into a program that may be executed by a computer, and may be implemented in a universal digital computer for carrying out the program by using a computer-readable recording medium. The computer-readable recording medium includes a storage medium, such as magnetic storage medium (e.g., ROM, floppy disk, hard disk, etc.), an optical medium (e.g., CD-ROM, DVD, etc.), or the like.

Functions of the various elements shown in the drawings may be associated with appropriate software and thus may be provided by the use of dedicated hardware as well as hardware capable of executing the software. When provided by a processor, the functions may be provided by a single dedicated processor, a single shared processor, or a plurality of individual processors in which some of them may be shared. Also, the explicit use of the term "processor" or "controller" should not be interpreted as making exclusive reference to hardware capable of executing software, but may be construed as implicitly including, without limitation, digital signal processor (DSP) hardware, a ROM for storing software, a RAM, and a non-volatile storage device.

In the attached claims, an element represented as a unit for performing a particular function encompasses any method of performing the particular function, the element being intended to encompass a combination of circuit elements that perform the particular function, or any form of software including firmware, microcode, etc., in combination with circuitry suitable for carrying out the software to perform the particular function.

Throughout the specification, reference to "an embodiment" of principles of the disclosure and various modifications thereof intend that particular properties, structures, features, etc., are included in at least one embodiment of the principle of the disclosure. Thus, the term "an embodiment" and any other modifications provided in the specification do not necessarily refer to the same embodiment of the disclosure.

The disclosure has been described with reference to one or more embodiments thereof.

It is to be understood that embodiments and conditional exemplification as disclosed in the specification are intended to assist one of ordinary skill in the art in understanding the principles and concepts of the disclosure, and thus one of ordinary skill in the art may understand that the embodiments may be modified without departing from the substantial characteristics of the disclosure. Therefore, the above embodiments should be considered in an illustrative sense rather than a restrictive sense. The scope of the disclosure is defined only by the following claims, and all the equivalents of the embodiments may also be construed to be in the scope of the disclosure.

What is claimed is:

1. A method of operating a controller that performs a ranging with a controlee using ultra wideband (UWB) communication in a wireless communication system, the method comprising:
    transmitting, to the controlee, a first ranging control message (RCM) comprising information of a first ranging interval for a second RCM;
    changing a ranging interval for the second RCM from the first ranging interval to a second ranging interval;
    transmitting, to the controlee, an interval update message for the second RCM comprising information for the changed ranging interval based on the first ranging interval; and
    transmitting, to the controlee, the second RCM based on the changed ranging interval.

2. The method of the claim 1, further comprising:
    in case that the interval update message is received by the controlee, receiving, from the controlee, a response message for the interval update message.

3. The method of the claim 2, further comprising:
    in case that the controller receives the response message, stopping the transmitting of the update message.

4. The method of the claim 2, further comprising:
    transmitting, to the controlee, the interval update message repeatedly until the controller receives the response message.

5. The method of the claim 1, wherein in case that the first RCM and the interval update message are not received by the controlee, wherein a channel to receive the second RCM is listened by the controlee.

6. A method of operating a controlee that performs a ranging with a controller using ultra wideband (UWB) communication in a wireless communication system, the method comprising:
    receiving, from the controller, a first ranging control message (RCM) comprising information of a first ranging interval for a second RCM;
    receiving, from the controller, based on the first ranging interval, an interval update message for the second RCM comprising information for a second ranging interval, wherein a ranging interval for the second RCM is changed from the first ranging interval to the second ranging interval; and
    receiving, from the controller, the second RCM based on the second ranging interval.

7. The method of claim 6, further comprising:
    in case that the controlee receives the interval update message from the controller, transmitting, to the controller, a response message for the interval update message.

8. The method of claim 7, wherein in case that the response message is received by the controller, a transmitting of the updated message is stopped.

9. The method of claim 7,
    receiving, from the controller, the interval update message repeatedly until the response message is received by the controller.

10. The method of claim 6, further comprising:
    in case that the controlee fails to receive the first RCM and the interval update message, listening a channel to receive the second RCM.

11. A controller that performs a ranging with a controlee using ultra wideband (UWB) communication in a wireless communication system, the controller comprising:
    a transceiver;
    a memory; and a processor configured to:

transmit, to the controlee, a first ranging control message (RCM) comprising information of a first ranging interval for a second RCM, change a ranging interval for the second RCM from the first ranging interval to a second ranging interval, transmit, to the controlee, an interval update message for the second RCM comprising information for the changed ranging interval based on the first ranging interval, and transmit, to the controlee, the second RCM based on the changed ranging interval.

12. The controller of the claim 11, wherein the processor is further configured to:

in case that the interval update message is received by the controlee, receive, from the controlee, a response message for the interval update message.

13. The controller of the claim 12, wherein the processor is further configured to:

in case that the controller receives the response message, stop the transmitting of the update message.

14. The controller of the claim 12, wherein the processor is further configured to:

transmit, to the controlee, the interval update message repeatedly until the controller receives the response message.

15. The controller of the claim 11, wherein in case that the first RCM and the interval update message are not received by the controlee, a channel to receive the second RCM is listened by the controlee.

16. A non-transitory computer-readable recording medium having recorded thereon instruction executable by at least one processor to perform the method of claim 1.

17. A non-transitory computer-readable recording medium having recorded thereon instruction executable by at least one processor to perform the method of claim 6.

* * * * *